US011306157B2

(12) United States Patent
Hsieh-Wilson et al.

(10) Patent No.: US 11,306,157 B2
(45) Date of Patent: Apr. 19, 2022

(54) EXPEDIENT SYNTHESIS OF CORE DISACCHARIDE BUILDING BLOCKS FROM NATURAL POLYSACCHARIDES FOR HEPARAN SULFATE OLIGOSACCHARIDE ASSEMBLY

(71) Applicant: California Institute of Technology, Pasadena, CA (US)

(72) Inventors: Linda C. Hsieh-Wilson, South Pasadena, CA (US); Nitin J. Pawar, Pasadena, CA (US); Lei Wang, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 16/723,959

(22) Filed: Dec. 20, 2019

(65) Prior Publication Data

US 2020/0216573 A1 Jul. 9, 2020

Related U.S. Application Data

(60) Provisional application No. 62/783,572, filed on Dec. 21, 2018.

(51) Int. Cl.
*C08B 37/00* (2006.01)
*C08B 37/08* (2006.01)

(52) U.S. Cl.
CPC ........ *C08B 37/0003* (2013.01); *C08B 37/003* (2013.01); *C08B 37/0075* (2013.01)

(58) Field of Classification Search
CPC ............ C08B 37/0003; C08B 37/0078; C08B 37/0075; A61K 31/726; A61K 31/727; C07H 13/02
USPC .......................................................... 536/21
See application file for complete search history.

(56) References Cited

U.S. PATENT DOCUMENTS

| | | | |
|---|---|---|---|
| 5,380,716 A | 1/1995 | Conrad et al. | |
| 7,772,192 B2 | 8/2010 | Esko | |
| 7,928,129 B1 | 4/2011 | Shoichet et al. | |
| 8,404,833 B2 | 3/2013 | Seifert et al. | |
| 2006/0293275 A1 * | 12/2006 | Nakamura | A61K 31/702 514/53 |
| 2012/0004405 A1 | 1/2012 | Prehm | |

FOREIGN PATENT DOCUMENTS

| | | | | |
|---|---|---|---|---|
| WO | 9623882 | | 8/1996 | |
| WO | WO 96/23882 | * | 8/1996 | |
| WO | 2010001378 | | 1/2010 | |
| WO | 2014165713 | | 10/2014 | |
| WO | WO 2014/165713 | * | 10/2014 | ......... A61K 31/7008 |
| WO | 2016172615 | | 10/2016 | |

OTHER PUBLICATIONS

Oh, Ph.D. Thesis, California Institute of Technology, 2013, pp. 1-219.*
Shively et al, Biochemistry 1976, 15(18), 3932-3942.*
Al-Horani et al., "Chemical Sulfation of Small Molecules—Advances and Challenges", Tetrahedron, vol. 66, No. 16, Apr. 17, 2010, pp. 2907-2918.
Bertini et al., "Molecular Weight Determination of Heparin and Dermatan Sulfate by Size Exclusion Chromatography With a Triple Detector Array", Biomacromolecules, vol. 6, No. 1, Jan.-Feb. 2005, pp. 168-173.
Boltje et al., "Versatile Set of Orthogonal Protecting Groups for the Preparation of Highly Branched Oligosaccharides", Organic Letters, vol. 12, No. 20, Aug. 19, 2010, pp. 4636-4639.
Danishefsky et al., "Investigations on the Chemistry of Heparin. I. Desulfation and Acetylation", Arch. Biochem. Biophys., vol. 90, No. 1, Sep. 1960, pp. 114-121.
David et al., "Regioselective Manipulation of Hydroxyl Groups via Organotin Derivatives", Tetrahedron, vol. 41, No. 4, 1985, pp. 643-663.
Davidson et al., "Structural Studies on Chondroitin Sulfuric Acid. 1,2 I. The Nature of Chondrosine", Journal of the American Chemical Society, vol. 76, No. 22, Nov. 20, 1954, pp. 5686-5689.
Dimakos et al., "Site-Selective Functionalization of Hydroxyl Groups in Carbohydrate Derivatives", Chem. Rev., vol. 118, No. 23, Dec. 12, 2018, pp. 11457-11517.
Erian et al., "The Chemistry of α-Haloketones and Their Utility in Heterocyclic Synthesis", Molecules, vol. 8, No. 11, Nov. 2003, pp. 793-865.
Goddard-Borger et al., "An Efficient, Inexpensive, and Shelf-stable Diazotransfer Reagent: Imidazole-1-Sulfonyl Azide Hydrochloride", Organic Letters, vol. 9, No. 19, Sep. 13, 2007, pp. 3797-3800.
Hahm et al., "Automated Glycan Assembly of Oligo-N-Acetyllactosamine and Keratan Sulfate Probes to Study Virus-Glycan Interactions", Chem., vol. 2, No. 1, Jan. 12, 2017, pp. 114-124.
Hansen et al., "Scalable Synthesis of L-lduronic Acid Derivatives via Stereocontrolled Cyanohydrin Reaction for Synthesis of Heparin-Related Disaccharides", Organic Letters, vol. 11, No. 20, 2009, pp. 4528-4531.
Hansen et al., "Synthesis of L-lduronic Acid Derivatives via [3.2.1] and [2.2.2] L-lduronic Lactones from Bulk Glucose-Derived Cyanohydrin Hydrolysis: A Reversible Conformationally Switched Superdisarmed/Rearmed Lactone Route to Heparin Disaccharides", The Journal of Organic Chemistry, vol. 80, No. 8, Apr. 17, 2015, pp. 3777-3789.

(Continued)

*Primary Examiner* — Ganapathy Krishnan
(74) *Attorney, Agent, or Firm* — Kilpatrick Townsend & Stockton LLP

(57) ABSTRACT

Methods for the preparation of oligosaccharide products from polysaccharide starting materials are disclosed. The methods include: hydrolyzing a glucosamine-containing polysaccharide starting material, such as heparin or heparosan, under conditions sufficient to form an oligosaccharide intermediate (e.g., a GlcN-IdoA disaccharide intermediate or a GlcA-GlcN disaccharide intermediate), and converting the oligosaccharide intermediate to the oligosaccharide product. Conversion of the oligosaccharide intermediates to the oligosaccharide products may include one or more esterification, acylation, epimerization, protection, and deprotection steps. Preparation of higher-order oligomers is described, as well as methods for selective oligosaccharide sulfation.

15 Claims, 13 Drawing Sheets

(56) References Cited

OTHER PUBLICATIONS

Hu et al., "Divergent Synthesis of 48 Heparan Sulfate-Based Disaccharides and Probing the Specific Sugar-Fibroblast Growth Factor-1 Interaction", J Am Chem Soc., vol. 134, No. 51, Dec. 26, 2012, pp. 20722-20727.

Hu et al., "Synthesis of 3-O-sulfonated Heparan Sulfate Octasaccharides That Inhibit the Herpes Simplex Virus Type 1 Host-Cell Interaction", Nature Chemistry, vol. 3, Jul. 2011, pp. 557-563.

Lawandi et al., "Regioselective Acylation, Alkylation, Silylation and Glycosylation of Monosaccharides", Tetrahedron, vol. 72, No. 41, 2016, pp. 6283-6319.

Liu et al., "Comparison of Low-Molecular-Weight Heparins Prepared From Bovine Heparins With Enoxaparin", Clinical and Applied Thrombosis/Hemostasis, vol. 23, No. 6, 2017, pp. 542-553.

Lopin et al., "From Polymer to Size-Defined Oligomers: An Expeditious Route for the Preparation of Chondroitin Oligosaccharides", Angewandte Chemie International Edition, vol. 45, No. 16, 2006, pp. 2574-2578.

Nigudkar et al., "Stereocontrolled 1,2-cis Glycosylation as the Driving Force of Progress in Synthetic Carbohydrate Chemistry", Chemical Science, vol. 6, No. 5, 2015, pp. 2687-2704.

Oh, "Synthesis and Biological Activity of Anticoagulant Heparan Sulfate Glycopolymers", California Institute of Technology, Available online at, https://thesis.library.caltech.edu/7818/1/Oh_YoungIn_2013_Thesis.pdf, May 16, 2013, 219 pages.

PCT/US2019/068138, "International Search Report and Written Opinion", dated Feb. 25, 2020, 21 pages.

Prabhu et al., "New Set of Orthogonal Protecting Groups for the Modular Synthesis of Heparan Sulfate Fragments", Organic Letters, vol. 5, No. 26, 2003, pp. 4975-4978.

Shively et al., "Formation of Anhydrosugars in the Chemical Depolymerization of Heparin", Biochemistry, vol. 15, No. 18, Sep. 7, 1976, pp. 3932-3942.

Song et al., "Synthesis of Multivalent Tuberculosis and Leishmania-Associated Capping Carbohydrates Reveals Structure-Dependent Responses Allowing Immune Evasion", Journal of the American Chemical Society, vol. 132, Aug. 25, 2010, pp. 11428-11430.

Tsai et al., "Synthetic Heparin and Heparan Sulfate: Probes in Defining Biological Functions", Current Opinion in Chemical Biology, vol. 40, 2017, pp. 152-159.

Wang et al., "*E. coli* K5 Fermentation and the Preparation of Heparosan, a Bioengineered Heparin Precursor", Biotechnol Bioeng., vol. 107, No. 6, Dec. 15, 2010, pp. 964-973.

Yu et al., "Novel Efficient Routes to Heparin Monosaccharides and Disaccharides Achieved via Regio- and Stereoselective Glycosidation", Original Letter, vol. 6, No. 5, Feb. 11, 2004, pp. 723-726.

\* cited by examiner

EXPEDIENT SYNTHESIS OF CORE DISACCHARIDE BUILDING BLOCKS FROM NATURAL POLYSACCHARIDES FOR HEPARAN SULFATE OLIGOSACCHARIDE ASSEMBLY

CROSS-REFERENCES TO RELATED APPLICATION

The present application claims priority to U.S. Provisional Pat. Appl. No. 62/783,572, filed on Dec. 21, 2018, which is incorporated herein by reference in its entirety for all purposes.

STATEMENT AS TO RIGHTS TO INVENTIONS MADE UNDER FEDERALLY SPONSORED RESEARCH AND DEVELOPMENT

This invention was made with government support under Grant No. GM116262 awarded by the National Institutes of Health. The government has certain rights in the invention.

BACKGROUND OF THE INVENTION

Heparan sulfate (HS) glycosaminoglycans (GAGs) are linear, sulfated polysaccharides that mediate a wide range of important biological and disease processes, including cell growth and proliferation, brain development, immune regulation, viral invasion, angiogenesis, and tumor metastasis.[1] The diverse activities of GAGs stem largely from their complex sulfation patterns, which facilitate the interactions of GAGs with hundreds of different proteins.[2] HS chains are composed of repeating disaccharide units of glucosamine (GlcN) joined via a-1,4-linkages to either D-glucuronic acid (GlcA) or L-iduronic acid (IdoA). Sulfation at the N-, 6-O- and 3-O-positions of GlcN and the 2-O-position of GlcA or IdoA produces many different sulfation patterns that are tissue-specific, age-specific, disease-related, and tightly regulated in vivo.[3] Indeed, a simple HS tetrasaccharide has the potential to display 1024 different sulfation sequences, highlighting the intriguing capacity of GAGs for molecular recognition. However, this chemical complexity has limited access to well-defined structures and hampered efforts to understand the biology of HS GAGs and to develop HS-based therapeutics.

Synthetic chemistry provides an elegant solution to this challenge. A notable example is the heparin-based pentasaccharide drug fondaparinux, which is approved for the treatment of deep vein thrombosis. The synthesis of various HS analogues was critical for identifying a rare 3-O-sulfated sequence that regulates antithrombin III activity.[1a] However, despite remarkable progress over the past two decades,[4] the synthesis of HS oligosaccharides remains a significant challenge. Only a small subset of the potential sulfation motifs has been generated, resulting in a paucity of structure-function information and hindering broad application of the compounds to biology.

A major roadblock lies in the preparation of suitable HS building blocks. The synthesis of selectively protected IdoA- and GlcA-containing disaccharides, which are traditionally derived from monosaccharide precursors, usually requires 18-29 steps each, depending on the complexity of the protecting groups. This is due to a lack of commercial sources for L-iduronic acid/L-idose, as well as the need for stereoselective formation of glycosidic bonds and elaborate protecting group strategies to direct regioselective sulfation. Another major roadblock is the lack of universal building blocks for the synthesis of HS GAGs. Ideally, virtually any sulfation motif could be obtained from a small set of building blocks. The lengthy, laborious processes required and the absence of universal building blocks have fundamentally limited the ability to produce large, comprehensive libraries of HS oligosaccharides. To date, sulfated libraries of compounds representing all possible sulfation motifs have only been attainable in the case of HS disaccharides.[4o]

BRIEF SUMMARY OF THE INVENTION

Provided herein are methods for preparing oligosaccharide products from polysaccharide starting materials. The methods include:
(a) hydrolyzing a glucosamine-containing polysaccharide starting material under conditions sufficient to form an oligosaccharide intermediate (e.g., a GlcN-IdoA disaccharide intermediate or a GlcA-GlcN disaccharide intermediate), and
(b) converting the oligosaccharide intermediate to the oligosaccharide product.

Polysaccharide starting materials such as heparin, heparinates, and heparosan may be used in the methods. Depending, in part, on the specific starting material employed, intermediates such as a GlcN-IdoA disaccharide or a GlcA-GlcN disaccharide can be selectively produced. Epimerization of the intermediates can be employed to obtain further compounds including, but not limited to, GlcN-GlcA and IdoA-GlcN dissacharides. The various oligosaccharides may be functionalized with orthogonally reactive functional groups for selective manipulation of hydroxyl and amino groups in synthetic intermediates and higher-order carbohydrate oligomers. In some embodiments, the methods include covalently bonding two or more oligosaccharide products to form an oligomer such as a tetrasaccharide, pentasaccharide, or hexasaccharide. In some embodiments, the methods further include the sulfation of one or more hydroxyl groups and/or amino groups in the resulting products.

DETAILED DESCRIPTION OF THE INVENTION

Figure 1:
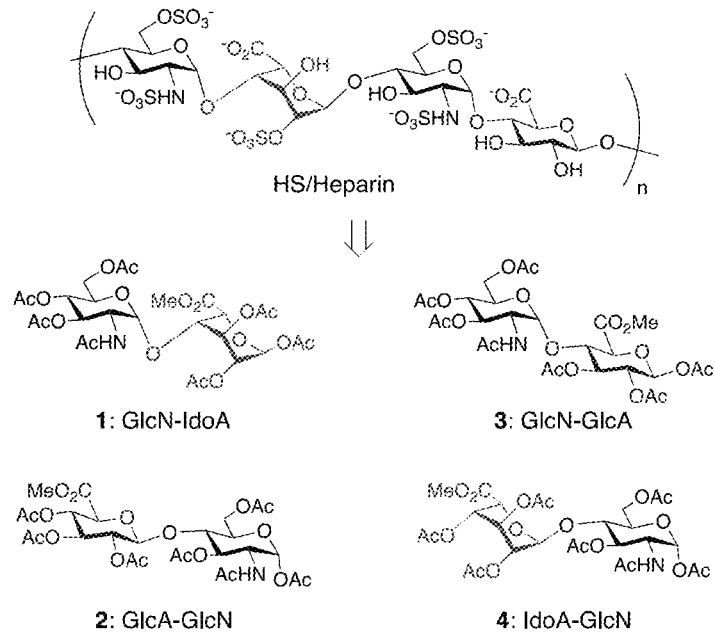
FIG. 1 shows representative structures found in HS/heparin and core disaccharide building blocks.

Provided herein is an expedient approach to synthesize oligosaccharides such as the four core disaccharides required for HS/heparin oligosaccharide assembly and related materials. The present disclosure demonstrates that these key disaccharides can be obtained on a large scale from readily available natural polysaccharides and efficiently converted into versatile synthetic intermediates. Importantly, by employing disaccharides rather than monosaccharides as the minimum precursors, this approach eliminates half of the challenging glycosidic bond-forming reactions and significantly reduces the total number of steps. The methods described herein can be used for the streamlined synthesis of HS oligosaccharides and accelerate the production of diverse collections of HS GAG sequences.

I. Definitions

As used herein, the term "oligosaccharide" refers to a compound containing at least two monosaccharides covalently linked together. Oligosaccharides include disaccharides, tetrasaccharides, hexasaccharides, octasaccharides, and the like. Covalent bonds are generally glycosidic linkages (i.e., C—O—C bonds) formed from the hydroxyl groups of adjacent sugars. Linkages can occur between the 1-carbon (the anomeric carbon) and the 4-carbon of adjacent sugars, the 1-carbon and the 3-carbon of adjacent sugars, the 1-carbon and the 6-carbon of adjacent sugars, or the 1-carbon and the 2-carbon of adjacent sugars. Other linkages can be present in the oligosaccharide, depending on the particular sugar subunits present. Those of skill in the art will appreciate that a sugar can be linked within an oligosaccharide such that the glycosidic bond at the anomeric carbon is in the α- or β-configuration.

As used herein, the term "polysaccharide" generally refers to a compound containing 10 or more sugars linked together as described for oligosaccharides.

As used herein, the term "glucosamine" refers to 2-amino-2-deoxy-glucose [(3R,4R,5S)-3-amino-6-(hydroxymethyl)oxane-2,4,5-triol], as well as acylated, sulfated, and protected derivatives thereof. Glucosamine-containing polysaccharides include, but are not limited to, herapin, heparan sulfate, keratan sulfate, and hyaluronan.

As used herein, the terms "glucuronic acid" and "GlcA" refer to glucopyranuronic acid [(2S,3S,4S,5R,6R)-3,4,5,6-tetrahydroxyoxane-2-carboxylic acid], as well as acylated, sulfated, and protected derivatives thereof.

As used herein, the terms "iduronic acid" and "IdoA" refer to idopyranuronic acid [(2R,3S,4S,5R)-3,4,5,6-tetrahydroxyoxane-2-carboxylic acid] as well as acylated, sulfated, and protected derivatives thereof.

As used herein, the term "GlcN-IdoA" refers to 2-amino-2-deoxy-α-D-glucopyranosyl)-(1→4)-(α-L-idopyranoside)

uronic acid as well as acylated, sulfated, and protected derivatives thereof. The term "GlcA-GlcN" refers to β-D-glucopyranosyluronic acid)-(1→4)-2-amino-2-deoxy-α-D-glucopyranoside, as well as acylated, sulfated, and protected derivatives thereof.

As used herein, the term "hydrolyzing" refers to the cleavage of glycosidic bonds in an oligosaccharide or polysaccharide.

As used herein, the term "amino" refers to the moiety —NH$_2$.

As used herein, the terms "hydroxy" and "hydroxyl" refer to the moiety —OH.

As used herein, the term "sulfonate" refers to the moiety —SO$_3$H in its neural and ionic form, as well as a salts thereof (e.g., a sodium or lithium salt thereof).

As used herein, the term "alkyl," by itself or as part of another substituent, refers to a straight or branched, saturated, aliphatic radical having the number of carbon atoms indicated. Alkyl can include any number of carbons, such as $C_{1-2}$, $C_{1-3}$, $C_{1-4}$, $C_{1-5}$, $C_{1-6}$, $C_{1-7}$, $C_{1-8}$, $C_{1-9}$, $C_{1-10}$, $C_{2-3}$, $C_{2-4}$, $C_{2-5}$, $C_{2-6}$, $C_{3-4}$, $C_{3-5}$, $C_{3-6}$, $C_{4-5}$, $C_{4-6}$ and $C_{5-6}$. For example, $C_{1-6}$ alkyl includes, but is not limited to, methyl, ethyl, propyl, isopropyl, butyl, isobutyl, sec-butyl, tert-butyl, pentyl, isopentyl, hexyl, etc. Alkyl can also refer to alkyl groups having up to 20 carbons atoms, such as, but not limited to heptyl, octyl, nonyl, decyl, etc.

As used herein, the term "alkoxy," by itself or as part of another substituent, refers to a group having the formula —OR, wherein R is alkyl.

As used herein, the term "alkylene" refers to an alkyl group, as defined above, linking at least two other groups (i.e., a divalent alkyl radical). The two moieties linked to the alkylene group can be linked to the same carbon atom or different carbon atoms of the alkylene group. The term "heteroalkylene," by itself or as part of another substituent, refers to an alkylene group of any suitable length and having from 1 to 3 heteroatoms such as N, O and S. For example, heteroalkylene groups can include ethers, thioethers, and alkyl-amines. Additional heteroatoms can also be useful, including, but not limited to, B, Al, Si and P. The heteroatoms can be oxidized to form moieties such as, but not limited to, —S(O)— and —S(O)$_2$—. The two moieties linked to the heteroalkylene group can be linked to the same atom or different atoms of the heteroalkylene group.

As used herein, the term "acyl" refers to the moiety —C(O)R, wherein R is an alkyl group as defined herein.

As used herein, the term "aroyl" refers to the moiety —C(O)R, wherein R is an aryl group. Rhe term "aryl," by itself or as part of another substituent, refers to an aromatic ring system having any suitable number of carbon ring atoms and any suitable number of rings. Aryl groups can include any suitable number of carbon ring atoms, such as $C_6$, $C_7$, $C_8$, $C_9$, $C_{10}$, $C_{11}$, $C_{12}$, $C_{13}$, $C_{14}$, $C_{15}$ or $C_{16}$, as well as $C_{6-10}$, $C_{6-12}$, or $C_{6-14}$. Aryl groups can be monocyclic, fused to form bicyclic (e.g., benzocyclohexyl) or tricyclic groups, or linked by a bond to form a biaryl group. Representative aryl groups include phenyl, naphthyl and biphenyl.

As used herein, the term "azido" refers to the moiety —N$_3$.

As used herein, the terms "halo" and "halogen," by themselves or as part of another substituent, refer to a fluorine, chlorine, bromine, or iodine atom.

As used herein, the term "protecting group" refers to a chemical moiety that renders a functional group unreactive, but is also removable so as to restore the functional group. Examples of "alcohol protecting groups" include, but are not limited to, benzyl; tert-butyl; trityl; tert-butyldimethylsilyl (TBDMS; TBS); 4,5-dimethoxy-2-nitrobenzyloxycarbonyl (Dmnb); propargyloxycarbonyl (Poc); and the like. Examples of "amine protecting groups" include, but are not limited to, benzyloxycarbonyl; 9-fluorenylmethyloxycarbonyl (Fmoc); tert-butyloxycarbonyl (Boc); allyloxycarbonyl (Alloc); p-toluene sulfonyl (Tos); 2,2,5,7,8-pentamethylchroman-6-sulfonyl (Pmc); 2,2,4,6,7-pentamethyl-2,3-dihydrobenzofuran-5-sulfonyl (Pbf); mesityl-2-sulfonyl (Mts); 4-methoxy-2,3,6-trimethylphenylsulfonyl (Mtr); acetamido; phthalimido; and the like. Other alcohol protecting groups and amine protecting groups are known to those of skill in the art including, for example, those described by Green and Wuts (*Protective Groups in Organic Synthesis*, 4$^{th}$ Ed. 2007, Wiley-Interscience, New York).

As used herein, the term "converting" refers to reacting a starting material with at least one reagent to form an intermediate species or a product. The converting can also include reacting an intermediate with at least one reagent to form a further intermediate species or a product.

As used herein, the term "esterifying" refers to converting a carboxylic acid group —COOH to an ester group —COOR, where R is an alkyl group as described herein.

As used herein, the term "acylating" refers to converting an alcohol group —OH to an ester group —OC(O)R, where R is an alkyl group as described herein.

As used herein, the term "epimerizing" refers to changing the configuration of a stereocenter in a compound such as a sugar, e.g., converting an "R" stereocenter to an "S" stereocenter. Epimerization typically involves conversion of a single stereocenter in compounds that have two or more stereocenters.

As used herein, the term "reducing" refers to the transfer of electron density from a reducing agent to a substrate compound. The electron density transfer typically occurs via a process including addition of hydrogen to the substrate compound. The term "reducing agent" refers to a reagent which can donate electron density to the substrate compound. Examples of reducing agents include, but are not limited to, sodium borohydride and tributyltin hydride.

The terms "about" and "around," as used herein to modify a numerical value, indicate a close range surrounding that explicit value. If "X" were the value, "about X" or "around X" would indicate a value from 0.9X to 1.1X, and in certain instances, a value from 0.95X to 1.05X, from 0.98X to 1.02X, or from 0.99X to 1.01X. Any reference to "about X" or "around X" specifically indicates at least the values X, 0.95X, 0.96X, 0.97X, 0.98X, 0.99X, 1.01X, 1.02X, 1.03X, 1.04X, and 1.05X. Thus, "about X" and "around X" are intended to teach and provide written description support for a claim limitation of, e.g., "0.99X."

II. Preparation of Oligosaccharide Intermediates and Products from Polysaccharides Provided herein are methods for preparing an oligosaccharide product. The methods include: (a) hydrolyzing a glucosamine-containing polysaccharide starting material under conditions sufficient to form an oligosaccharide intermediate containing (i) glucosamine (GlcN) and (ii) glucuronic acid (GlcA), iduronic acid (IdoA), or a combination thereof, and (b) converting the oligosaccharide intermediate to the oligosaccharide product.

Heparin and heparan sulfate contain repeating disaccharide units of glucosamine (GlcN) bonded to D-glucuronic acid (GlcA) or L-iduronic acid (IdoA) via α-1,4-linkages. Individual GlcN moieties may be sulfated at the N-, 6-O- and 3-O-positions, and individual GlcA and IdoA moieties may be sulfated at the 2-O-position. Heparin and heparan sulfate are structurally related, although heparin (produced only by mast cells) generally exhibits higher structural homogeneity that than heparin sulfate (produced by virtually all cell types). The molecular weight range of heparin (10-12 kDa) is narrower than the molecular weight range of heparan sulfate (10-70 kDa). Heparin is generally characterized by higher IdoA content (>70% by weight for heparin vs. 30-50% by weight for heparan sulfate), as well as higher levels of GlcN sulfation (>85% GlcN sulfation for heparin vs. 40-60% GlcN sulfation for heparan sulfate). The term "heparinate" refers to salts of heparin and heparan sulfate including, but not limited to, sodium heparinate, lithium heparinate, and calcium heparinate. The structure of heparosan is similar to the unsulfated backbone of heparin and heparan sulfate, although heparosan contains N-acetyl GlnN (GlcNAc) and GlcA. Heparosan lacks IdoA. Other GlcN-containing polysaccharides, such as keratan sulfate, hyaluronan, and chondroitin sulfate may also be used as polysaccharide starting materials. In some embodiments, the polysaccharide starting material contains heparin, N-acylated heparin, heparosan, keratan sulfate, hyaluronan, salts thereof, and/or combinations thereof. In some embodiments, the polysaccharide material does not contain chondroitin sulfate. In some embodiments, the molecular weight of the starting material (weight average or number average) may range from about 2500 Da to about 100,000 Da (e.g., from about 6,000 Da to about 30,000 Da; or from about 17,000 Da to about 19,000 Da; or from about 55,000 Da to about 85,000 Da). Molecular weight may be determined, e.g., via chromatographic methods as described by Bertini et al. (*Biomacromolecules*, 2005, 6(1): 168-173) and/or electrophoretic methods as described by Wang et al. (*Biotechnol. Bioeng.* 2010, 107(6): 964-973). Polysaccharide starting materials such as heparin and heparosan are commercially available in various weight fractions.

A. Polysaccharide Hydrolysis

Hydrolyzing the polysaccharide starting material may be conducted in a hydrolysis reaction mixture containing the starting material, an acid, and water. Examples of suitable acids include, but are not limited to, Brønsted acids such as sulfonic acids (e.g., trifluoromethanesulfonic acid, p-toluenesulfonic acid, and the like) and carboxylic acids (e.g., trifluoroacetic acid and the like), as well as Lewis acids such as copper (I) chloride and boron trifluoride (e.g., $BF_3$ generated from boron trifluoride etherate). In some embodiments, hydrolyzing the glucosamine-containing polysaccharide starting material comprises combining the glucosamine-containing polysaccharide starting material with triflic acid.

The concentration of the acid in the hydrolysis reaction mixture may range, for example, from about 0.1 M to about 5M, e.g., from about 0.1 M to about 4 M, or from about 0.25 M to about 3 M, or from about 0.5 M to about 2.5 M, or from about 0.8 M to about 2.2 M, or from about 1M to about 2M. In some embodiments, the hydrolysis mixture contains triflic acid at a concentration of around 2 M. In some embodiments, the hydrolysis mixture contains triflic acid at a concentration of around 1 M. The concentration of the polysaccharide starting material may vary, for example, from about 1% (w/w) to about 50% (w/w), or from about 5% (w/w) to about 45% (w/w), or from about 10% (w/w) to about 35% (w/w), or from about 15% (w/w) to about 25% (w/w), based on the total weight of the hydrolysis reaction mixture. In some embodiments, the concentration of the polysaccharide starting material (e.g., sodium heparinate) in the hydrolysis reaction mixture is about 20% (w/w). Higher or lower concentrations of the starting material may be employed depending on factors such as the identity of the particular polysaccharide and the identity and/or amount of the acid. The hydrolysis may be conducted for periods of time ranging from a few minutes to several hours (e.g., from about 5 to about 8 hours, or from about 5 hours to about 10 hours, or from about 4 hours to about 12 hours, or from about 2 hours to about 18 hours, or from about 1 hour to about 24 hours) at temperatures ranging from about 80° C. to about 120° C., or from about 75° C. to about 150° C., or from about 50° C. to about 200° C. In some embodiments, the hydrolysis reaction is conducted for about 6 hours at about 100° C.

Depending on the reaction conditions employed, oligosaccharide intermediates in some embodiments may include trisaccharides, tetrasaccharides or other oligosaccharides containing GlcN moieties and GlcA and/or IdoA moieties. In some embodiments, for example, the oligosaccharide intermediate is selected from the group consisting of GlcA-GlcN-IdoA, GlcN-IdoA-GlcN-IdoA, and GlcN-GlcA-GlcN-IdoA. In some embodiments, the trisaccharide or tetrasaccharide is obtained by hydrolyzing heparin or another polysaccharide starting material for 1-15 minutes, 1-30 minutes, 1-60 minutes, 1-120 minutes, 1-180 minutes, or 1-120 minutes, using a triflic acid concentration no greater than 1 M, 0.75 M, 0.5 M, 0.25 M, 0.1 M, 0.05 M, or 0.01 M.

The polysaccharide may be selected so as to provide a particular oligosaccharide intermediate or oligosaccharide product. In some embodiments, for example, the glucosamine-containing polysaccharide starting material is heparin, a heparinate, or N-acylated heparin, and the oligosaccharide intermediate is a GlcN-IdoA disaccharide intermediate. In some embodiments, the glucosamine-containing polysaccharide starting material is heparosan, and the oligosaccharide intermediate is a GlcA-GlcN disaccharide intermediate.

In some embodiments, N-acylated heparin is employed as the polysaccharide starting material and is obtained via N-desulfation and N-acylation of heparin or a heparinate. N-acylated heparin may be prepared, for example, as described by Danishefsky et al. (*Arch. Biochem. Biophys.* 1960, 90, 114-121). Advantageously, however, the hydrolysis may be conducted with native heparin that is not subjected to N-desulfation and N-acylation. This is due, in part, to the unexpected finding that N-acyl groups in GlcNAc are not required for promotion of glycosidic bond cleavage. As described in more detail below, neighboring group participation by acetyl groups was previously understood to promote bond cleavage in glycosaminoglycans such as chondroitin sulfate. Direct hydrolysis of heparin according to the present methods, without desulfation and acylation steps, provides straightforward and economical access to GlcN-IdoA and related intermediates for the preparation of diversified products.

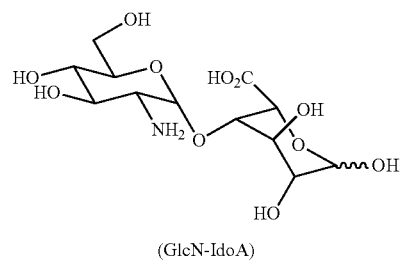 [SMILES: NC1C(OC2C(C(=O)O)OC(O)C(O)C2O)OC(CO)C(O)C1O]

(GlcN-IdoA)

In some embodiments, converting step (b) comprises esterifying GlcN-IdoA to provide a GlcN-IdoA ester. For example, the GlcN-IdoA ester may have a structure according to the formula:

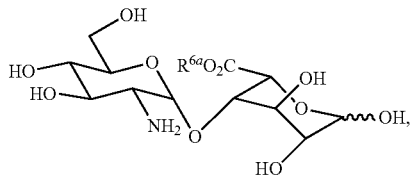

wherein $R^{6a}$ is $C_{1-8}$ alkyl. $R^{6a}$ may be, e.g., methyl, ethyl n-propyl, isopropyl, n-butyl, isobutyl, sec-butyl, tert-butyl, n-pentyl, branched pentyl, n-hexyl, branched hexyl, n-heptyl, branched heptyl, n-octyl, or branched octyl. In some embodiments, $R^{6a}$ is methyl.

Intermediates and products containing IdoA esters and/or GlcA esters can be prepared by esterification with methanol or another suitable alcohol. Typically, an acid will be employed to promote esterification of the IdoA or GlcA. Examples of suitable acids include, but are not limited to, mineral acids (e.g., hydrochloride acid, sulfuric acid, nitric acid, or the like), as well as carboxylic acids and sulfonic acids as described above. In certain instances, a hydrohalic acid (e.g., HCl) may be generated in the reaction mixture by combining the alcohol with an acid chloride (e.g., acetyl chloride). Typically, an excess of the alcohol and acid (e.g., 1.1-100 molar equivalents with respect to the oligosaccharide intermediate, or more) will be employed. The esterification reaction will typically be conducted at temperatures ranging from around 20° C. to about 200° C. for a period of time sufficient to form the esterified intermediate. The reaction can be conducted for a period of time ranging from a few minutes to several hours or longer depending, for example, on the particular oligosaccharide intermediate used in the reaction. For example, the esterification reaction can be conducted for around 10 minutes, or around 30 minutes, or around 1 hour, or around 2 hours, or around 4 hours, or around 8 hours, or around 10 hours, or around 12 hours at around 25° C., or around 70° C., or around 100° C.

In some embodiments, converting step (b) further comprise acylating a GlcN-IdoA ester to provide a per-acylated GlcN-IdoA ester as the disaccharide product. The per-acylated GlcN-IdoA ester may have a structure according to the formula:

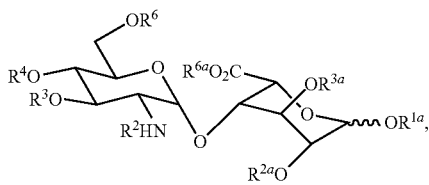

wherein $R^{6a}$ is $C_{1-8}$ alkyl as described above (e.g., methyl) and $R^2$, $R^3$, $R^4$, $R^6$, $R^{1a}$, $R^{2a}$, and $R^{3a}$ are independently $C_{2-8}$ acyl (e.g., acetyl or pivaloyl) or $C_{7-13}$ aroyl (e.g., benzoyl, naphthoyl, or biphenyl-4-carbonyl).

Per-acylated oligosaccharide products can be prepared by acylating the corresponding intermediates (e.g., GlcN-IdoA methyl ester) with an acylating agent. Any acylating agent suitable for forming the per-acylated product can be used in the methods provided herein. Examples of suitable acylating agents include acid anhydrides (e.g., acetic anhydride), acid chlorides (e.g., acetyl chloride, pivaloyl chloride, benzoyl chloride), activated esters (e.g., pentafluorophenyl esters or hydroxybenzotriazole esters of a carboxylic acid such as acetic acid or benzoic acid), and carboxylic acids used with coupling agents such as dicyclohexylcarbodiimide or carbonyl diimidazole. Typically, an excess of the acylating agent (e.g., 1.1-100 molar equivalents of the acylating agent with respect to the oligosaccharide intermediate, or more) will be used. For example, 10 or more molar equivalents of the acylating agent (e.g., acetic anhydride) with respect to the oligosaccharide intermediate may be used to form a per-acylated oligosaccharide product (e.g., per-acetylated GlcN-IdoA methyl ester).

A base can be used to promote acylation of the intermediate by the acylating agent. Examples of suitable bases include potassium carbonate, sodium carbonate, sodium acetate, Huenig's base (i.e., N,N-diisopropylethylamine), lutidines including 2,6-lutidine (i.e., 2,6-dimethylpyridine), triethylamine, tributylamine, pyridine, 2,6-di-tert-butylpyridine, 1,8-diazabicycloundec-7-ene (DBU), quinuclidine, and the collidines. Combinations of two or more bases can be used.

In some embodiments, the oligosaccharide intermediate is combined with an acylating agent such as acetic anhydride, optionally with a base such as pyridine, without an additional solvent. Alternatively, solvents including, but not limited to, toluene, methylene chloride, ethyl acetate, acetonitrile, tetrahydrofuran, benzene, chloroform, diethyl ether, dimethyl formamide, dimethyl sulfoxide, petroleum ether, and mixtures thereof may be combined with the other components of the acylation reaction mixture. The acylation reaction is typically conducted at temperatures ranging from around −40° C. to about 100° C. for a period of time sufficient to form the per-acylated oligosaccharide. The reaction can be conducted for a period of time ranging from a few minutes to several hours or longer, depending on the particular intermediate and acylating agent used in the reaction. For example, the reaction can be conducted for around 10 minutes, or around 30 minutes, or around 1 hour, or around 2 hours, or around 4 hours, or around 8 hours, or around 10 hours, or around 12 hours at around −5° C., or around 0° C., or around 20° C.

In some embodiments, converting step (b) comprises: esterifying the GlcN-IdoA to provide a GlcN-IdoA ester, and acylating the GlcN-IdoA ester to provide a per-acylated GlcN-IdoA ester as the oligosaccharide product.

B. Epimerization of Sugar Acids in Oligosaccharides

As described in more detail below, preferential cleavage of particular glycosidic bonds (e.g., the c1-4 bond of an IdoA-GlcN subunit in heparin, or the 131-4 bond of a GlcN-GlcA subunit in heparosan) may be observed depending on the polysaccharide starting material employed in the hydrolysis reaction. As a result, disaccharides and other intermediates obtained via hydrolysis have now been found to contain a particular sugar acid (IdoA or GlcA) certain positions, e.g., at either the reducing end or the non-reducing end of a disaccharide. Additional intermediates, e.g., disaccharides having either sugar acid at either end, may be prepared by epimerizing the intermediates obtained via hydrolysis. This strategy expands the array of useful materials available for the preparation of complex carbohydrates.

In some embodiments, converting a disaccharide intermediate to a disaccharide product includes epimerizing a per-acylated GlcN-IdoA ester, e.g.,

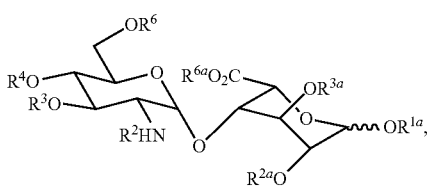

to provide a per-acylated GlcN-GlcA ester, e.g.,

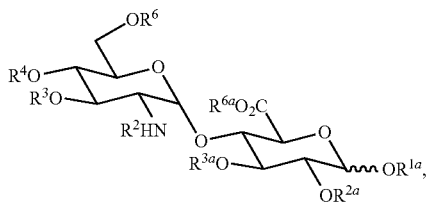

as the disaccharide product.

In some embodiments, epimerizing the intermediate (e.g., a disaccharide intermediate) includes halogenating the IdoA moiety in the intermediate and eliminating the resulting halide to provide a GlcA moiety in the intermediate. An organohalide such a N-bromosuccinimide (NBS) or N-iodosuccinimide (NIS) can be employed with a radical initiator such as azobisisobutyronitrile (AIBN), triethylborane, di-tert-butyl peroxide, or the like to effect the radical halogenation of the α-carbon adjacent to the IdoA carboxylate, which can then be eliminated using a reducing agent. Suitable reducing agent include, but are not limited to, metal hydrides (e.g., tributyltin hydride, triphenyltin hydride, and the like), borohydrides, metal carbonyls (e.g., iron pentacarbonyl and the like), and sodium dithionite.

Typically, 1-50 molar equivalents of an organohalide such as NBS with respect to the intermediate (e.g., a disaccharide intermediate) will be used for forming the halogenated intermediate. For example, 1-20 molar equivalents of the organohalide or 1-10 molar equivalents of the organohalide can be used. In some embodiments, around 1, 2, 3, 4, 5, 6, 7, 8, 9, or 10 molar equivalents of the organohalide (e.g., NBS) with respect to the intermediate is used to form the halogenated intermediate (e.g., per-acetylated GlcN-(α-bromo)IdoA methyl ester). The halogenation reaction is typically conducted at temperatures ranging from around 0° C. to about 50° C. for a period of time ranging from a few minutes to a few hours. For example, the reaction can be conducted for around 10 minutes, or around 30 minutes, or around 1 hour, or around 2 hours, or around 4 hours, at around 20° C., or around 25° C.

Dehalogenation may be conducted by combining the halogenated intermediate (e.g., per-acetylated GlcN-(α-bromo)IdoA methyl ester) with the reducing agent and the radical initiator under conditions sufficient to eliminate the halide, thereby epimerizing the sugar acid (e.g., converting (α-bromo)IdoA to GlcA). Typically, 1-25 molar equivalents of a reducing agent such as tributyltin hydride with respect to the halogenated intermediate will be used for eliminating the halogen, along with a catalytic amount of the radical initiator such as AIBN or triethyl borane. For example, 1-10 molar equivalents of the reducing agent or 1-5 molar equivalents of the reducing agent can be used with the radical initiator. In some embodiments, around 1, 2, 3, 4, or 5 molar equivalents of the reducing agent (e.g., tributyltin hydride) with respect to the halogenated intermediate is used with the reducing agent (e.g., AIBN or triethylborane) to form the corresponding epimer (e.g., per-acetylated GlcN-GlcA methyl ester). The elimination reaction is typically conducted at temperatures ranging from around 20° C. to about 200° C. (e.g., about 80-120° C.) for a period of time ranging from a few minutes to a few hours. For example, the reaction can be conducted for around 10 minutes, or around 30 minutes, or around 1 hour, or around 2 hours, at temperature of around 100-110° C.

C. Synthetic Transformations of Oligosaccharides

Naturally-occurring glycosaminoglycans exhibit varied patterns of amine substitution differing, for example, in the number and position of N-acetylated and N-sulfated amino sugars. The methods of the present disclosure provide flexible routes for selectively modifying oligosaccharide amino moieties. For example, a GlcN amino group may be selectively protected or converted to an azide for subsequent chemical manipulation as described below.

In some embodiments, a disaccharide intermediate may be converted to an N-protected intermediate by protecting a GlcN-IdoA ester as described above, e.g.,

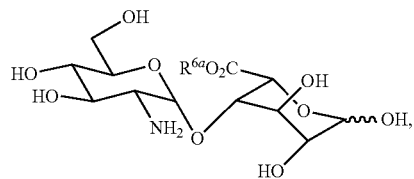

to provide an N-protected GlcN-IdoA ester, e.g.,

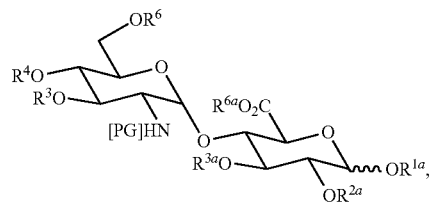

wherein the moiety [PG] is an amine protecting group. Examples of amine protecting groups include, but are not limited to, benzyloxycarbonyl; 9-fluorenylmethyloxycarbonyl (Fmoc); tert-butyloxycarbonyl (Boc); allyloxycarbonyl (Alloc); p-toluene sulfonyl (Tos); 2,2,5,7,8-pentamethyl-chroman-6-sulfonyl (Pmc); 2,2,4,6,7-pentamethyl-2,3-dihydrobenzofuran-5-sulfonyl (Pbf); mesityl-2-sulfonyl (Mts); 4-methoxy-2,3,6-trimethylphenylsulfonyl (Mtr); acetamido; phthalimido; and the like. Other known amine protecting groups including, for example, those described by Green and Wuts (*Protective Groups in Organic Synthesis*, 4$^{th}$ Ed. 2007, Wiley-Interscience, New York) may also be employed. The N-protected GlcN-IdoA ester may then be acylated as described above to provide a per-acylated N-protected GlcN-IdoA ester as the disaccharide product.

In some embodiments, converting step (b) comprises: esterifying the GlcN-IdoA to provide a GlcN-IdoA ester, protecting the GlcN-IdoA ester to provide an N-protected GlcN-IdoA ester, and acylating the N-protected GlcN-IdoA ester to provide a per-acylated N-protected GlcN-IdoA ester as the disaccharide product. The N-protected intermediates may be subjected to epimerization as described above. In some such embodiments, converting step (b) further comprises epimerizing the per-acylated N-protected GlcN-IdoA ester to form a per-acylated N-protected GlcN-GlcA ester as the disaccharide product.

In some embodiments, an azide may be reacted with a GlcN-IdoA ester as described above, e.g.,

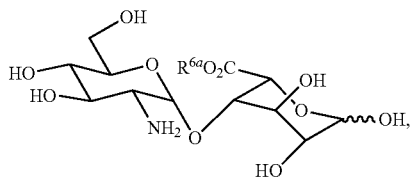

to provide a GlcN$_3$-IdoA ester, e.g.,

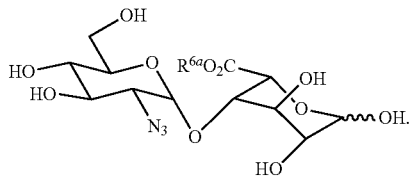

A number of azides may be used in the methods. Examples of suitable azides include inorganic azides (e.g., sodium azide, lithium azide, and the like), azide sulfonates (e.g., trifluoromethanesulfonylazide, p-toluenesulfonylazide, and the like), and commercially available azide exchange resins such as azide-functionalized Amberlite® resins. The GlcN$_3$-IdoA ester may then be acylated as described above to provide a per-acylated GlcN$_3$-IdoA ester, e.g.,

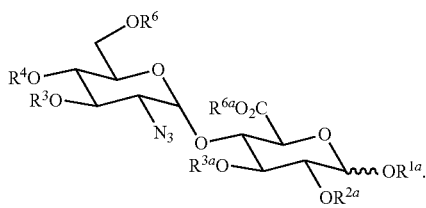

In some embodiments, converting step (b) comprises esterifying the GlcN-IdoA to provide a GlcN-IdoA ester, reacting the GlcN-IdoA ester with an azide to provide a GlcN$_3$-IdoA ester, and acylating the GlcN$_3$-IdoA ester to provide a per-acylated GlcN$_3$-IdoA ester as the disaccharide product. The azide-functionalized intermediates may be subjected to epimerization as described above. In some such embodiments, converting step (b) further comprises epimerizing the per-acylated GlcN$_3$-IdoA ester to provide a per-acylated GlcN$_3$-GlcA ester as the disaccharide product.

At various points during subsequent synthetic steps, a GlcN$_3$ moiety may be reduced (e.g., using hydrogen and a heterogenous or homogenous palladium catalyst; or using a silane such as triethylsilane, optionally in combination with reagents such as indium trichloride or borontrifluoride diethyl etherate) to provide the original GlcN moiety containing a free amino group. The amino group may be then be protected as described above or otherwise derivatized (e.g., via acylation or sulfation).

By employing the steps described above, a number of oligosaccharide products may be obtained. In some embodiments, the oligosaccharide product is a GlcN-IdoA compound having a structure according to Formula Ia:

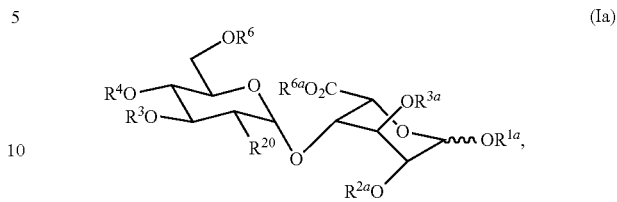

wherein:
R$^{20}$ is —NHR$^2$ or —N$_3$, wherein R$^2$ is C$_{2-8}$ acyl, C$_{7-13}$ aroyl, hydrogen, or an amine protecting group;
R$^4$ is C$_{2-8}$ acyl, C$_{7-13}$ aroyl, or hydrogen;
R$^3$ and R$^6$ are independently C$_{2-8}$ acyl, C$_{7-13}$ aroyl, or hydrogen
R$^{1a}$, R$^{2a}$, and R$^{3a}$ are independently C$_{2-8}$ acyl, C$_{7-13}$ aroyl, or hydrogen; and
R$^{6a}$ is C$_{1-8}$ alkyl or hydrogen.

Disaccharides and other carbohydrate oligomers provided herein may be obtained as β-anomers, α-anomers, or mixtures thereof. Disaccharides according to Formula Ia, for example, may contain —OR$^{1a}$ moieties in the β-position, as shown below:

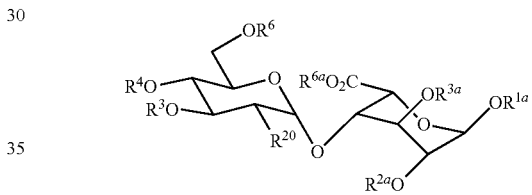

or —OR$^{1a}$ moieties in α-position:

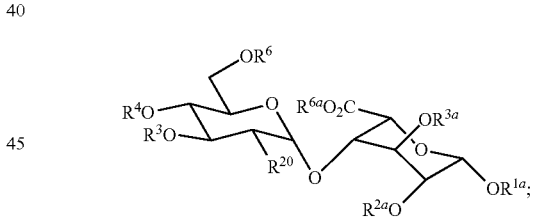

or —OR$^{1a}$ moieties in both positions. In some embodiments, R$^{1a}$ is H in a GlcN-IdoA disaccharide intermediate following polysaccharide hydrolysis, and the intermediate contains —OR$^{1a}$ moieties in both anomeric positions. In some embodiments, R$^{1a}$ is C$_{2-8}$ acyl or C$_{7-13}$ aroyl in a GlcN-IdoA disaccharide product following an acylation step, and the product contains —OR$^a$ moieties in the β-position. Unless otherwise specified, compounds having anomeric bonds depicted as wavy lines (e.g., in disaccharides according to Formula Ia, Formula Ib, Formula IIa, and Formula IIb) are intended to encompass isolated β-anomers, isolated α-anomers, and mixtures containing any ratio of both anomers.

In some embodiments, the oligosaccharide product is a GlcN-IdoA ester, wherein R$^{20}$ is —NHR$^2$ and R$^{6a}$ is C$_{1-8}$ alkyl. In some embodiments, R$^{6a}$ is a methyl. In some embodiments, the oligosaccharide product is a per-acylated GlcN-IdoA ester, wherein R$^{20}$ is —NHR$^2$; R$^2$, R$^3$, R$^4$, R$^6$, R$^{1a}$, R$^{2a}$, and R$^{3a}$ are C$_{2-8}$ acyl or C$_{7-13}$ aroyl; and R$^{6a}$ is $C_{1-8}$ alkyl. Each of $R^2$, $R^3$, $R^4$, $R^6$, $R^a$, $R^{2a}$, and $R^{3a}$ may be, for example, acetyl, pivaloyl, or benzoyl.

In some embodiments, $R^{20}$ is —$NHR^2$; $R^2$, $R^3$, $R^4$, $R^6$, $R^a$, $R^{2a}$, and $R^{3a}$ are acetyl; and $R^{6a}$ is methyl.

In embodiments where an epimerization step is employed, the oligosaccharide product may be a GlcN-GlcA compound having a structure according to Formula Ib:

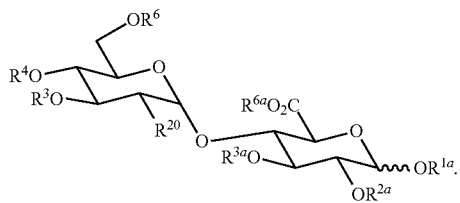

(Ib)

In some embodiments, the oligosaccharide product is a $GlcN_3$-IdoA compound according to Formula Ia or a $GlcN_3$-GlcA compound according to Formula Ib, wherein $R^{20}$ is —$N_3$. In some embodiments, the methods further include reducing —$N_3$ to form —$NH_2$. In some embodiments, the methods further include converting —$NH_2$ to —NHC(O)CF$_3$.

As explained above, heparosan may also be used as a polysaccharide starting material in the methods. It has now been found that hydrolysis of heparosan as described herein provides GlcA-GlcN as a principal disaccharide intermediate. Hydrolysis, esterification, acylation, protection, and other steps may be conducted largely as described above with respect to heparin. Certain amounts of GlcA-GlcNAc may also be present in hydrolysis product mixtures.

In some embodiments, the glucosamine-containing polysaccharide starting material is heparosan, GlcA-GlcN is the disaccharide intermediate, and converting step (b) comprises: esterifying the GlcA-GlcN to provide a GlcA-GlcN ester, and acylating the GlcA-GlcN ester to form a per-acylated GlcA-GlcN ester. In some embodiments, converting step (b) further comprises epimerizing the per-acylated GlcA-GlcN ester to form a per-acylated IdoA-GlcN ester. In some embodiments, converting step (b) comprises esterifying the GlcA-GlcN to provide a GlcA-GlcN ester, reacting the GlcA-GlcN ester with an azide to provide a GlcA-GlcN$_3$ ester, and acylating the GlcA-GlcN$_3$ ester to provide a per-acylated GlcA-GlcN$_3$ ester as the olgiosaccharide product. Esterification, acylation, and epimerization can be conducted as described above.

In some embodiments, the oligosaccharide product has a structure according to Formula IIa:

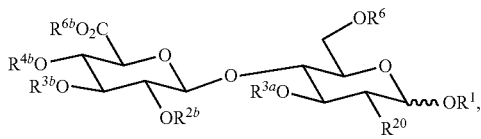

(IIa)

wherein
$R^1$ is $C_{2-8}$ acyl, $C_{7-13}$ aroyl, or hydrogen;
$R^{20}$ is —$NHR^2$ or —$N_3$, wherein $R^2$ is $C_{2-8}$ acyl, $C_{7-13}$ aroyl, hydrogen, or an amine protecting group;
$R^3$ and $R^6$ are independently $C_{2-8}$ acyl, $C_{7-13}$ aroyl, or hydrogen;

$R^{2b}$, $R^{3b}$, and $R^{4b}$ are independently $C_{2-8}$ acyl, $C_{7-13}$ aroyl, or hydrogen; and
$R^{6b}$ is $C_{1-8}$ alkyl or hydrogen.

In some embodiments, $R^1$, $R^2$, $R^3$, $R^6$, $R^{2b}$, $R^{3b}$, and $R^{4b}$ are acetyl, and $R^{6b}$ is methyl.

In some embodiments, the method further includes epimerizing the disaccharide product according to Formula IIa, thereby obtaining a disaccharide product according to Formula IIb:

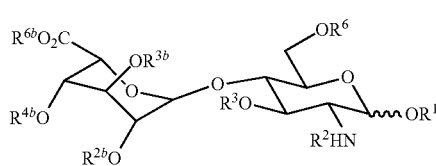

(IIb)

Products obtained via the methods disclosed herein are useful materials for the preparation of chemically diverse carbohydrates. The hydroxyl groups and amino groups of the products may be selectively protected and deprotected, making them particularly useful for the preparation of larger oligomers with defined sulfation and/or acetylation patterns.

A number of orthogonally reactive groups may be selectively installed at oligosaccharide hydroxyl groups including, but not limited to, 9-fluorenylmethoxycarbonyl (Fmoc) groups, monochloroacetyl (MCA) groups, tert-butyldiphenylsilyl (TBDPS) groups, benzoyl (Bz) groups, benzyl (Bn) groups, p-methoxyphenyl (PMP) groups, levulinoyl (Lev) groups, naphthyl (Naph) groups, (2-naphthyl)methyl (Nap) groups, and 2,2,2-trichloroethoxycarbonyl (Troc) groups. Such groups may be installed, for example, via conversion of an $R^3$ group, an $R^4$ group, an $R^6$ group, an $R^{1a}$ group, an $R^{2a}$ group, an $R^{3a}$ group in compounds of Formula Ia or Formula Ib; or via conversion of an $R^1$ group, an $R^3$ group, an $R^6$ group, an $R^{2b}$ group, an $R^{3b}$ group, an $R^{4b}$ group in compounds of Formula IIa or Formula IIb; or via conversion of any combination thereof. Other functional groups including, but not limited to, those described by Dimakos et al. (*Chem. Rev.* 2018, 118, 11457-11517) may be used to selectively address hydroxyl groups in the oligosaccharides provided herein. Similarly, a number of orthogonally reactive groups including, but not limited to, trifluoroacetyl (TFA) groups, tert-butyoxycarbonyl (Boc) groups, and Fmoc groups may be installed at amino groups (e.g., via conversion of $R^2$ group in compounds of Formula Ia, Ib, IIa, or IIb).

In some embodiments, the methods further include converting an —$OR^4$ moiety and an —$OR^6$ moiety in a GlcN or GlcN$_3$ to an acetal. In some embodiments, the methods further include converting the acetal to an —$OR^4$ moiety, wherein $R^4$ is benzoyl, and an —$OR^6$ moiety, wherein $R^6$ is silyl (e.g., tert-butyldiphenylsilyl). In some embodiments, the methods further include converting the acetal to an —$OR^4$ moiety, wherein $R^4$ is hydrogen, and an —$OR^6$ moiety, wherein $R^6$ is methyl or substituted methyl (e.g., Nap). In some embodiments, $R^3$ in a GlcN moiety or a GlcN$_3$ moiety is converted to benzyl.

In some embodiments, the method includes converted $R^{2a}$ or $R^{2b}$ in an IdoA moiety or GlcA moiety to benzoyl, 9-fluorenylmethoxycarbonyl, or 2,2,2-trichloro-ethoxycarbonyl. In some embodiments, the method includes converting one or more benzoyl groups to levulinoyl and/or 9-fluorenylmethoxycarbonyl.

In some embodiments, the method includes converting $R^{3a}$ or $R^{3b}$ in an IdoA moiety or GlcA moiety to monochloroacetyl. In some embodiments, the method includes converting $R^{3a}$ in an IdoA moiety or GlcA moiety to benzyl.

In some embodiments, disaccharides according to Formula III are provided:

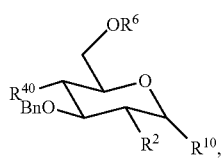
(III)

wherein:
(i) $R^2$ is selected from the group consisting of —NHC(O)CF$_3$ and —N$_3$;
(ii) $R^6$ is selected from the group consisting of (2-naphthyl)methyl and tert-butyldiphenylsilyl; and
(iii) (a) $R^{10}$ is an iduronic acid moiety:

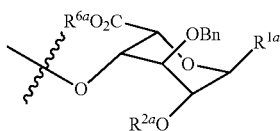

or a glucuronic acid moiety:

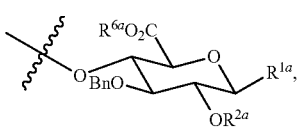

wherein:
$R^{1a}$ is selected from the group consisting of —OR$^L$ and —SR$^T$, wherein R$^L$ is a linker and R$^T$ is C$_{6-10}$ aryl,
$R^{2a}$ is selected from the group consisting of 9-fluorenylmethoxycarbonyl and levulinoyl, and
$R^{6a}$ is C$_{1-8}$ alkyl; and
(b) $R^{40}$ is —OR$^4$, wherein R$^4$ is hydrogen or C$_{2-8}$ acyl or C$_{7-13}$ aroyl; or
(iv) (a) $R^{10}$ is —OR$^L$ or —SR$^T$, wherein R$^L$ is a linker and R$^T$ is C$_{6-10}$ aryl; and
(b) $R^{40}$ is an iduronic acid moiety:

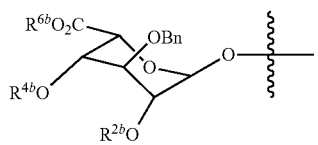

or a glucuronic acid moiety:

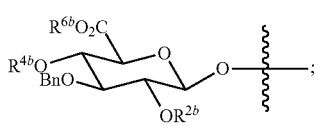

wherein:
$R^{2b}$ is selected from the group consisting of 9-fluorenylmethoxycarbonyl and levulinoyl,
$R^{4b}$ is selected from the group consisting of hydrogen, C$_{2-8}$ acyl, and C$_{7-13}$ aroyl, and
$R^{6b}$ is C$_{1-8}$ alkyl.

In some embodiments, the compound is:

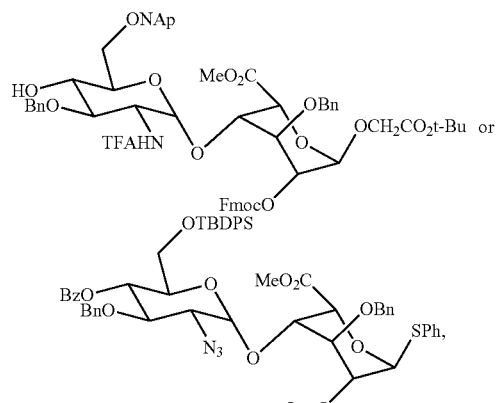

wherein Bz is benzoyl; Bn is benzyl; Fmoc is 9-fluorenylmethoxycarbonyl; Lev is levulinoyl; Nap is (2-naphthyl)methyl; t-Bu is tert-butyl; and TBDPS is tert-butyldiphenylsilyl.

III. Preparation of Higher Order Oligomers

Reducing ends of the oligosaccharide products (e.g., —OR$^{1a}$ moieties in compounds of Formula Ia or Ib, or —OR$^1$ moieties in compounds of Formula IIa or IIb) may be converted to electrophilic groups so as to provide glycosyl donors, e.g., glycosyl halides, thioglycosides, glycosyl imidates, alkynyl glycosides, and glycals, for construction of oligosaccharides, polysaccharides, and other glycosylated materials. In some embodiments, for example, an —OR$^{1a}$ moiety or an —OR$^1$ moiety may be converted to a thiol (e.g., 4-methylbenzenethiol (STol) or the like), an imidate (e.g., trichloroacetimidate or the like), or a halide (e.g., bromide). Other electrophiles including, but not limited to, those described by Das et al. (*Chemistry Open* 2016, 5, 401-433) may be installed to provide glycosyl donors for further synthetic elaboration.

Accordingly, the methods in some embodiments further include converting an —OR$^1$ moiety or an —OR$^{1a}$ moiety to a thiol, a halide, or an imidate. In some embodiments, the method further includes converting the thiol, the halide, or the imidate to an —OR$^L$ moiety, wherein R$^L$ is a linker. For example, the linker may have the formula -L$^1$-R$^{La}$, wherein L$^1$ is C$_{2-8}$ alkylene or 3- to 8-membered heteroalkylene, and wherein R$^{La}$ is a carboxylate, an amine, or a hydroxyl group.

In some embodiments, the method further includes covalently bonding two or more oligosaccharide products to form a higher-order oligomer (e.g., a tetrasaccharide, a pentasaccharide, a hexasaccharide, a heptasaccharide, or an octasaccharide). For example, a glycosyl donor may be prepared by converting an —OR$^{1a}$ moiety in a GlcN-IdoA compound according to Formula Ia to a thiol, a halide, or an imidate. The glycosyl donor may then be reacted with an appropriate glycosyl acceptor. In some embodiments, the glycosyl acceptor is a disaccharide containing a single unprotected hydroxyl group (e.g., a GlcN-IdoA of Formula Ia or a GlcN-GlcA of Formula Ib, wherein one and only one of $R^3$, $R^4$, $R^6$, $R^{1a}$, $R^{2a}$, and $R^{3a}$ is hydrogen; or GlcA-GlcN of Formula IIa or an IdoA-GlcN of Formula IIb, wherein one and only one of $R^1$, $R^3$, $R^6$, $R^{2b}$, $R^{3b}$, and $R^{4b}$ is hydrogen). Compounds according to Formula Ia, Formula Ib, Formula IIa, and Formula IIb, as well as other oligosaccharides provided herein, may be converted to a glycosyl donor and/or a glycosyl acceptor in this fashion and combined with each other to prepare tetrasaccharides, hexasaccharides, octasaccharides, and other larger carbohydrates with GlcN moieties, GlcA moieties, and IdoA moieties arranged in varying patterns. One or more additives can be used to promote to promote coupling of the glycosyl donor and the glycosyl acceptor. Such additives include, but are not limited to, NIS, NBS, bromodimethylsulfonium bromide (BDMS), and O,O-dimethylthiophosphonosulfenyl bromide (DMTPSB) (optionally in conjunction with triflic acid, silver triflate, or the like).

As a non-limiting example, a GlcN-IdoA compound according to the Formula IV:

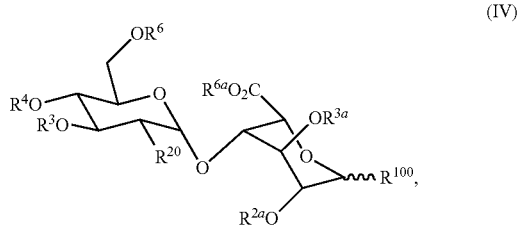

(IV)

wherein $R^{100}$ is a thiol, a halide, or an imidate,
may be combined with a GlcN-IdoA compound according to Formula V:

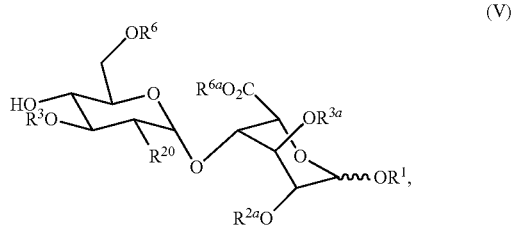

(V)

under conditions sufficient to form a tetrasaccharide according to Formula VI:

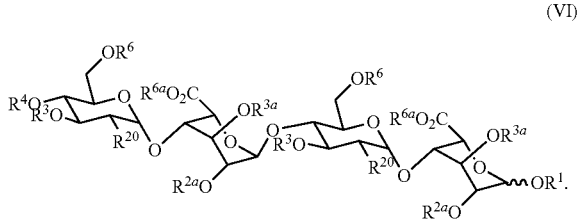

(VI)

Various combinations of orthogonally reactive groups can be installed at specific hydroxyl groups and specific amino groups in the oligosaccharides, allowing for selective manipulation at desired positions. In some embodiments, the methods of the present disclosure further include removing at least one hydroxyl protecting group, at least one amine protecting group, or a combination thereof from the oligomer to provide at least one unprotected hydroxyl group, at least one unprotected amino group, or a combination thereof. As non-limiting examples, TBDPS may be removed from a hydroxyl group (e.g., a 6-hydroxyl group) using HF; Nap may be removed from a hydroxyl group (e.g., a 6-hydroxyl group) using DDQ; Lev may be removed from a hydroxyl group (e.g., a 2-hydroxyl group) using hydrazine; Fmoc may be removed from a hydroxyl group (e.g., a 2-hydroxyl group) using piperidine; Bz may be removed from a hydroxyl group (e.g., a 4-hydroxyl group) via acidic or alkaline hydrolysis; and Bn may be removed from a hydroxyl group (e.g., a 3-hydroxyl group) via hydrogenolysis. 2-Azido groups may be reduce to provide free amines for further modification, while trifluoracetamides may be removed via acidic or alkaline hydrolysis.

Following selective deprotection, free hydroxyl groups and/or amine groups may be further modified, e.g., via sulfation or acetylation. Accordingly, the methods in some embodiments further include sulfating at least one unprotected hydroxyl group, at least one unprotected amino group, or a combination thereof in an oligosaccharide. Sulfation may carried out, for example, using a sulfur trioxide-amine complex (e.g., $SO_3$-pyridine, $SO_3$-triethylamine, and the like) or sulfuric acid (optionally in conjunction with a carbodiimide such as dicyclohexylcarbodiimide).

IV. Examples

Example 1. Expedient Synthesis of Core Disaccharide Building Blocks from Natural Polysaccharides for Heparan Sulfate Oligosaccharide Assembly Naturally occurring heparin is an attractive starting material because it is commercially available (~$14/g) and produced on a large scale for pharmaceutical use. We envisioned that key IdoA-containing building blocks for HS/heparin synthesis might be obtained through the controlled hydrolysis of heparin. However, hydrolysis of heparin under basic conditions results in β-elimination to form unsaturated uronic acid moieties,[5] while nitrous acid-mediated depolymerization of heparin is accompanied by deaminative ring contraction of GlcN.[6] Fortunately, elegant studies by Davidson and Meyer,[7] as well as Lopin and Jacquinet,[8] showed that chondroitin sulfate (CS) could be hydrolyzed using aqueous $H_2SO_4$ to provide GlcA-N-acetylgalactosamine (GalNAc) disaccharides. Selective cleavage of the GalNAc-GlcA bond was presumably facilitated by neighboring group participation from the N-acetyl group of GalNAc.

Figure 2:
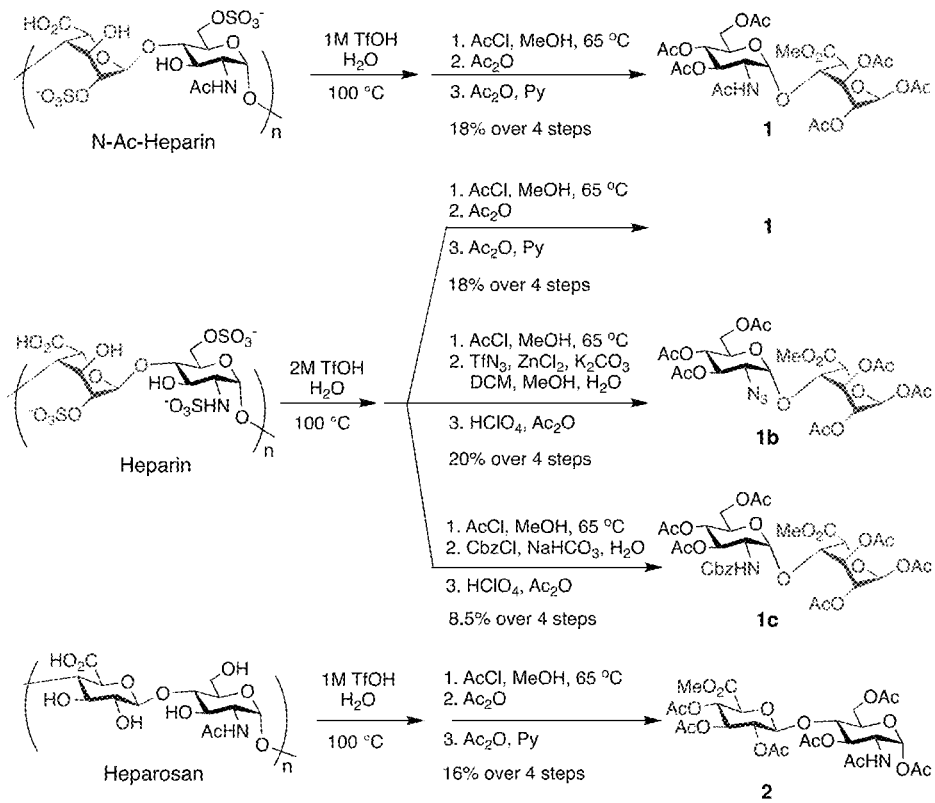
FIG. 2 shows the synthesis of GlcN-IdoA and GlcA-GlcN Building Blocks from Natural Polysaccharides. TfOH=trifluoromethanesulfonic acid, Ac=acetyl, TfN$_3$=trifluoromethanesulfonyl azide, DCM=dichloromethane, CbzCl=benzyl chloroformate.
Figure 3A:
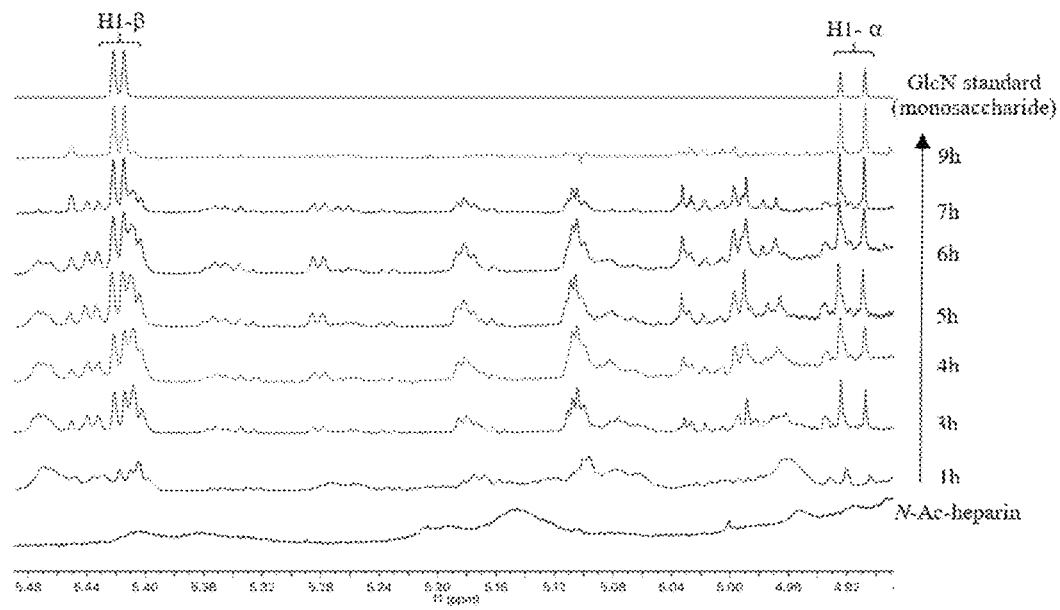
FIG. 3A shows reaction monitoring using $^1$H NMR in D$_2$O (500 MHz) at various time points (1-9 h) during controlled chemical digestion of N—Ac-heparin using 1M TfOH at 100° C.
Figure 3B:
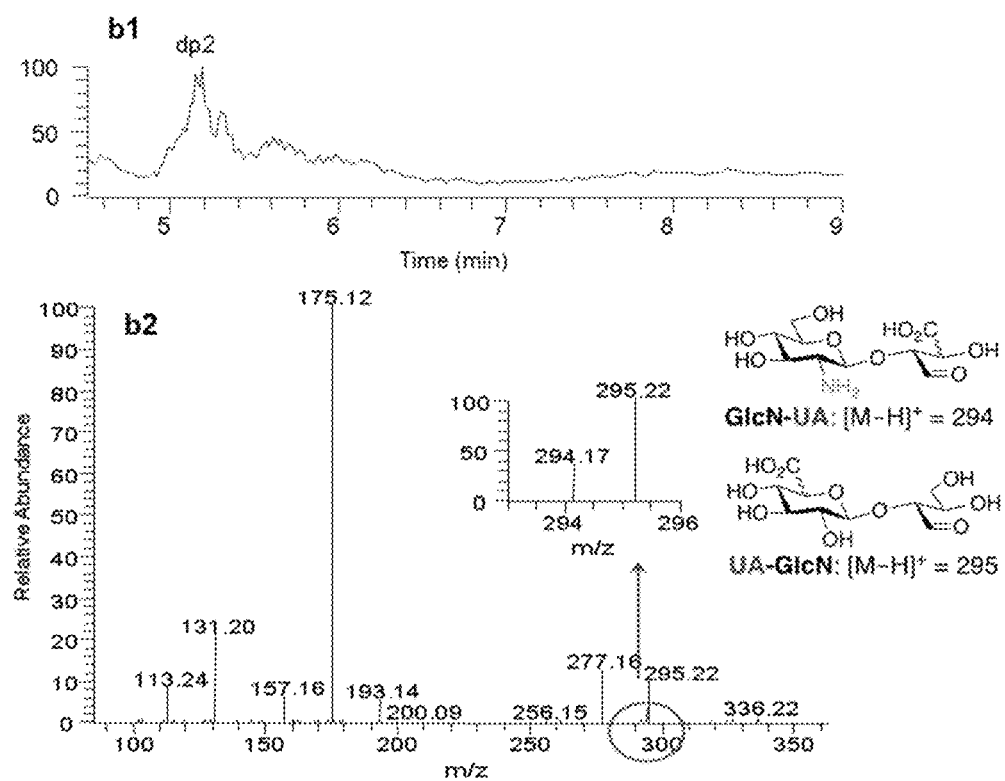
FIG. 3B shows HILIC-FTMS/MS analysis of crude digest after 6 h during controlled chemical digestion of N—Ac-heparin using 1M TfOH at 100° C. (b1) Total ion chromatogram (TIC) of HILIC-MS analysis indicates the extent of digestion, predominantly gave disaccharide (dp2) as a major product ([M−H]$^+$=354); (b2) MS/MS analysis of [M−H]$^+$=354 showed further fragmentation patterns, suggesting possible formation of both disaccharides GlcN-UA ([M−H]$^+$=294) and UA-GlcN ([M−H]$^+$=295)

Encouraged by these reports, we generated N-acetylated (N—Ac) heparin by subjecting sodium heparinate (which is >85% N-sulfated) to N-desulfation and N-acetylation[9] and then explored the ability of various acids (e.g., $H_2SO_4$, TFA, CuCl, TMSOTf, $BF_3Et_2O$, TfOH) to produce intact HS disaccharides. We found that N—Ac-heparin was efficiently hydrolyzed to give disaccharides as the major product using 1 M TfOH at 100° C. for approximately 6 h (FIG. 2 and FIG. 3). The crude free disaccharide was then esterified using AcCl and MeOH, which also resulted in methylation of the anomeric hydroxyl group. Hydrolysis of this methyl glycoside and acetylation of the free hydroxyls using acetic anhydride, followed by treatment with acetic anhydride/pyridine to effect N-acetylation, resulted in peracetylated disaccharide 1.

Figure 4A:
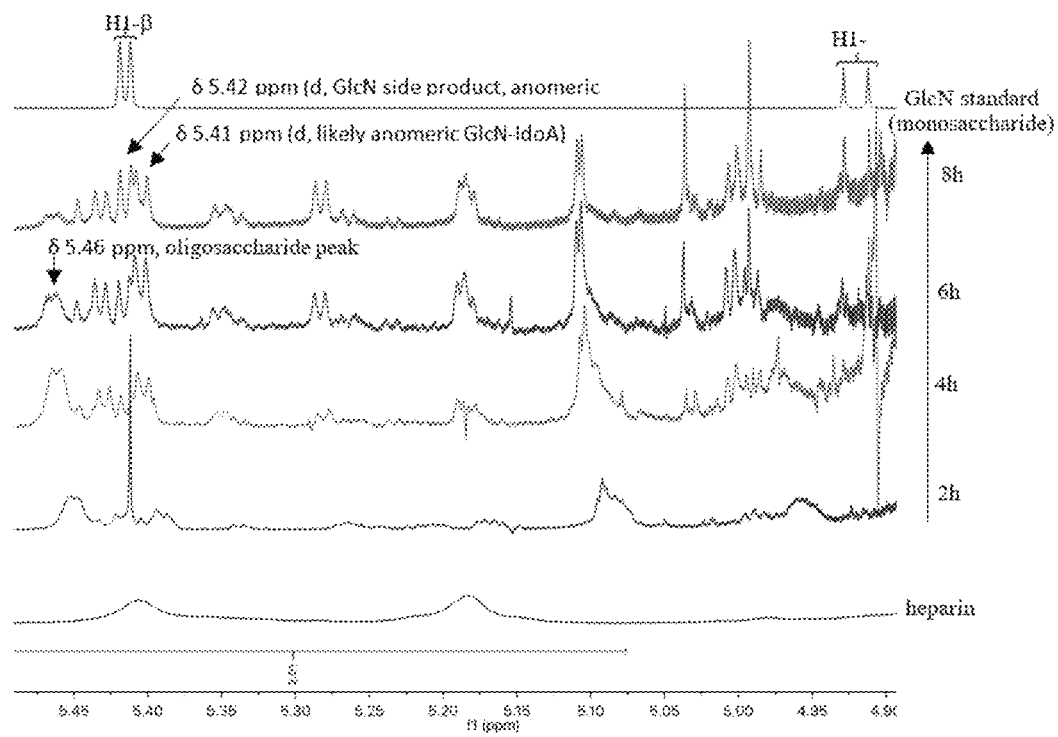
FIG. 4A shows reaction monitoring using $^1$H NMR in D$_2$O (500 MHz) at various time points (2-8 h) during controlled chemical digestion of heparin using 2M TfOH at 100° C.
Figure 4B:
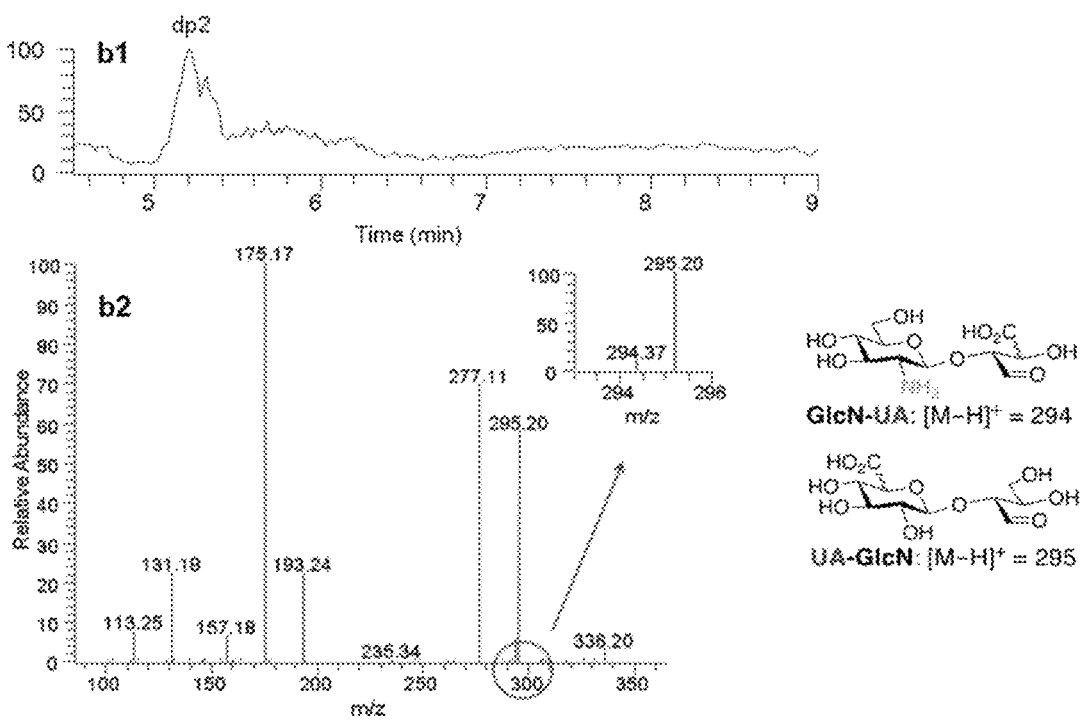
FIG. 4B shows HILIC-FTMS/MS analysis of crude digest during controlled chemical digestion of heparin using 2M TfOH at 100° C. (b1) TIC of HILIC-MS analysis indicates the extent of digestion, predominantly giving disaccharide (dp2) as a major product ([M−H]$^+$=354); (b2) MS/MS analysis of [M−H]$^+$=354 showed further fragmentation patterns, suggesting possible formation of both disaccharides GlcN-UA ([M−H]$^+$=294) and UA-GlcN ([M−H]$^+$=295).

Unexpectedly, NMR structural analysis revealed that cleavage of the glycosidic bond had occurred predominantly at the reducing end of IdoA to give the GlcN-IdoA disaccharide. Formation of the other disaccharide, IdoA-GlcN, was not observed by NMR, although its presence was detected by hydrophilic interaction chromatography-Fourier transform mass spectrometry (HILIC-FTMS) (FIG. 3). These results suggest that the N-acetyl group of heparin does not significantly promote the reaction. As further confirmation that an N-acetyl group was not required, we performed the reaction directly on sodium heparinate. We found that sodium heparinate was efficiently hydrolyzed using 2 M TfOH at 100° C. (FIG. 4). Extensive optimization was conducted to maximize scalability and reproducibility. Starting from 25 g of natural heparin, the key GlcN-IdoA disaccharide 1 was routinely obtained via a one-pot, four-step reaction sequence (single purification step) in 18% overall yield (4.4 g) (FIG. 2, Table 1). Importantly, direct access to this disaccharide obviates the need to perform the notoriously challenging stereoselective 1,2-cis glycosylation reaction[10] to generate GlcN-α(1,4)-IdoA linkages.

The amino groups of HS/heparin are known to be acetylated, sulfated, or unmodified in vivo. Thus, to expand the versatility of the method further, we sought to convert the N-acetamide of 1 to other synthetically useful functionalities. Treatment of the amine with TfN$_3$, K$_2$CO$_3$ and ZnCl$_2$ after the esterification step, followed by anomeric demethylation and peracetylation, resulted in smooth conversion to the desired GlcN$_3$-IdoA disaccharide 1b in 20% yield over the four steps (FIG. 2). From 25 g of heparin, 4.8 g of disaccharide 1b was obtained in the course of 3-4 days (Table 1), highlighting the scalability and practicality of the route. Alternatively, the use of benzyl chloroformate introduced a N-Cbz protecting group in place of the N-acetyl group to give 1c in 8.5% yield over the four steps.

TABLE 1

Controlled hydrolysis of sodium heparinate

| Entry | Reaction scale (g) | TfOH conc. (M) | Time (h) | % Yield$^a$ GlcNAc-IdoA$^b$ | % Yield$^a$ GlcN$_3$-IdoA$^c$ |
|---|---|---|---|---|---|
| 1 | 10 | 2 | 8 | 17% (1.7 g) | — |
| 2 | 20 | 2 | 8 | 18% (3.6 g) | — |
| 3 | 25 | 2 | 8 | 18% (4.4 g) | — |
| 4$^d$ | 50 | 1 | 7 | 16% (7.9 g) | — |
| 5 | 5 | 2 | 8 | — | 17% (0.83 g) |
| 6 | 10 | 2 | 8 | — | 20% (1.9 g) |
| 7 | 20 | 2 | 8 | — | 20% (3.9 g) |
| 8 | 25 | 2 | 8 | — | 20% (4.8 g) |

$^a$Yields were calculated by comparing the weight of the isolated, pure disaccharide product to the weight of the polysaccharide starting material, correcting for minor differences in the relative molecular weights of the average disaccharide found in sodium heparinate (IdoA2S2Na- GlcNS6S2Na; MW 665.38) and the disaccharide product (1: 663.58 or 1b: 647.54).
$^b$Isolated yield for GlcNAc-IdoA (1) over four or six steps.
$^c$Isolated yield for GlcN$_3$-IdoA (1b) over four steps.
$^d$Reaction was performed on N-Ac heparin using 1M TfOH.

Figure 5A:
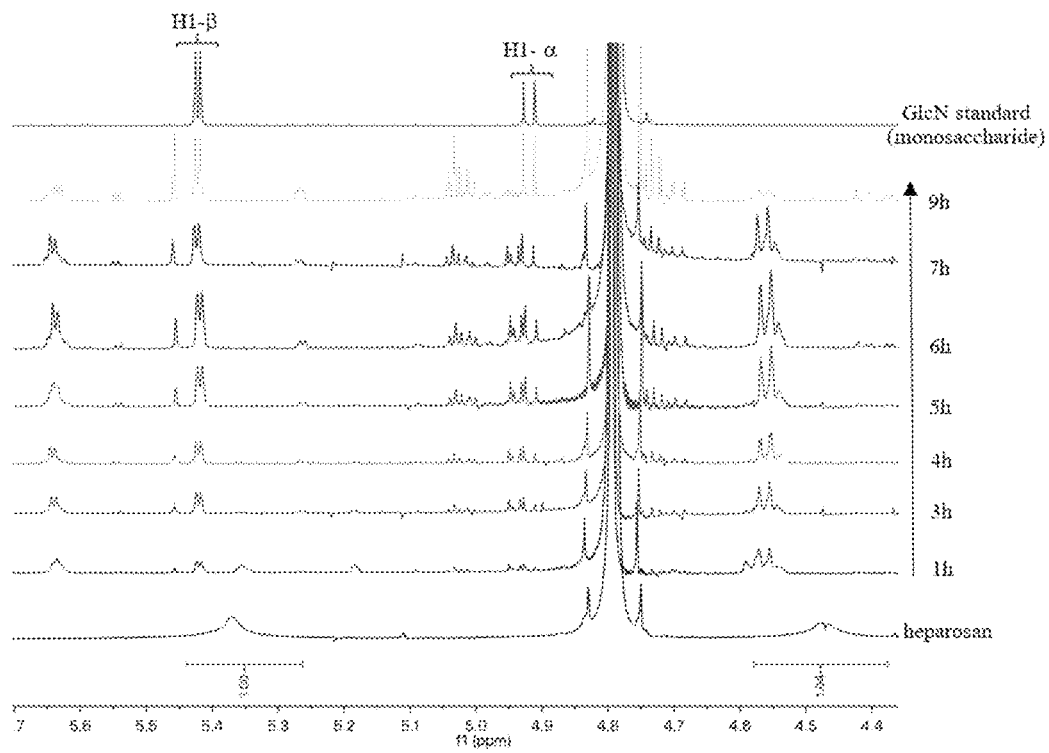
FIG. 5A shows reaction monitoring using $^1$H NMR in D$_2$O (500 MHz) at various time points (1-9 h) during controlled chemical digestion of heparosan using 1M TfOH at 100° C.
Figure 5B:
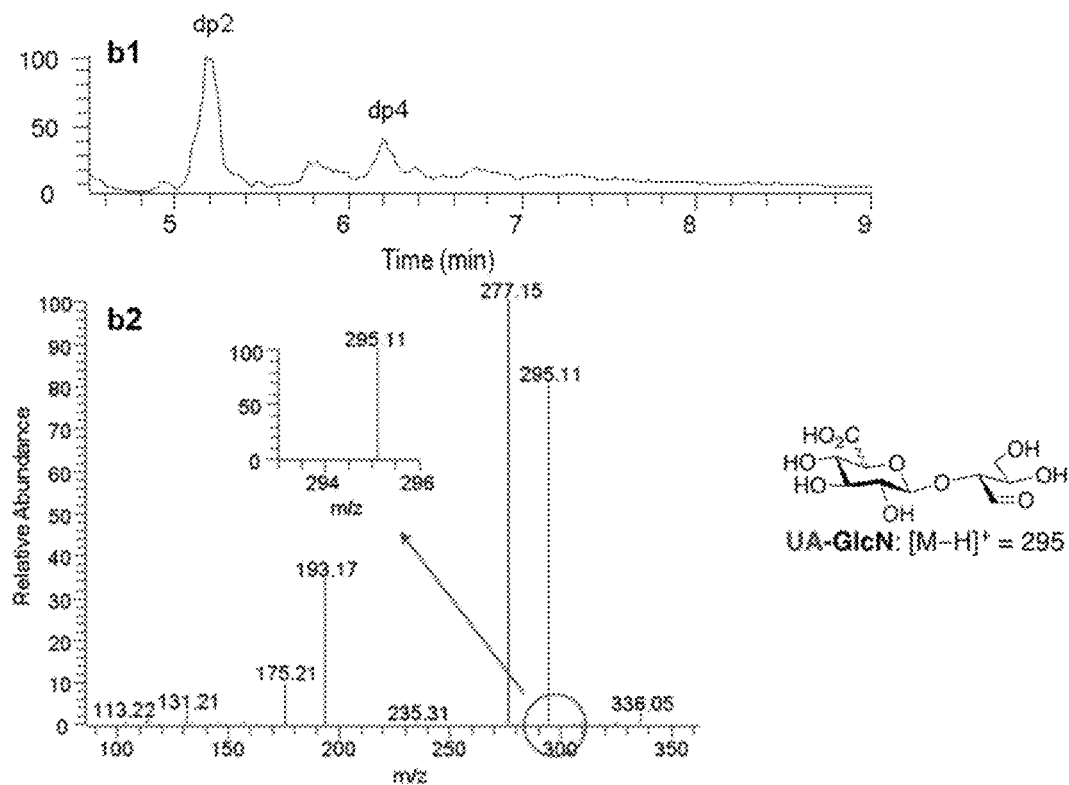
FIG. 5B shows HILIC-FTMS/MS analysis of crude digest after 5 h during controlled chemical digestion of heparosan using 1M TfOH at 100° C. (b1) TIC of HILIC-MS analysis indicates the extent of digestion, predominantly giving disaccharide (dp2) as a major product [M−H]$^+$=354 along with minor tetrasaccharide (dp4) [M−H]$^+$=691; (b2) MS/MS analysis of [M−H]$^+$=354 showed further fragmentation patterns, suggesting formation of only disaccharide UA-GlcN ([M−H]$^+$=295)
Figure 6A:
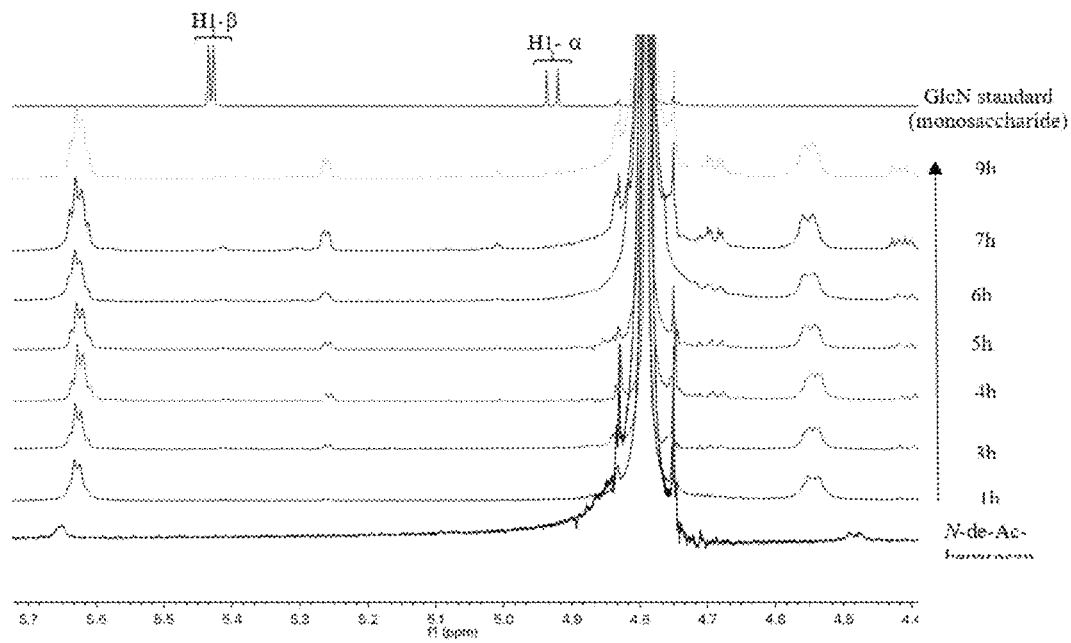
FIG. 6A shows reaction monitoring using $^1$H NMR in D$_2$O (500 MHz) at various time points (1-9 h) during chemical digestion of N-deacetylated heparosan using 1M TfOH at 100° C. No significant change in anomeric peaks of polysaccharide was observed even after 9 h.
Figure 6B:
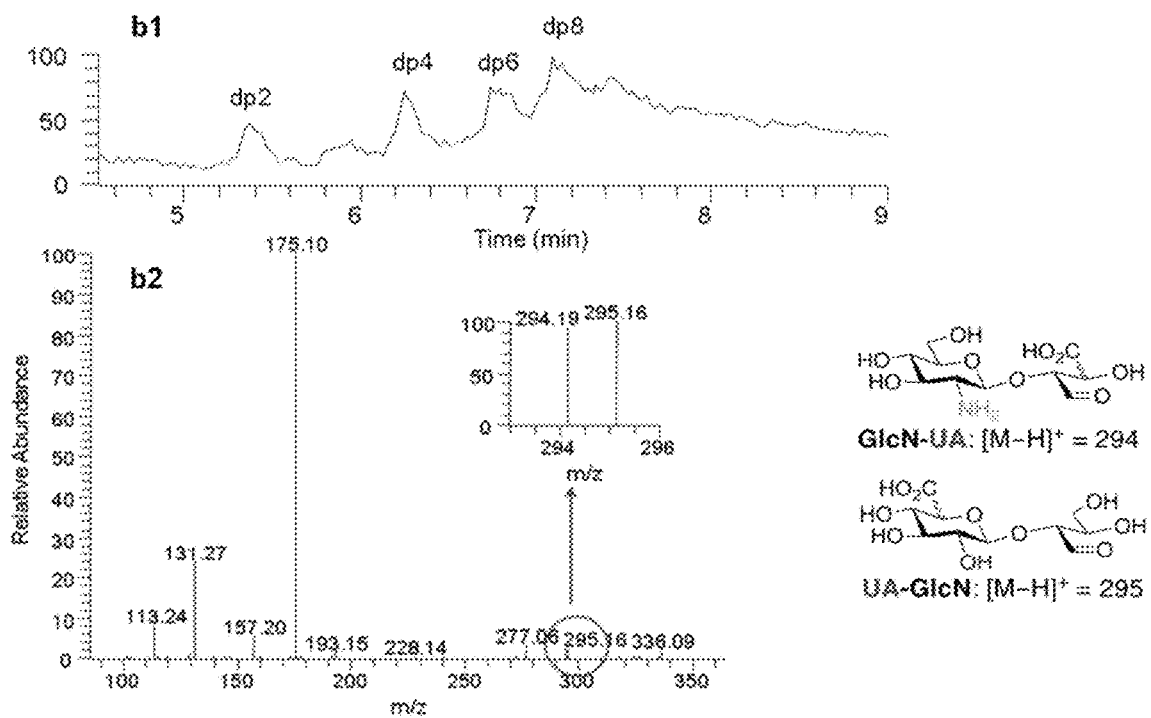
FIG. 6B shows HILIC-FTMS/MS analysis of crude digest during chemical digestion of N-deacetylated heparosan using 1M TfOH at 100° C. (b1) TIC of HILIC-MS analysis indicates the qualitative formation of disaccharide (dp2), tetrasaccharide (dp4), hexasaccharide (dp6), and octasaccharides (dp8); (b2) MS/MS analysis of [M−H]$^+$=354 showed further fragmentation patterns, suggesting possible formation of both disaccharides GlcN-UA ([M−H]$^+$=294) and UA-GlcN ([M−H]$^+$=295)

We next investigated whether we could obtain GlcA-containing disaccharides from heparosan, the biosynthetic precursor to heparin. Large-scale fermentation procedures have been developed for the purification of heparosan (>100 g) from *Escherichia coli* K5.[11] We found that heparosan was efficiently hydrolyzed under slightly milder acidic conditions of 1M TfOH at 100° C. (FIG. 2 and FIG. 5). After esterification and peracetylation using similar conditions as before, the GlcA-GlcN disaccharide 2 was obtained in 16% overall yield (4.9 g) over the four steps (single purification step) starting from 19 g of heparosan. In contrast to heparin, cleavage of the glycosidic bond occurred exclusively at the reducing end of GlcN to afford the GlcA-GlcN disaccharide (FIG. 5). We also observed that N-deacetylated heparosan was hydrolyzed very slowly under the same conditions, suggesting the importance of the N-acetyl group in this case (FIG. 6).

Figure 7A:
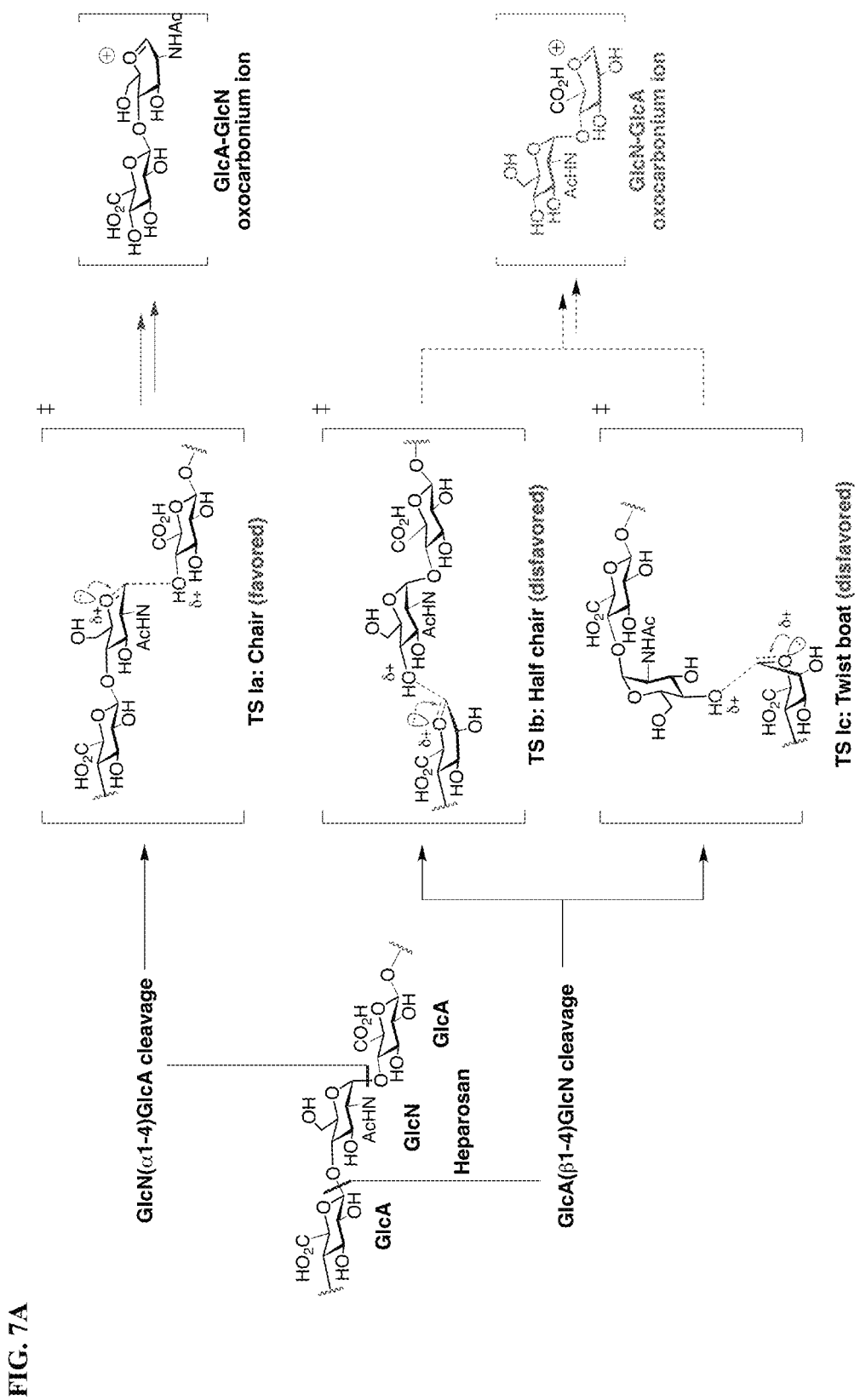
FIG. 7A shows a proposed mechanism for the selective hydrolysis of heparosan.
Figure 7B:
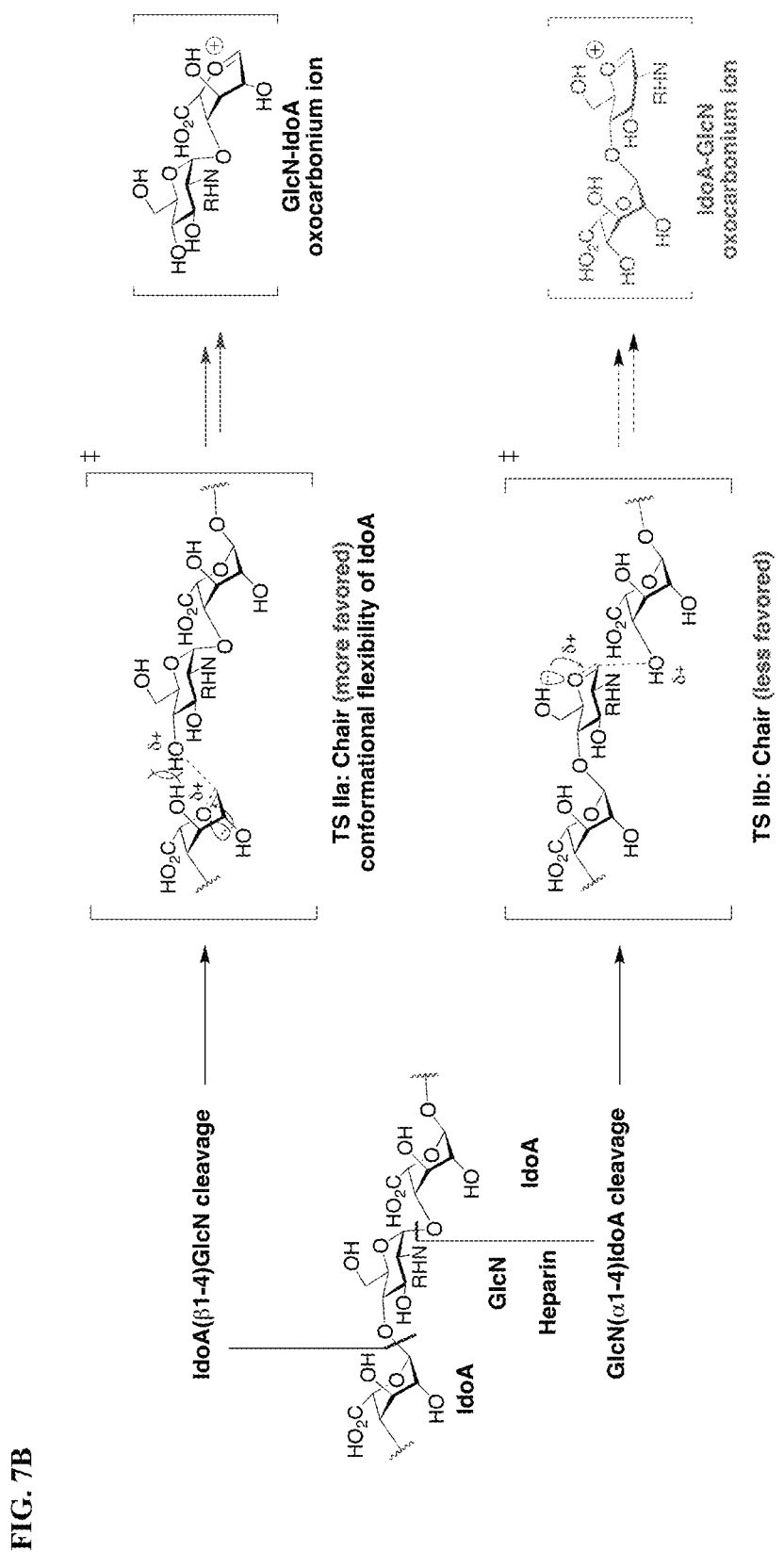
FIG. 7B shows a proposed mechanism for the selective hydrolysis of heparin.

The interesting differences in the mode of glycosidic bond cleavage between heparin and heparosan are presumably due to different stereoelectronic effects during oxocarbenium ion formation, which are possibly facilitated by the conformational flexibility of the IdoA ring. Possible explanations are illustrated in FIG. 7. In the case of GlcN(α1-4) GlcA bond cleavage, TS Ia is expected to be favored due to anomeric hyperconjugation effects (per the anti-periplanar lone-pair hypothesis, ALPH),[17] leading to formation of the GlcA-GlcN disaccharide as shown in FIG. 7A. Cleavage of the GlcA(β1-4)GlcN bond would require either an energetically demanding ring flip in the polymer backbone (TS Ib, TS Ic) to benefit from anomeric hyperconjugation or a less favorable syn-periplanar orientation between the lone pair and departing glycoside (syn-periplanar lone-pair hypothesis (SLPH)). With heparin, both cleavage routes are supported by ALPH in their chair conformations (TS IIa, TS IIb) as shown in FIG. 7B. However, TS IIa is expected to be more favorable due to the unique conformational flexibility of IdoA,[18] which could assist in the transition to the half-chair oxocarbenium ion intermediate and lead to formation of the observed GlcN-IdoA disaccharide. Another possibility is that the IdoA linkage is more prone to hydrolysis because the IdoA units can readily adopt a more "axial-rich" $^1C_4$ conformation. As axial substituents are less electron withdrawing, the IdoA linkage should be more reactive. This conformational "arming" effect has been reported to significantly enhance glycoside hydrolysis rates.[19] Independent of the mechanism, it is fortuitous that heparin and heparosan undergo distinct cleavages to form two of the four disaccharides required for HS assembly (FIG. 1).

Figure 8:
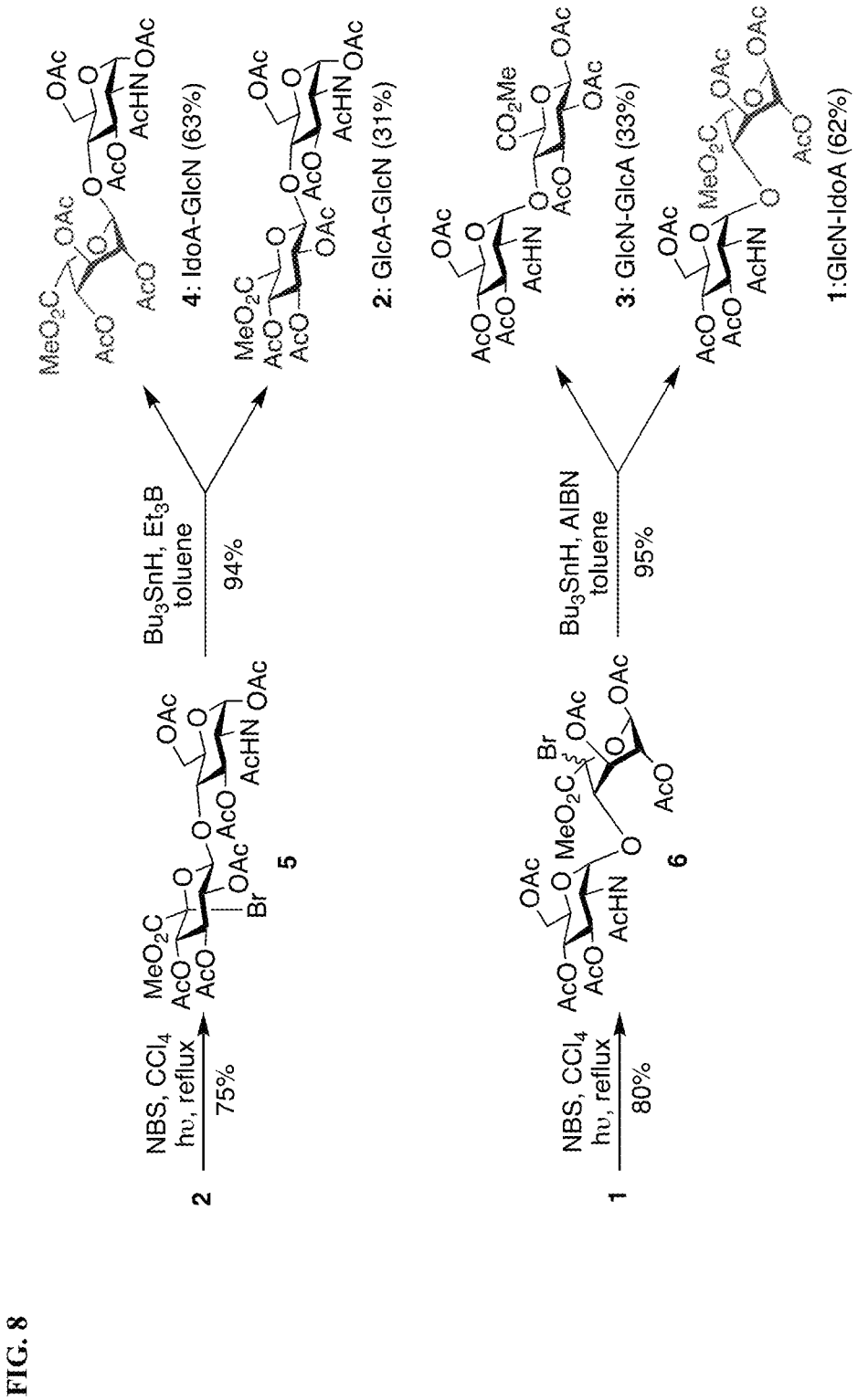
FIG. 8 shows the epimerization to Form All Four HS Core Disaccharides. NBS=N-bromosuccinimide, AIBN=2,2'-Azobis(2-methylpropionitrile).

We envisaged that the other two disaccharides might be readily accessed through epimerization of 1 and 2. Only a few methods have been reported on epimerization as a synthetic means to access IdoA from GlcA, and all using monosaccharides.[12] Base- or metal-catalyzed interconversion of IdoA to GlcA in 1 led to poor overall yield due to β-elimination or significant disaccharide decomposition (data not shown). Inspired by a report by Wong and colleagues,[12a] we subjected the GlcA-containing 2 to α-bromination using NBS in the presence of UV light[12a] to produce the C-5 bromo compound 5 in 75% yield. Various radical initiators (AIBN, triethylborane), reducing agents (tributyltin hydride, triphenyltin hydride), and temperatures (0-110° C.) were then explored to effect α-dehalogenation. We found that treatment of 5 with Et$_3$B and Bu$_3$SnH at 20° C. gave the highest amount of epimerized IdoA-GlcN product 4 in 63% yield, along with recovery of the valuable GlcA-GlcN epimer 2 in 31% yield (FIG. 8 and Table 2). On the other hand, NBS-mediated bromination of 1 gave an epimeric mixture of the C-5 bromo compound 6. Subsequent α-dehalogenation of 6 using AIBN and Bu$_3$SnH at 110° C. afforded the GlcN-GlcA disaccharide 3 in 33% yield (FIG. 8 and Table 3). Although only moderate conversion to GlcN-GlcA was observed, the GlcN-IdoA building block 1 could be recovered in 62% yield and readily recycled to produce more GlcN-GlcA building block. Thus, this approach provides novel streamlined routes to all four of the core HS disaccharide modules (1-4; FIG. 1).

TABLE 2

Radical α-Dehalogenation of 5

[Structure of compound 5: disaccharide with MeO₂C, OAc groups, Br, AcHN, OAc]

5

[Structure of 4: IdoA-GlcN]

4: IdoA-GlcN

[Structure of 2: GlcA-GlcN]

2: GlcA-GlcN

| entry | reducing reagent | radical initiator | temperature °C | IdoA:GlcA[a] |
|---|---|---|---|---|
| 1 | Ph₃SnH | AIBN | 110 | 1:2.8 |
| 2 | Ph₃SnH | AIBN | 80 | 1:2.8 |
| 3 | Ph₃SnH | Et₃B | 20 | 1:1.7 |
| 4 | Ph₃SnH | Et₃B | 0 | 1:1.8 |
| 5 | Bu₃SnH | AIBN | 110 | 1:1.7 |
| 6 | Bu₃SnH | AIBN | 80 | 1:1.6 |
| 7 | Bu₃SnH | Et₃B | 20 | 2.1[b] |
| 8 | Bu₃SnH | Et₃B | 0 | 1.5:1 |

[a]Diastereomeric ratio of IdoA-GlcN:GlcA-GlcN was evaluated by ¹H NMR analysis of the crude mixture. [b]Isolated yield for optimized reaction condition: IdoA-GlcN (63%), GlcA-GlcN (31%).

Note:
Bu₃SnH and Ph₃SnH are highly toxic. Obtain special instructions before use and do not handle until all safety precautions have been read and understood.

TABLE 3

Radical α-Dehalogenation of 6

[Structure of compound 6]

6

[Structure of 3: GlcN-GlcA]

3: GlcN-GlcA

[Structure of 1: GlcN-IdoA]

1: GlcN-IdoA

| entry | reducing reagent | radical initiator | temperature °C | GlcA:IdoA[a] |
|---|---|---|---|---|
| 1 | Ph₃SnH | AIBN | 110 | 1:3.4 |
| 2 | Ph₃SnH | Et₃B | 20 | 1:2.8 |

TABLE 3-continued

Radical α-Dehalogenation of 6

| entry | reducing reagent | radical initiator | temperature ° C. | GlcA:IdoA[a] |
|---|---|---|---|---|
| 3 | Ph$_3$SnH | Et$_3$B | 0 | 1:3 |
| 4 | Bu$_3$SnH | AIBN | 110 | 1:1.7[b] |
| 5 | Bu$_3$SnH | Et$_3$B | 20 | 1:2.4 |
| 6 | Bu$_3$SnH | Et$_3$B | 0 | 1:3.2 |
| 7 | TTMSS | AIBN | 110 | 1:1.5[c] |
| 8 | TTMSS | AIBN | 80 | sluggish |

[a]Diastereomeric ratio of GlcN-GlcA:GlcN-IdoA was evaluated by $^1$H NMR analysis of the crude mixture. [b]Isolated yield for optimized reaction condition: GlcN-GlcA(33%), GlcN-IdoA (62%). [c]The reaction gave complex mixtures.

Note:

Bu$_3$SnH and Ph$_3$SnH are highly toxic. Obtain special instructions before use and do not handle until all safety precautions have been read and understood.

Figures 9A, 9B:
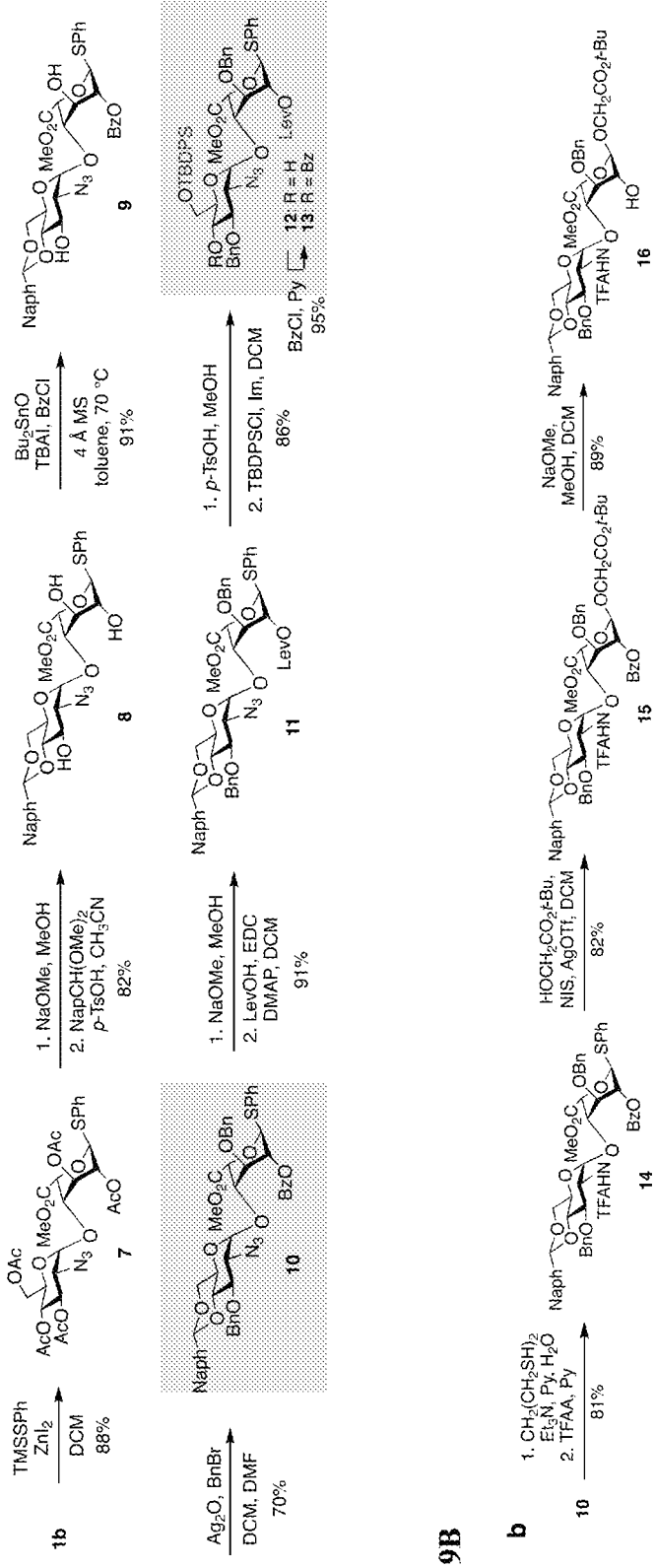
FIG. 9A shows the differential protection of the GlcN-IdoA building block. TMSSPh=trimethyl(phenylthio)silane, SPh=benzenethiol, DCM=dichloromethane, NapCl (OMe)$_2$=2-naphthaldehyde dimethyl acetal, Naph=2-naphthyl, p-TsOH=p-toluenesulfonic acid, TBAI=tetrabutylammonium iodide, BzCl=benzoyl chloride, MS=molecular sieves, BnBr=benzyl bromide, DMF=dimethylformamide, LeOH=levulinic acid, EDC=1-ethyl-3-(3-dimethylaminopropyl)carbodiimide, DMAP=4-(dimethylamino)pyridine, TBDPSCi=tert-butyl(chloro)diphenylsilan, Im=imidazole, Py=pyridine, TFAA=trifluoroacetic anhydride, NIS=N-iodosuccinimide. AgOTf=silver trifluoromethanesulfonate, FmocCl=9-fluorenylmethoxycarbonyl chloride, TFA=trifluoroacetic acid, TFAHN=trifluoroacetamide, STol=4-methylbenzenethiol, All=allyl.
FIG. 9B shows the differential protection of the GlcN-IdoA building block, as in FIG. 9A.

The assembly of HS oligosaccharides with defined sulfation sequences requires orthogonally protected disaccharides bearing functionalities that can be selectively removed to unmask hydroxyl or amino groups for sulfation. We therefore sought to synthesize strategically protected building blocks from the core disaccharides. Disaccharide 1b was treated with ZnI$_2$ and TMSSPh to give the corresponding thioglycoside 7 in 88% yield (FIG. 9a). After global deacetylation, the 6-O- and 4-O-hydroxyl groups of GlcN were protected with a (2-naphthyl) methylene acetal to afford compound 8. Next, we investigated the selective 2-O-protection of IdoA, which is particularly challenging for trans-di-axial 1,2-diols. Treatment of 8 with dibutyltin oxide and benzoyl chloride at 70° C. gave the desired compound 9 as the exclusive product. Although dibutyltin oxide has been widely used for the regioselective protection of cis-1,2 and di-equatorial trans-1,2 diols,[13] to our knowledge, this is the first successful application of dibutyltin oxide to the regioselective protection of the di-axial trans 2-O- or 3-O-positions of IdoA. We found that 9-fluorenylmethoxycarbonyl (Fmoc), 2,2,2-trichloroethoxycarbonyl (Troc), and benzoyl (Bz) groups could be selectively installed at the 2-O-position of GlcN-IdoA derivatives, whereas the monochloroacetyl (MCA) group could be selectively installed at the 3-O-position, highlighting the synthetic utility of this transformation (Table 4). Benzylation of the remaining hydroxyl groups in 9 using Ag$_2$O and BnBr in 1:1 DCM/DMF gave the valuable intermediate 10 in only 9 steps (5 purifications) from heparin. For comparison, an analogous disaccharide containing a cyclic benzylidene acetal was synthesized by Gardiner and coworkers over 17 steps in the shortest route to date.[4m,4n]

TABLE 4

Regioselective Protection of the 2-O or 3-O Positions of IdoA using Dibutyltin Oxide S3: R₁ = Fmoc, R₂ = H
S4: R₁ = Troc, R₂ = H
S5: R₁ = Bz, R₂ = H
S6: R₁ = H, R₂ = MCA

| entry | reagent | temperature ° C. | time | 2-O/3-O | isolated yield[a] |
|---|---|---|---|---|---|
| 1 | FmocCl | 120 | 1 h | — | complex |
| 2 | FmocCl | 90 | 1 h | 2-O | 85% |
| 3 | FmocCl | 20 | 18 h | — | no reaction |
| 4 | TrocCl | 70 | 1 h | 2-O | 73% |
| 5 | TrocCl | 20 | 18 h | — | no reaction |
| 6 | BzCl | 120 | 1 h | — | complex |
| 7 | BzCl | 70 | 2 h | 2-O | 74% |
| 8 | BzCl | 20 | 18 h | 2-O | 60% |
| 9 | MCACl | 20 | 15 mins | 3-O | 65% |
| 10 | MCACl | 0 | 15 mins | 3-O | 75% |

[a]In addition to the isolated compound, 5-15% of the starting material S2 was recovered.

Note:
Bu₂SnO is highly toxic. Obtain special instructions before use and do not handle until all safety precautions have been read and understood.

Disaccharide 10 is a highly versatile intermediate that can be used to synthesize various simple to highly complex HS oligosaccharides. For example, regioselective opening of the Naph acetal would lead to a 6-O-(2-naphthyl)methyl (Nap) ether group and unmask the 4-O hydroxyl group, providing a glycosyl acceptor for HS chain elongation. Here, we chose to convert disaccharide 10 into the highly differentially protected disaccharide donor 13 and acceptor 18 as general building blocks for the synthesis of various HS sulfation motifs. These building blocks have five O-protecting groups (tert-butyldiphenylsilyl (TBDPS), levulinoyl (Lev), Nap, Fmoc and $CO_2$t-Bu) and two N-protecting groups ($N_3$, N-trifluoroacetyl (TFA)), whose orthogonality is well documented.[14, 4b] This overall strategy maximizes the number of possible sulfation patterns from each disaccharide, enabling the generation of up to 64 different sulfation sequences from a single protected tetrasaccharide.

Figure 9C:
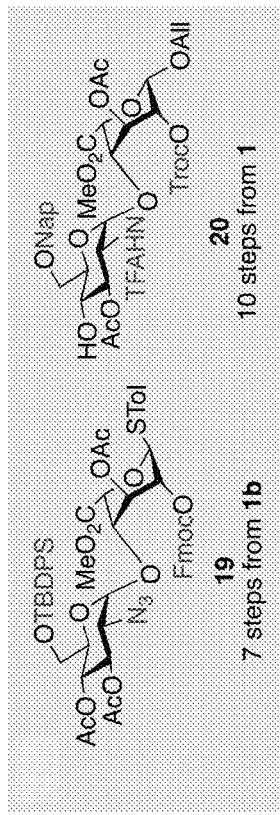
FIG. 9C shows the differential protection of the GlcN-IdoA building block, as in FIG. 9A.
Figure 10:
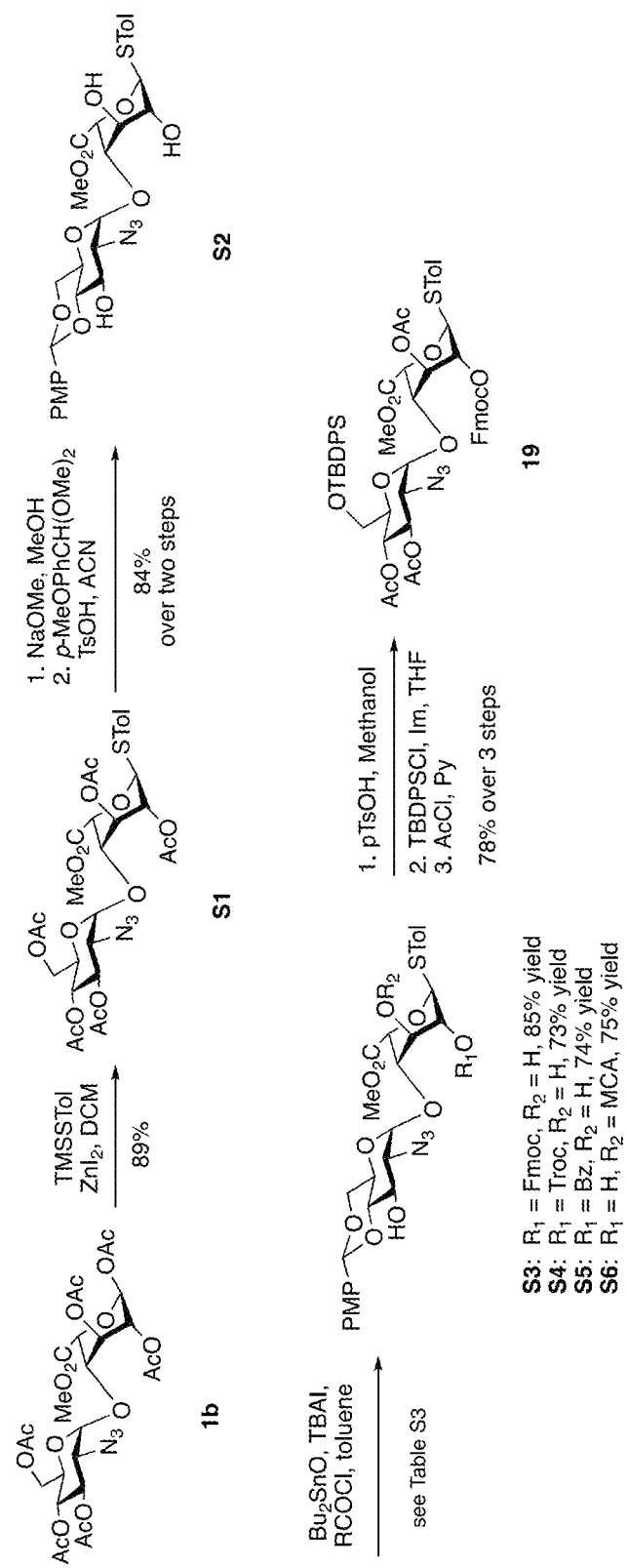
FIG. 10 shows the synthesis of differentially protected GlcN-IdoA donor (19).
Figure 11:
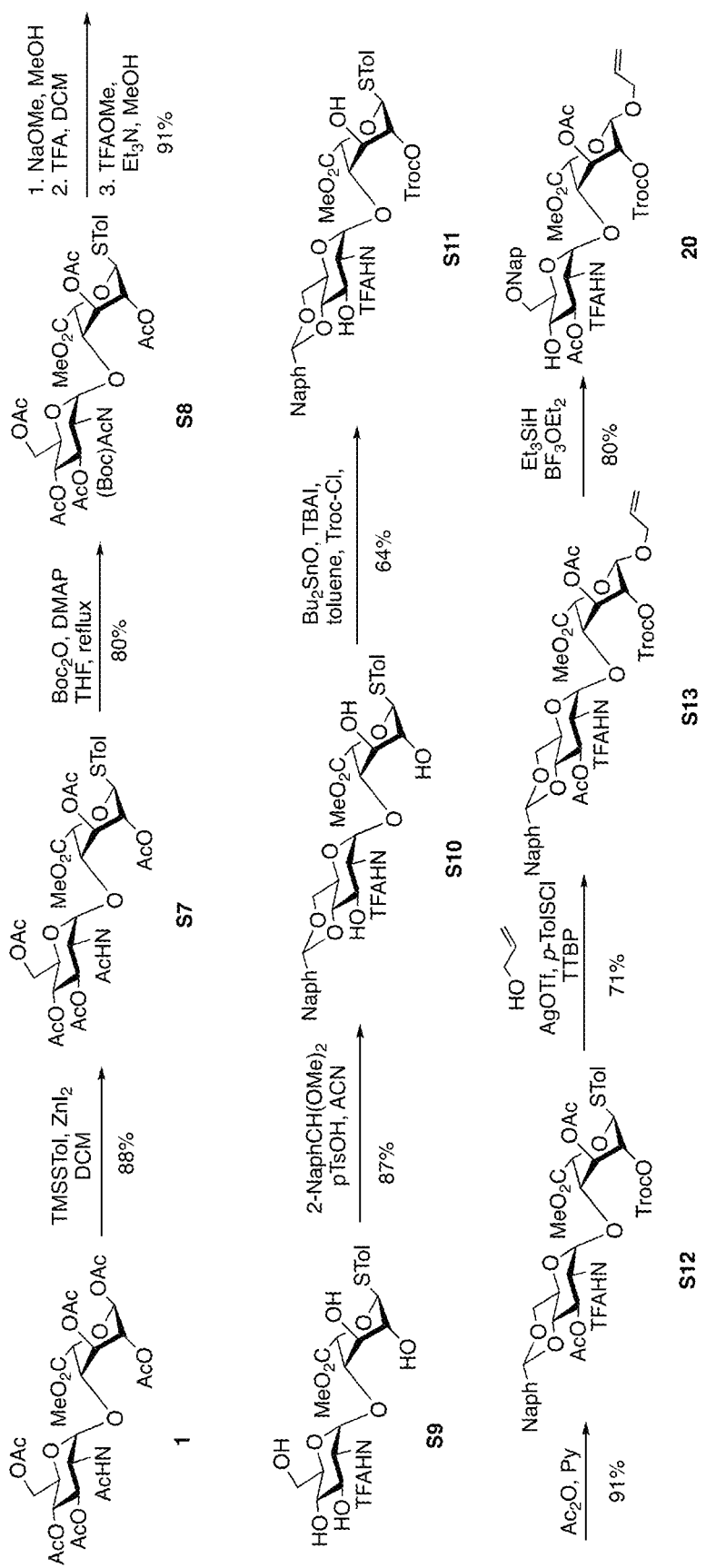
FIG. 11 shows the synthesis of differentially protected GlcN-IdoA acceptor (20).

The required disaccharide donor 13 was synthesized by exchanging the 2-O-Bz group of 10 for a Lev group, removal of the Naph acetal, and protection of the resulting primary and secondary hydroxyl groups with TBDPS and Bz groups, respectively. To generate the disaccharide acceptor 18, the azido group of 10 was reduced and the resulting amine protected with a TFA group to afford 14 in 81% yield over two steps (FIG. 9b). Glycosylation of 14 using tert-butyl 2-hydroxyacetate gave compound 15 with a versatile linker[15] at the reducing end. Chemoselective deprotection of the 2-O-Bz group in 15, followed by Fmoc protection of the resultant secondary alcohol and regioselective opening of the Naph acetal, gave the desired acceptor 18 in 72% yield. Differentially protected disaccharides 19-20 were also successfully synthesized using similar reaction sequences (FIG. 9c, FIG. 10 and FIG. 11). In the future, orthogonally protected GlcN-GlcA disaccharides derived from 3 can be readily produced. Overall, strategic protection of the core disaccharides 1/1b with different sets of protecting groups was accomplished to provide key HS/heparin disaccharide building blocks in only 5-11 steps.

Figure 12:
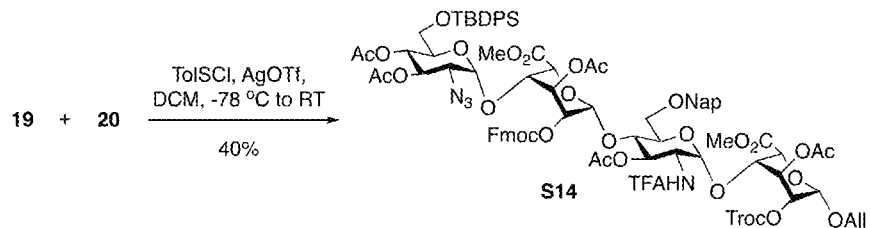
FIG. 12 shows the synthesis of tetrasaccharide (S14) with β-selectivity.
Figure 13A:
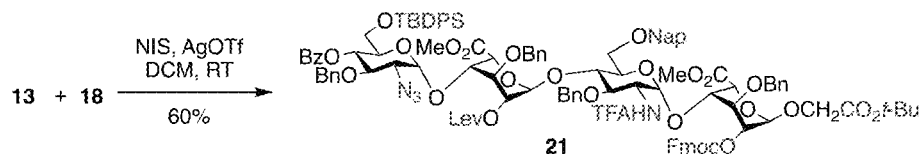
FIG. 13A shows the assembly of the strategically protected tetrasaccharide (21) using a universal tetrasaccharide building block.

With the disaccharides in hand, we sought to generate a highly orthogonally protected tetrasaccharide that could serve as a 'universal' building block for the generation of many sulfation sequences. Surprisingly, glycosylation of donor 19 with model acceptor 20 gave the undesired β-anomer, as determined by HMQC and NOE analysis (FIG. 12). Although participation of the axially oriented 3-O—Ac moiety of 19 following anomeric activation could promote the observed β-selectivity, exchanging the 3-O—Ac with an OBn group did not alter the glycosylation selectivity (data not shown). Therefore, we reasoned that the Fmoc carbonate group may not provide strong enough neighboring group participation to overcome the intrinsic β-selectivity of the glycosylation reaction, which prompted us to examine the 2-O-Lev ester protected donor 13. Reaction of donor 13 with acceptor 18 using NIS and AgOTf at room temperature delivered tetrasaccharide 21 with exclusively the desired α-stereochemistry ($^1J_{C\text{-}H}$=174.3 Hz) in 60% yield, in addition to 18% recovery of unreacted acceptor 18 (FIG. 13a). Thus, the new methods reported herein have enabled synthesis of the uniquely designed, highly orthogonally protected HS tetrasaccharide 21, with seven different protecting groups (TBDPS, Lev, Nap, Fmoc, CO$_2$t-Bu, N$_3$, and TFA) and differentiation of the two nitrogen atoms, in only 21 steps.

Figure 13B:
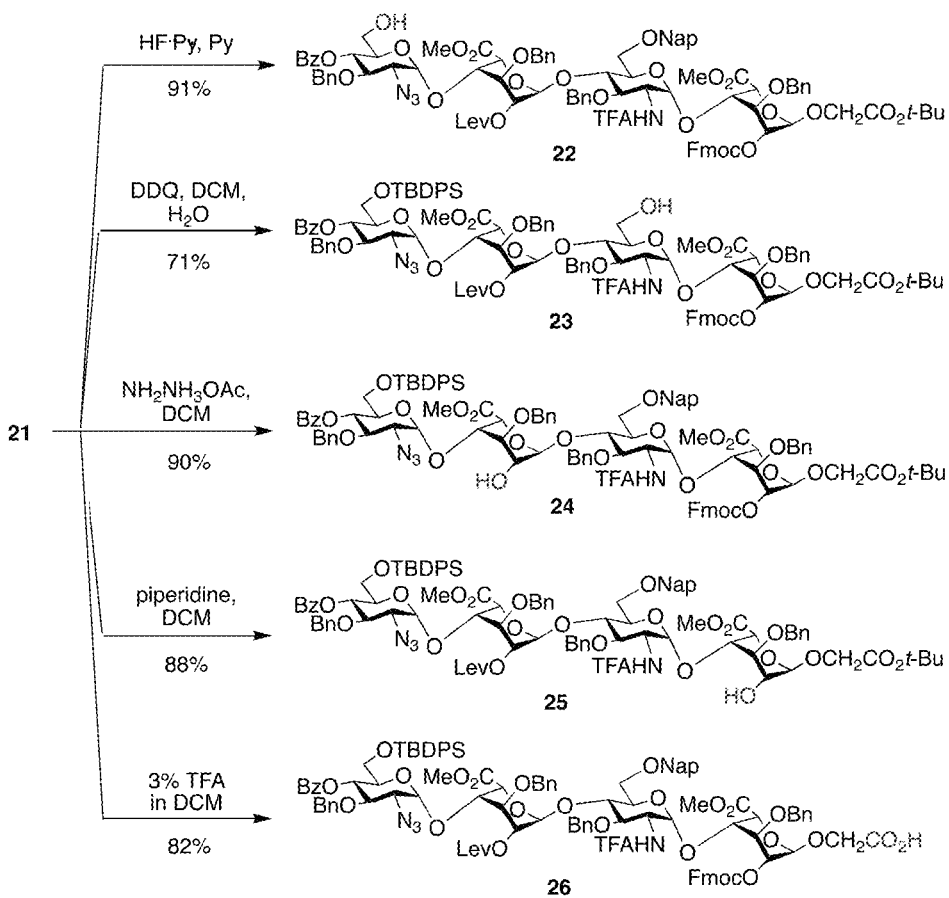
FIG. 13B shows the orthogonality of the TBDPS, Nap, Lev, Fmoc, and t-Bu protecting groups in a universal tetrasaccharide building block for the generation of diverse HS sequences. DDQ=2,3-dichloro-5,6-dicyano-p-benzoquinone.

We next demonstrated the orthogonality of the O-protecting groups in tetrasaccharide 21. Selective removal of the TBDPS or Nap group was achieved using HF.Py or DDQ, respectively, to give compounds 22 and 23 (FIG. 13b). Alternatively, the Lev- or Fmoc groups could be chemoselectively removed using hydrazine acetate or piperidine, respectively, to afford compounds 24 and 25. To provide a carboxylic acid handle for the potential attachment to a solid support, the t-Bu ester at the reducing end was selectively hydrolyzed using 3% TFA in DCM to obtain compound 26. Thus, each 2-O-, 6-O, or amino group in 21 can be selectively unmasked for regioselective sulfation, allowing in principle for the production of 64 different sulfation motifs from a single, universal tetrasaccharide building block.

Figure 14:
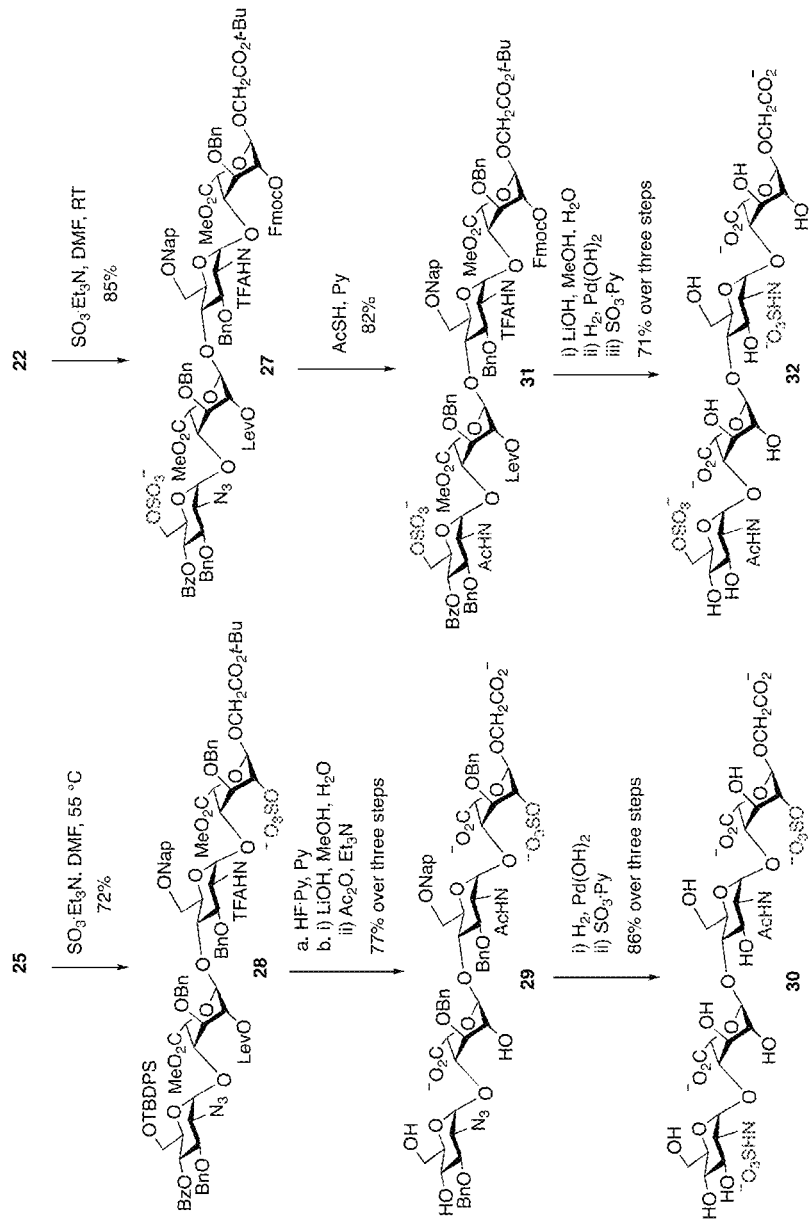
FIG. 14 shows the regioselective sulfation of 2-O, 6-O and N positions to give tetrasaccharides bearing asymmetrical, regiodefined sulfation patterns.

To demonstrate the versatility of 21, we generated tetrasaccharides with regiodefined sulfation patterns. Sulfation of free hydroxyl groups in 22 and 25 using sulfur trioxide triethylamine complex gave the 6-O- and 2-O-monosulfated tetrasaccharides 27 and 28, respectively (FIG. 14). These results confirm that all of the protecting groups (TBDPS, Nap, Lev, Fmoc, N$_3$ and TFA) remain intact under typical sulfation conditions and that our approach can allow for regioselective sulfation of the 2-O-, 6-O- and N-positions of tetrasaccharide 21. Deprotection of the TBDPS group of 28, global ester and trifluoroacetamide hydrolysis using LiOH, and acetylation of the resultant primary amine provided compound 29. Subsequent hydrogenolysis of the benzyl and Nap groups with concomitant reduction of the N$_3$ group and chemoselective N-sulfation delivered the defined sulfated tetrasaccharide 30. On the other hand, treatment of 27 with thioacetic acid accomplished die one-pot conversion of the azide to the acetamide to give compound 31. Global hydrolysis, followed by hydrogenolysis and chemoselective N-sulfation as before, delivered the desired sulfated compound 32 Thus, tetrasaccharide 21 can serve as a versatile intermediate for the synthesis of HS GAGs displaying different regiodefined sulfation patterns. It is worth noting that structures such as 30 and 32 bearing distinct O-sulfation and N-sulfation patterns on its two disaccharide units are generally more tedious to prepare chemically and are inaccessible using current chemoenzymatic methods.

Example 2. General Synthetic and Analytical Methods

Unless stated otherwise, reactions were performed in oven-dried glassware under an argon atmosphere using freshly dried solvents. Solvents were dried via passage through an activated alumina column under argon. All other commercially obtained reagents were used as received unless otherwise noted. Thin-layer chromatography (TLC) was performed using E. Merck silica gel 60 F254 pre-coated plates (0.25 mm). Visualization of the chromatogram was accomplished by UV, cerium ammonium molybdate, or ninhydrin staining as necessary. ICN silica gel (particle size 0.032-0.063 mm) was used for column chromatography. $^1$H NMR (Varian Inova-500 MHz and Bruker-400 MHz), and $^{13}$C NMR (Varian Inova-125 MHz and Bruker-100 MHz) spectra were recorded using CDCl$_3$, CD$_3$COCD$_3$, CD$_3$OD, or D$_2$O as solvent(s). Data for $^1$H are reported as follows: chemical shift (δ ppm), multiplicity (s=singlet, bs=broad singlet, d=doublet, t=triplet, q=quartet, m=multiplet), coupling constant in Hz, and integration. When necessary, proton and carbon assignments were made by means of $^1$H-$^1$H gCOSY, $^1$H-$^{13}$C gHSQCAD and $^1$H-$^{13}$C gHMBCAD. Mass spectra were obtained using a Perkin Elmer/Sciex API 365 triple quadrupole/electrospray tandem mass spectrometer or a Waters LCT Premier XE high resolution mass spectrometer at the California Institute of Technology. Sodium heparinate was obtained from Celsus Laboratories and used as it is. Heparosan was produced by fermentation procedures from *Escherichia coli* K5.[20] Abbreviations: 9-fluorenylmethoxycarbonyl (Fmoc); monochloroacetyl (MCA); tert-butyldiphenylsilyl (TBDPS); benzoyl (Bz); benzyl (Bn); p-methoxyphenyl (PMP); 4-methylbenzenethiol (STol); levulinoyl (Lev); naphthyl (Naph); (2-naphthyl)methyl (Nap); 2,2,2-trichloroethoxycarbonyl (Troc); trifluoroacetic anhydride (TFAA); trifluoroacetyl (TFA); uronic acid (UA).

Characterization of Anomeric Center Stereochemistry.

The stereochemistry of the newly formed glycosidic linkages were determined by the $^3J_{H1,H1}$ coupling constants using $^1$H NMR and/or the $^1J_{C1,H1}$ coupling constants using gHSQC 2-D NMR (without $^1$H decoupling). In some cases, further support for the assignments was obtained using 1H, 1H NOESY spectra. For the glucosamine and glucuronic acid linkages, smaller coupling constants of $^3J_{H1,H2}$ (~3 Hz) indicate a linkages and larger coupling constants $^3J_{H1,H2}$ (7.2 Hz or larger) indicate 3 linkages. For the idose and iduronic acid linkages, the small values (~3 Hz) of $^3J_{H2,H3}$ and $^3J_{H3,H4}$ indicate that the glycan ring is predominantly in the $^1C_4$ conformation.[21] The coupling constants of $^1J_{C1,H1}$ around 170 Hz are strongly suggestive of α linkages, while $^1J_{C1,H1}$ values around 160 Hz are strongly suggestive of β linkages.[22]

LC Conditions.

Column: Luna HILIC column (2.0×50 mm$^2$, 200 Å, Phenomenex, Torrance, Calif.). Mobile phase A: 5 mM ammonium acetate prepared with HPLC grade water. Mobile phase B: 5 mM ammonium acetate prepared in 98% HPLC grade CH$_3$CN with 2% of HPLC grade water. The gradient was used from 5% A to 70% A in 7 min then reset to 5% A at a flow rate of 250 µL/min. See Reference 8 for details.

MS Conditions.

The optimized parameters included a spray voltage of 4.2 kV, a capillary voltage of −40 V, a tube lens voltage of −50 V, a capillary temperature of 275° C., a sheath flow rate of 30, and an auxiliary gas flow rate of 6. All mass spectra were acquired at a resolution 60000 with 200-2000 Da mass range.

Data Process.

Charge deconvolution was autoprocessed by DeconTools software, structural assignment was done by automatic processing using GlycReSoft 1.0 software. Results was presented as [AHexA, HexA, GlcN, Ac, SO$_3$]. Only $^{0,2}A_2$ of HexA-GlcN (295.1 m/z) was found without $^{0,2}A_2$ of GlcN-HexA (294.1 m/z) in the heparosan sample. Both $^{0,2}A_2$ of HexA-GlcN and $^{0,2}A_2$ of GlcN-HexA were found in the N-de-acetylated heparosan, heparin, and N-acetylated heparin samples. There was only HexA-GlcN existing on heparosan samples; both HexA-GlcN and GlcN-HexA were existing on N-de-acetylated heparosan, heparin and N-acetylated heparin samples.

Example 3. Synthesis of Compounds and Assignments

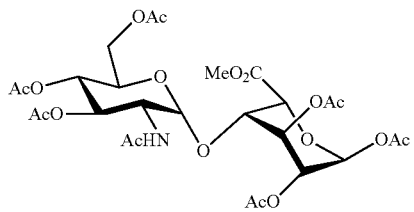

Methyl (2-acetamido-3,4,6-tri-O-acetyl-2-deoxy-α-D-glucopyranosyl)-(1→4)-(1,2,3-tri-O-acetyl-α-L-idopyranoside)uronate (1)

Sodium heparinate (25 g, Celsus Laboratories; commercial grade) was dissolved in 120 mL of 2 M trifluoromethanesulfonic acid (21 mL) in H$_2$O and refluxed at 100° C. for 8 h. The reaction progress was monitored by $^1$H NMR on an hourly basis and quenched at the appropriate time to maximize the yield and minimize over-hydrolysis. The optimal conditions for quenching were reached when the NMR spectrum of the crude reaction resembled the spectrum shown after 8 h in FIG. 4A. At this time, the oligosaccharide peak at 5.46 ppm was almost completely consumed and the height of the newly formed GlcN side product anomeric peak at 5.42 matched the height of the newly formed (likely anomeric) peak of the desired product at 5.41 ppm. The crude products could also be analyzed by hydrophilic interaction chromatography-Fourier transform mass spectrometry (HILIC-FTMS; FIG. 4). The mixture was cooled to room temperature (RT) and concentrated to dryness under reduced pressure. The crude mixture was then refluxed (75° C.) with 250 mL of 0.011 N HCl in MeOH (0.25 mL of acetyl chloride in 250 mL of MeOH) overnight. The mixture was cooled to RT and concentrated again to dryness. The resulting solid was dissolved in 200 mL of anhydrous acetic anhydride at −5° C. and was stirred for 10 h at RT. The solution was concentrated, dissolved in ethyl acetate (EtOAc), cooled to 0° C., and saturated aqueous (aq.) NaHCO$_3$ solution was added. The organic layer was separated, dried over MgSO$_4$, and concentrated. The resulting crude mixture was further treated with 150 mL of 1:1 pyridine-acetic anhydride at 0° C. and stirred for 10 h at RT. The solution was concentrated, washed with 1 N aq. HCl, saturated aq. NaHCO$_3$ solution, and brine. The organic layer was dried over MgSO$_4$, concentrated, and purified by silica gel column chromatography (elution with 1:1→1:4 hexanes/EtOAc) to give peracetylated disaccharide 1, along with peracetylated glucosamine (side product). The desired compound was further purified by silica gel column chromatography (elution with 1:9→2:8 acetone/DCM) to give peracetylated disaccharide 1 (4.4 g, 18%) as an off-white solid.

Yields were calculated by comparing the weight of the isolated disaccharide product to the weight of the polysaccharide starting material, correcting for minor differences in the relative molecular weights of the average disaccharide found in heparin (IdoA2S2Na-GlcNS6S2Na; MW 665.38) and the disaccharide product (MW 663.58). R$_f$ 0.6 (EtOAc); $^1$H NMR (500 MHz, CDCl$_3$): δ 6.37 (d, J=4.1 Hz, 1H, H-1), 5.81 (d, J=9.2 Hz, 1H, NH), 5.32 (t, J=5.4 Hz, 1H, H-3), 5.12 (t, J=9.6 Hz, 1H, H-4'), 5.07 (t, J=9.6 Hz, 1H, H-3'), 5.00 (d, J=3.5 Hz, 1H, H-1'), 4.91 (dd, J=5.4, 4.3 Hz, 1H, H-2), 4.72 (d, J=4.0 Hz, 1H, H-5), 4.30 (ddd, J=9.6, 9.2, 3.5 Hz, 1H, H-2'), 4.19 (dd, J=12.5, 4.0 Hz, 1H, H-6'), 4.15 (dd, J=12.5, 2.5 Hz, 1H, H-6'), 4.13 (dd, J=5.4, 4.0 Hz, 1H, H-4), 4.05 (ddd, J=9.6, 4.0, 2.5 Hz, 1H, H-5'), 3.87 (s, 3H, OCH$_3$), 2.14 (s, 3H), 2.11 (s, 3H), 2.10 (s, 3H), 2.09 (s, 3H), 2.03 (s, 3H), 2.01 (s, 3H), 1.97 (s, 3H); $^{13}$C NMR (125 MHz, CDCl$_3$): δ 171.43 (C=O), 170.77 (C=O), 170.34 (C=O), 169.51 (C=O), 169.49 (C=O), 169.28 (C=O), 168.39 (2×C=O), 98.67 (C-1'), 90.44 (C-1), 72.89 (C-4), 70.70 (C-5), 70.66 (C-4'), 69.03 (C-5'), 68.66 (C-3), 67.95 (C-2), 67.73 (C-3'), 61.75 (C-6'), 52.92 (OCH$_3$), 51.91 (C-2'), 21.18, 20.93, 20.85, 20.84, 20.78, 20.74, 20.70; HRMS (ESI-TOF) calcd for C$_{27}$H$_{37}$NO$_{18}$Na [M+Na]$^+$: 686.1909; found: 686.1915. Notably, the HMBC spectrum showed cross peaks between H-4 (4.13 ppm) of IdoA and C-1 (98.7 ppm) of GlcN, indicative of a GlcN-IdoA linkage.

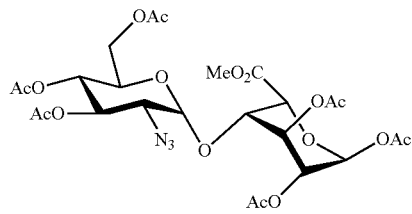

Methyl (3,4,6-tri-O-acetyl-2-azido-2-deoxy-α-D-glucopyranosyl)-(1→4)-(1,2,3-tri-O-acetyl-α-L-idopyranoside)uronate (Ib)

Sodium heparinate (25 g) was dissolved in 120 mL of 2 M trifluoromethanesulfonic acid (21 mL) in H$_2$O and refluxed at 100° C. for 8 h. The progress of the reaction was monitored by $^1$H NMR on an hourly basis and quenched at the appropriate time to maximize the yield and minimize over-hydrolysis. The optimal conditions for quenching were reached when the NMR spectrum of the crude reaction resembled the spectrum shown after 8 h in FIG. 4. At this time, the oligosaccharide peak at 5.46 ppm was almost completely consumed and the height of the newly formed GlcN side product anomeric peak at 5.42 matched the height of the newly formed (likely anomeric) peak of the desired product at 5.41 ppm. The mixture was cooled to RT and concentrated to dryness under reduced pressure. The crude mixture was then refluxed (75° C.) with 250 mL of 0.011 N HCl in MeOH (0.25 mL of acetyl chloride in 250 mL of MeOH) overnight. The mixture was cooled to RT, quenched with aq. NaHCO$_3$, filtered, and concentrated. The residue was again filtered through a silica bed (10×7 cm) and eluted with DCM (250 mL), followed by MeOH/DCM (1:4, 250 mL) and MeOH (1.5 L). The MeOH (1.5 L) fractions were concentrated. The crude product was dissolved in MeOH/water (4:1, 200 mL), and potassium carbonate (8.9 g, 64 mmol), ZnCl$_2$ (0.51 g, 3.7 mmol), and freshly prepared TfN$_3$ (0.15 mol) were added. [Preparation of TfN$_3$: To a solution of NaN$_3$ (49 g, 0.75 mol) in 2:1 DCM/H$_2$O (300 mL) was added Tf$_2$O (25 mL, 42 g, 0.15 mol) dropwise at 0° C. over 1 h. The reaction was stirred at 0° C. for an additional 2.5 h. The DCM layer was then extracted and used directly without concentration.] After stirring at RT overnight, the mixture was concentrated, dissolved in THF, filtered through Celite, and concentrated to dryness. The resulting solid was dissolved in 250 mL of anhydrous acetic anhydride at −5° C., HClO$_4$ (25 mL, 0.44 mol) was added, and the reaction was stirred for 18 h at RT. The solution was concentrated, dissolved in EtOAc, and washed with saturated aq. NaHCO$_3$ solution and then brine. The organic layer was dried over MgSO$_4$, concentrated, and purified by silica gel column chromatography (elution with 2:1→1:1 hexanes/EtOAc) to give peracetylated azido disaccharide 1b (4.8 g, 20%) as an off-white solid.

Yields were calculated by comparing the weight of the isolated disaccharide product to the weight of the polysaccharide starting material, correcting for minor differences in the relative molecular weights of the average disaccharide found in heparin (IdoA2S2Na-GlcNS6S2Na; MW 665.38) and the disaccharide product (MW: 647.54). $R_f$ 0.4 (2:3 hexanes/EtOAc); $^1$H NMR (500 MHz, CDCl$_3$): δ 6.26 (d, J=1.0 Hz, 1H, H-1), 5.38 (dd, J=10.5, 9.3 Hz, 1H, H-3'), 5.26 (t, J=2.5 Hz, 1H, H-3), 5.10 (d, J=3.5 Hz, 1H, H-1'), 5.05 (dd, J=10.2, 9.3 Hz, 1H, H-4'), 4.83 (dd, J=2.5, 1.0 Hz, 1H, H-2), 4.77 (dd, J=2.5 Hz, 1H, H-5), 4.23 (dd, J=12.5, 3.4 Hz, 1H, H-6'), 4.16 (t, J=2.5 Hz, 1H, H-4), 4.15 (dd, J=12.5, 2.1 Hz, 1H, H-6'), 4.11-4.06 (m, 1H, H-5'), 3.85 (s, 3H, OCH$_3$), 3.47 (dd, J=10.5, 3.5 Hz, 1H, H-2'), 2.19 (s, 3H), 2.14 (s, 3H), 2.12 (s, 3H), 2.08 (s, 3H), 2.07 (s, 3H), 2.02 (s, 3H); $^{13}$C NMR (125 MHz, CDCl$_3$): δ 170.5 (C=O), 169.8 (C=O), 169.7 (C=O), 169.6 (C=O), 168.8 (C=O), 168.4 (C=O), 167.9 (C=O), 98.4 (C-1'), 90.8 (C-1), 72.8 (C-4), 70.5 (C-3'), 68.9 (C-5), 68.6 (C-5'), 68.0 (C-4'), 66.7 (C-3), 66.0 (C-2), 61.2 (C-6'), 61.1 (C-2'), 52.7 (OCH$_3$), 20.79, 20.76, 20.7, 20.6, 20.53, 20.50; HRMS (ESI-TOF) calcd for C$_{25}$H$_{33}$N$_3$O$_{17}$Na [M+Na]$^+$: 670.1708; found: 670.1707.

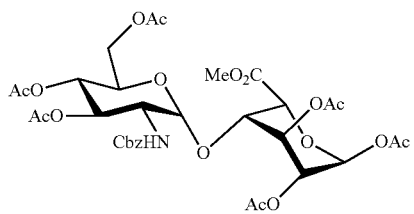

Methyl (3,4,6-tri-O-acetyl-2-((benzyloxy)carbonyl) amino-2-deoxy-α-D-glucopyranosyl)-(1→4)-(1,2,3-tri-O-acetyl-α-L-idopyranoside)uronate (1c)

Sodium heparinate (2.0 g) was dissolved in 9.6 mL of 2 M trifluoromethanesulfonic acid in H$_2$O (1.7 mL trifluoromethanesulfonic acid) and refluxed at 100° C. for 8 h. The mixture was cooled to RT and concentrated to dryness under reduced pressure. The crude mixture was then refluxed (75° C.) with 20 mL of 0.011 N HCl in MeOH (20 μL of acetyl chloride in 20 mL of MeOH) overnight. The reaction was cooled to RT, quenched with aq. NaHCO$_3$, filtered, and concentrated. The residue was dissolved in water (10 mL), and NaHCO$_3$ (1.0 g, 12 mmol) and benzyl chloroformate (1.5 g, 9.1 mmol) were added. After stirring at RT overnight, the mixture was quenched with 1N aq. HCl and concentrated. The resulting solid was dissolved in 10 mL of anhydrous acetic anhydride at −5° C., HClO$_4$ (1.2 mL) was added, and the reaction was stirred for 18 h at RT. The solution was concentrated, dissolved in EtOAc, washed with saturated aq. NaHCO$_3$ solution, and brine. The organic layer was dried over Na$_2$SO$_4$, concentrated and purified by silica gel column chromatography (elution with 2:1→1:1 hexanes/EtOAc) to give disaccharide 1c (0.19 g, 8.5%) as an off-white solid.

Yields were calculated by comparing the weight of the isolated disaccharide product to the weight of the polysaccharide starting material, correcting for minor differences in the relative molecular weights of the average disaccharide found in heparin (IdoA2SNa-GlcNS6SNa; MW 665.38) and the disaccharide product (MW 755.68). $R_f$ 0.4 (4:6 hexanes/EtOAc); $^1$H NMR (400 MHz, CDCl$_3$): δ 7.37-7.31 (m, 5H, Ar), 6.24 (s, 1H, H-1), 5.22 (d, J=9.9 Hz, 1H, NH), 5.17-5.08 (m, 5H, PhCH$_2$, H-4', H-3', H-3, H-1'), 5.01 (d, J=12.1 Hz, 1H, PhCH$_2$), 4.82 (appt, J=2.3 Hz, 1H, H-2), 4.79 (d, J=2.6 Hz, 1H, H-5), 4.22 (dd, J=12.6, 3.6 Hz, 1H, H-6'), 4.15-4.05 (m, 3H, H-6', H-4, H-2'), 3.92-3.89 (m, 1H, H-5'), 3.86 (s, 3H, OCH$_3$), 2.13 (s, 3H, CH$_3$C=O), 2.11 (s, 6H, 2XCH$_3$C=O), 2.104 (s, 3H, CH$_3$C=O), 2.01 (s, 3H, CH$_3$C=O), 1.86 (s, 3H, CH$_3$C=O); $^{13}$C NMR (100 MHz, CDCl$_3$): δ 170.73 (C=O), 170.70 (C=O), 169.4 (C=O), 169.3 (C=O), 168.9 (C=O), 168.4 (C=OOCH$_3$), 167.9 (C=O), 155.7 (PhCH$_2$° C.=O), 135.9 (Ar), 128.6 (Ar), 128.44 (Ar), 128.41 (Ar), 97.9 (C-1'), 90.1 (C-1), 71.6 (C-4), 70.9 (C-3'), 69.0 (C-5), 68.8 (C-5'), 67.6 (C-4'), 67.3 (PhCH$_2$O), 66.4 (C-3 and C-2), 61.4 (C-6'), 53.5 (C-2'), 52.9 (OCH$_3$), 20.82, 20.75, 20.72, 20.6, 20.5, 20.4; HRMS (FAB) calcd for C$_{33}$H$_{42}$NO$_{19}$ [M+H]$^+$: 756.2351; found: 756.2332.

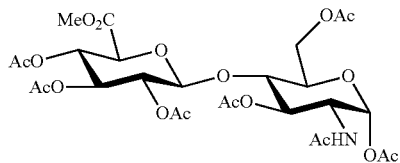

Methyl (2,3,4-tri-O-acetyl-β-D-glucopyranosyluronate)-(1→4)-2-acetamido-1,3,6-tri-O-acetyl-2-deoxy-α-D-glucopyranoside (2)

Heparosan (19 g) was heated at 100° C. in 120 mL of 1 M trifluoromethanesulfonic acid in H$_2$O (10.6 mL trifluoromethanesulfonic acid in total 120 mL H$_2$O) for 5 h. The hydrolysis reaction was monitored every hour by $^1$H NMR and quenched at the appropriate time to maximize the yield and minimize over-hydrolysis. The optimal conditions for quenching were reached when the NMR spectrum of the crude reaction resembled the spectrum shown after 5-6 h in FIG. 5. The resultant mixture was cooled to RT and concentrated to dryness. The crude mixture was then dissolved in 200 mL of 0.01 N HCl in MeOH (200 μL of acetyl chloride in 200 mL of MeOH) and refluxed overnight. The mixture was then cooled to RT and concentrated again to dryness. The resulting solid was dissolved in 200 mL of anhydrous acetic anhydride at −5° C. After stirring for 10 h at RT, the solution was concentrated, dissolved in EtOAc, cooled to 0° C., and washed with saturated aq. NaHCO$_3$ solution. The organic layer was dried over MgSO$_4$ and concentrated, and the resulting crude mixture was further treated with 120 mL of 1:1 pyridine/acetic anhydride. After stirring at RT for 10 h, the solution was concentrated, washed with 1 N aq. HCl, saturated aq. NaHCO$_3$, and brine. The organic layer was dried over MgSO$_4$, concentrated, and purified by silica gel column chromatography (30×7 cm) using hexanes/EtOAc (1:1→1:4) to give peracetylated disaccharide 2 (4.9 g, 16%) as a colorless foam.

Yields were calculated by comparing the weight of the isolated disaccharide product to the weight of the polysaccharide starting material, correcting for minor differences in the relative molecular weights of the average disaccharide found in heparosan (GlcANa-GlcN; MW 401.30) and the disaccharide product (MW 663.58). $R_f$ 0.6 (EtOAc); $^1$H NMR (500 MHz, CDCl$_3$): δ 6.08 (d, J=3.6 Hz, 1H, H-1), 5.57 (d, J=9.0 Hz, 1H, NH), 5.27-5.19 (m, 2H, H-3', H-3), 5.17 (t, J=9.4 Hz, 1H, H-4'), 4.96 (dd, J=9.4, 7.9 Hz, 1H, H-2'), 4.59 (d, J=7.9 Hz, 1H, H-1'), 4.41 (dd, J=12.0, 1.1 Hz, 1H, H-6), 4.36 (ddd, J=11.0, 9.0, 3.6 Hz, 1H, H-2), 4.09 (dd, J=12.0, 2.7 Hz, 1H, H-6), 3.98 (d, J=9.4 Hz, 1H, H-5'), 3.89-3.84 (m, 2H, H-4, H-5), 3.75 (s, 3H, OCH$_3$), 2.19 (s, 3H), 2.13 (s, 3H), 2.09 (s, 3H), 2.05 (s, 3H), 2.02 (s, 3H), 2.01 (s, 3H), 1.93 (s, 3H); $^{13}$C NMR (125 MHz, CDCl$_3$): δ 171.7 (C=O), 170.4 (C=O), 170.2 (C=O), 170.1 (C=O), 169.4 (C=O), 169.3 (C=O), 168.9 (C=O), 166.8 (C=O), 101.0 (C-1'), 90.6 (C-1), 76.3 (C-4), 72.8 (C-5'), 72.1 (C-3'), 71.5 (C-2'), 70.6 (C-3), 70.4 (C-5), 69.4 (C-4'), 61.5 (C-6), 53.0 (OCH$_3$), 51.2 (C-2), 23.1, 21.1, 20.9, 20.8, 20.7, 20.6, 20.5; HRMS (ESI-TOF) calcd for C$_{27}$H$_{37}$NO$_8$Na [M+Na]$^+$: 686.1909; found: 686.1918.

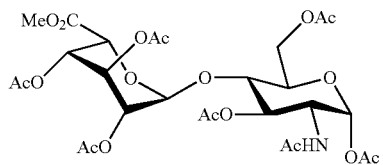

Methyl (2,3,4-tri-O-acetyl-α-L-idoopyranosyluronate)-(1→4)-2-acetamido-1,3,6-tri-O-acetyl-2-deoxy-α-D-glucopyranoside (4). A suspension of compound 2 (1.0 g, 1.6 mmol) and N-bromosuccinimide (0.97 g, 5.4 mmol) in carbon tetrachloride (90 mL) were refluxed under a UV lamp (254 nm). After 2.5 h, the mixture was cooled, and DCM (100 mL) was added. The organic layer was washed with H$_2$O, saturated aq. Na$_2$S$_2$O$_3$, and 10% aq. Na$_2$CO$_3$. The organic layer was dried over Na$_2$SO$_4$, filtered, and concentrated. The residue was purified by silica gel column chromatography using DCM/acetone (8.5:1.5) to afford the corresponding bromide 5 (0.86 g, 75% yield) and a mixture of epimers (0.05 g, 4.0%) as an off-white foam.

$R_f$ 0.5 (4:1 DCM/acetone); $^1$H NMR (500 MHz, CDCl$_3$): δ 6.07 (d, J=3.6 Hz, 1H, H-1), 5.65 (d, J=9.2 Hz, 1H, NH), 5.39 (t, J=9.0 Hz, 1H, H-3'), 5.27 (d, J=9.0 Hz, 1H, H-4'), 5.21 (dd, J=10.9, 9.5 Hz, 1H, H-3), 5.13 (d, J=9.0 Hz, 1H, H-1'), 5.06 (t, J=9.0 Hz, 1H, H-2'), 4.45 (dd, J=12.4, 1.8 Hz, 1H, H-6), 4.39 (ddd, J=10.9, 9.3, 3.6 Hz, 1H, H-2), 4.08 (dd, J=12.4, 3.3 Hz, 1H, H-6), 3.98 (t, J=9.5 Hz, 1H, H-4), 3.88 (m, 1H, H-5), 3.82 (s, 3H, OCH$_3$), 2.17 (s, 3H), 2.14 (s, 3H), 2.08 (s, 3H), 2.07 (s, 3H), 2.06 (s, 3H), 1.98 (s, 3H), 1.93 (s, 3H); $^{13}$C NMR (125 MHz, CDCl$_3$): δ 171.9 (C=O), 170.3 (C=O), 170.2 (C=O), 169.7 (C=O), 169.2 (C=O), 169.0 (C=O), 168.8 (C=O), 164.2 (C=O), 100.4 (C-1'), 90.6 (C-1), 90.3 (C-5'), 76.0 (C-4), 71.1 (C-3'), 70.7 (C-2'), 70.3 (C-3), 70.2 (C-5), 69.9 (C-4'), 61.3 (C-6), 54.2 (OCH$_3$), 51.3 (C-2), 23.1, 21.1, 21.0, 20.9, 20.68, 20.67, 20.5; HRMS (ESI-TOF) calcd for C$_{27}$H$_{36}$BrNO$_{18}$Na [M+Na]$^+$: 766.0993; found: 766.0999. Note: Carbon tetrachloride (CCl$_4$) is highly toxic. Special instructions should be obtained before use, and CCl$_4$ should not be handled until all safety precautions have been read and understood.

A solution of bromide 5 (0.86 g, 1.2 mmol) in toluene (40 mL) was bubbled with argon for 10 min. Tributyltin hydride (0.68 g, 0.63 mL, 2.3 mmol) and Et$_3$B (23 mg, 0.23 mmol, 230 μL, 1 M solution in hexanes) were added, and the reaction was stirred at RT. After 2 h, the mixture was concentrated, the resulting residue was dissolved in CH$_3$CN (100 mL), and the solution was washed three times with hexanes. The CH$_3$CN solution was concentrated under reduced pressure. Purification by silica gel column chromatography first using 2:3→1:4 toluene/EtOAc gave the GlcA-GlcN building block 2 (240 mg, 31% yield) as a white solid. $R_f$ 0.5 (1:9 toluene/EtOAc). Further elution with 1:4→1:9 toluene/EtOAc gave the IdoA-GlcN building block 4 (490 mg, 63% yield) as an off-white foam. $R_f$ 0.4 (1:9 toluene/EtOAc); $^1$H NMR (500 MHz, CDCl$_3$): δ 6.09 (d, J=3.7 Hz, 1H, H-1), 5.51 (d, J=9.3 Hz, 1H, NH), 5.20 (dd, J=10.9, 9.4 Hz, 1H, H-3), 5.14 (d, J=2.7 Hz, 1H, H-1'), 5.10-5.06 (m, 2H, H-3', H-4'), 4.83 (d, J=2.4 Hz, 1H, H-5'), 4.68 (dd, J=5.0, 2.7 Hz, 1H, H-2'), 4.40 (ddd, J=10.9, 9.3, 3.7 Hz, 1H, H-2), 4.36 (dd, J=12.4, 2.0 Hz, 1H, H-6), 4.19 (dd, J=12.4, 3.5 Hz, 1H, H-6), 3.99 (t, J=9.4 Hz, 1H, H-4), 3.90-3.85 (m, 1H, H-5), 3.78 (s, 3H, OCH$_3$), 2.19 (s, 3H), 2.12 (s, 3H), 2.10 (s, 3H), 2.09 (s, 3H), 2.08 (s, 3H), 2.07 (s, 3H), 1.92 (s, 3H); $^{13}$C NMR (125 MHz, CDCl$_3$): δ 172.2 (C=O), 170.7 (C=O), 170.2 (C=O), 169.7 (C=O), 169.6 (C=O), 169.0 (C=O), 168.8 (C=O), 168.2 (C=O), 98.6 (C-1'), 90.8 (C-1), 75.2 (C-4), 71.7 (C-3), 70.6 (C-5), 67.8 (C-5'), 67.7 (C-2'), 67.3 (C-4'), 67.2 (C-3'), 61.7 (C-6), 52.7 (OCH$_3$), 51.2 (C-2), 23.2, 21.2, 21.0, 20.93, 20.91, 20.8, 20.7; HRMS (ESI-TOF) calcd for C$_{27}$H$_{37}$NO$_{18}$Na [M+Na]$^+$: 686.1908; found: 686.1922. Note: Tributyltin hydride (Bu$_3$SnH) is highly toxic. Special instructions should be obtained before use, and tributyltin hydride should not be handled until all safety precautions have been read and understood.

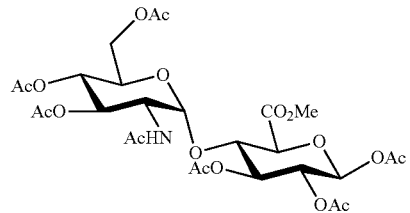

Methyl (2-acetamido-3,4,6-tri-O-acetyl-2-deoxy-α-D-glucopyranosyl)-(1→4)-(1,2,3-tri-O-acetyl-β-D-glucopyranoside)uronate (3)

A suspension of compound 1 (1.0 g, 1.5 mmol) and N-bromosuccinimide (0.94 g, 5.3 mmol) in carbon tetrachloride (80 mL) was refluxed under a UV lamp (254 nm). After 2 h, the reaction was cooled, and DCM (80 mL) was added. The mixture was washed with H$_2$O, saturated aq. NaS$_2$O$_3$, and 10% aq. Na$_2$CO$_3$. The organic layer was dried over Na$_2$SO$_4$, filtered, and concentrated. The resulting residue was purified by silica gel column chromatography, eluting first with acetone in DCM (13→20%) to afford the corresponding bromide epimers 6 (0.89 g, 80% yield) as an off-white foam. $R_f$ 0.5 (4:1 DCM/acetone); HRMS (ESI-TOF) calcd for C$_{27}$H$_{36}$BrNO$_{18}$Na [M+Na]$^+$:766.0993; found: 766.0999. Note: Carbon tetrachloride (CCl$_4$) is highly toxic. Obtain special instructions before use and do not handle until all safety precautions have been read and understood.

A solution of bromide 6 (0.89 g, 1.2 mmol) in toluene (30 mL) was bubbled with argon for 10 min. Tributyltin hydride (0.70 g, 2.4 mmol) and AIBN (19 mg in 1 mL of toluene) were added, and the reaction was heated at 105° C. After 30 min, the mixture was concentrated, the residue dissolved in CH$_3$CN (30 mL), and the resulting solution was washed three times with hexanes. The CH$_3$CN solution was then concentrated, and the residue was purified by silica gel column chromatography, eluting first with acetone in DCM (10→15%) to afford GlcN-GlcA building block 3 (0.26 g, 33% yield) as a white foam.

R$_f$ 0.6 (4:1 DCM/acetone); $^1$H NMR (500 MHz, CDCl$_3$): δ 5.79 (d, J=7.5 Hz, 1H, H-1), 5.58 (d, J=9.0 Hz, 1H, NH), 5.33 (t, J=9.0 Hz, 1H, H-3), 5.17 (d, J=3.8 Hz, 1H, H-1'), 5.10 (t, J=10.0 Hz, 1H, H-4'), 5.06 (t, J=10.0 Hz, 1H, H-3'), 5.02 (dd, J=9.0, 7.5 Hz, 1H, H-2), 4.34 (t, J=9.0 Hz, 1H, H-4), 4.30 (ddd, J=10.0, 9.0, 3.8 Hz, 1H, H-2'), 4.21 (d, J=9.0 Hz, 1H, H-5), 4.20 (dd, J=12.4, 3.8 Hz, 1H, H-6'), 4.11 (dd, J=12.4, 2.0 Hz, 1H, H-6'), 3.79 (s, 3H, OCH$_3$), 3.66-3.62 (m, 1H, H-5'), 2.12 (s, 3H), 2.11 (s, 3H), 2.03 (s, 3H), 2.02 (s, 6H), 2.01 (s, 3H), 1.94 (s, 3H); $^{13}$C NMR (125 MHz, CDCl$_3$): δ 171.6 (C=O), 170.9 (C=O), 170.5 (C=O), 170.4 (C=O), 169.4 (C=O), 169.2 (C=O), 168.8 (C=O), 167.9 (C=O), 97.7 (C-1'), 91.6 (C-1), 74.4 (C-5), 74.3 (C-3), 73.0 (C-4), 70.7 (C-2), 70.5 (C-3'), 68.8 (C-5'), 67.5 (C-4'), 61.4 (C-6'), 53.1 (OCH$_3$), 51.7 (C-2'), 23.1, 20.9, 20.86, 20.83, 20.82, 20.7, 20.6; HRMS (ESI-TOF) calcd for C$_{27}$H$_{37}$NO$_{18}$Na [M+Na]$^+$: 686.1909; found: 686.1922. Further elution with acetone in DCM (15→25%) afforded GlcN-IdoA building block 1 (0.49 g, 62% yield). Note: Tributyltin hydride (Bu$_3$SnH) is highly toxic. Obtain special instructions before use and do not handle until all safety precautions have been read and understood.

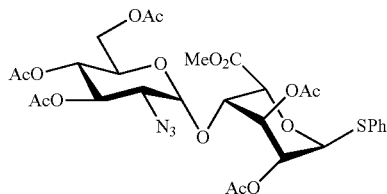

Methyl (2-azido-3,4,6-tri-O-acetyl-2-deoxy-α-D-glucopyranosyl)-(1→4)-(2,3-di-O-acetyl-1-phenyl-thio-α-L-idopyranoside)uronate (7)

To a solution of compound 1b (3.9 g, 6.0 mmol) in anhydrous DCM (190 mL) were added trimethyl(phenylthio)silane (TMSSPh, 4.6 mL, 24 mmol) and ZnI$_2$ (5.8 g, 18 mmol). After stirring at RT overnight, the mixture was filtered, diluted with DCM (400 mL), and the organic layer was washed with saturated aq. NaHCO$_3$, dried over Na$_2$SO$_4$, and concentrated. The residue was purified by silica gel column chromatography (elution with 3:1→3:2 hexanes/EtOAc) to afford compound 7 (3.69 g, 88%) as a colorless foam.

R$_f$ 0.54 (1:1 hexanes/EtOAc); $^1$H NMR (400 MHz, CDCl$_3$): δ 7.54-7.50 (m, 2H, Ar), 7.35-7.29 (m, 3H, Ar), 5.66 (d, J=1.0 Hz, 1H, H-1), 5.41 (dd, J=10.6, 9.3 Hz, 1H, H-3'), 5.29 (td, J=3.5, 1.0 Hz, 1H, H-3), 5.24 (d, J=2.4 Hz, 1H, H-5), 5.13 (d, J=3.5 Hz, 1H, H-1'), 5.09-5.04 (m, 2H, H-4', H-2), 4.25 (dd, J=4.2, 3.5 Hz, 1H, H-6'), 4.19-4.14 (m, 3H, H-5', H-6', H-4), 3.87 (s, 3H, OCH$_3$), 3.49 (dd, J=10.6, 3.5 Hz, 1H, H-2'), 2.22 (s, 3H, CH$_3$C=O), 2.20 (s, 3H, CH$_3$C=O), 2.09 (s, 6H), 2.02 (s, 3H, CH$_3$C=O); $^{13}$C NMR (100 MHz, CDCl$_3$): δ 170.7 (C=O), 170.0 (C=O), 169.9 (C=O), 169.7 (C=O), 168.9 (C=O), 168.8 (C=O), 134.1 (Ar), 131.8 (Ar), 129.2 (Ar), 128.0 (Ar), 98.6 (C-1'), 86.3 (C-1), 73.6 (C-4), 70.6 (C-3'), 68.6 (C-5', C-5), 68.5 (C-2), 68.1 (C-4'), 67.2 (C-3), 61.3 (C-6'), 61.2 (C-2'), 52.7 (OCH$_3$), 20.9 (CH$_3$), 20.73 (CH$_3$), 20.68 (2XCH$_3$), 20.6 (CH$_3$); HRMS (FAB) calcd for C$_{29}$H$_{36}$O$_{15}$SN$_3$ [M+H]$^+$: 698.1867; found: 698.1869.

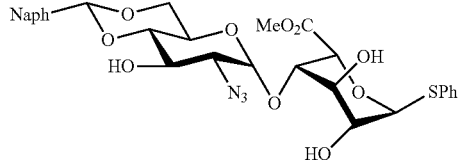

Methyl (2-azido-2-deoxy-4,6-O-2-naphthylidene-α-D-glucopyranosyl)-(1→4)-(1-phenylthio-α-L-idopyranoside)uronate (8)

To a solution of disaccharide 7 (1.7 g, 2.4 mmol) in anhydrous MeOH (20 mL) was added a solution of NaOMe in MeOH (0.05M, 20 mL) at RT. After stirring for 3 h, the reaction was quenched with IR-120 resin. The solution was filtered and concentrated under reduced pressure to give the unprotected disaccharide. 2-(Dimethoxymethyl)naphthalene (0.97 g, 4.8 mmol) and p-toluenesulfonic acid (0.12 g, 0.62 mmol) were subsequently added to a solution of this disaccharide in CH$_3$CN (85 mL) under argon. The reaction was heated at 50° C. for 3 h and then quenched by Et$_3$N (120 µL, 0.85 mmol). The reaction was concentrated, and the crude residue was purified by silica gel column chromatography (elution with 2:1→1:2 hexanes/EtOAc) to afford compound 8 (1.25 g, 82%) as a colorless foam.

R$_f$ 0.43 (2:3 hexanes/EtOAc); $^1$H NMR (400 MHz, CD$_3$COCD$_3$): δ 8.02 (s, 1H, Ar), 7.97-7.93 (m, 3H, Ar), 7.65-7.53 (m, 5H, Ar), 7.37-7.25 (m, 3H, Ar), 5.82 (s, 1H, CH(O)$_2$), 5.58 (d, J=2.9 Hz, 1H, H-1), 5.37 (d, J=3.9 Hz, 1H, H-1'), 5.36 (d, J=4.5 Hz, 1H, OH), 5.25 (d, J=2.7 Hz, 1H, H-5), 5.04 (d, J=3.8 Hz, 1H, OH), 4.30 (dd, J=9.9, 4.4 Hz, 1H, H-6'), 4.28-4.25 (m, 1H, H-3), 4.20 (t, J=3.5 Hz, 1H, H-4), 4.02 (td, J=9.4, 4.5 Hz, 1H, H-3'), 3.85 (t, J=9.9 Hz, 1H, H-6'), 3.85 (s, 3H, OCH$_3$), 3.78-3.70 (m, 3H, H-2', H-2, H-5'), 3.67 (t, J=9.4 Hz, 1H, H-4'); $^{13}$C NMR (100 MHz, CD$_3$COCD$_3$): δ 169.5 (C=O), 136.7 (Ar), 135.5 (Ar), 133.7 (Ar), 132.9 (Ar), 130.3 (Ar), 128.9 (Ar), 128.2 (Ar), 127.8 (Ar), 127.6 (Ar), 126.8 (Ar), 126.4 (Ar), 126.2 (Ar), 125.7 (Ar), 124.2 (Ar), 101.6 (CH(O)$_2$), 96.4 (C-1'), 88.6 (C-1), 81.4 (C-4'), 74.1 (C-4), 71.6 (C-2), 69.8 (C-3'), 68.5 (C-5), 68.1 (C-6'), 66.6 (C-3), 64.2 (C-2'), 63.5 (C-5'), 51.6 (OCH$_3$); HRMS (FAB) calcd for C$_{30}$H$_{32}$O$_{10}$SN$_3$ [M+H]$^+$: 626.1808; found: 626.1829.

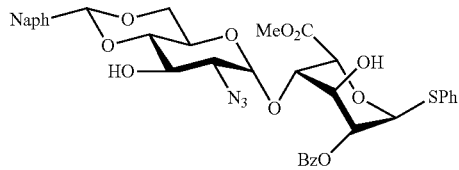

Methyl (2-azido-2-deoxy-4,6-O-2-naphthylidene-α-D-glucopyranosyl)-(1→4)-(2-O-benzoyl-1-phenyl-thio-α-L-idopyranoside)uronate (9)

To a solution of 8 (1.2 g, 2.0 mmol) in anhydrous toluene (0.40 L) were added n-Bu$_2$SnO (2.0 g, 8.0 mmol), BzCl (0.84 g, 6.0 mmol), TBAI (1.5 g, 4.6 mmol) and 4 Å molecular sieves. The mixture was heated at 70° C. for 4 h, after which it was diluted with EtOAc (300 mL). The organic layer was washed with saturated aq. NaHCO$_3$ (300 mL), brine (300 mL), and dried over Na$_2$SO$_4$. The solution was concentrated under reduced pressure, and the crude residue was purified by silica gel column chromatography (elution with 3:1→2:1 hexanes/EtOAc) to afford compound 9 (1.4 g, 91%) as a colorless foam.

$R_f$ 0.56 (1:1 hexanes/EtOAc); $^1$H NMR (400 MHz, CD$_3$COCD$_3$): δ 8.17-8.15 (m, 2H, Ar), 8.05 (s, 1H, Ar), 7.97-7.93 (m, 3H, Ar), 7.68-7.47 (m, 8H, Ar), 7.36-7.26 (m, 3H, Ar), 5.88 (d, J=3.5 Hz, 1H, H-1), 5.82 (s, 1H, CH(O)$_2$), 5.39 (d, J=4.3 Hz, 1H, OH), 5.31 (d, J=3.5 Hz, 1H, H-5), 5.25 (t, J=3.5 Hz, 1H, H-2), 5.24 (d, J=3.5 Hz, 1H, H-1'), 5.08 (d, J=4.4 Hz, 1H, OH), 4.28-4.25 (appt, J=4.5 Hz, 1H, H-3), 4.38 (dd, J=10.0, 4.9 Hz, 1H, H-6'), 4.26 (dd, J=4.5, 3.5 Hz, 1H, H-4), 4.12-4.01 (m, 2H, H-3', H-5'), 3.83 (s, 3H, OCH$_3$), 3.81 (t, J=10.0 Hz, 1H, H-6'), 3.64 (t, J=9.5 Hz, 1H, H-4'), 3.43 (dd, J=10.0, 3.5 Hz, 1H, H-2'); $^{13}$C NMR (100 MHz, CD$_3$COCD$_3$): δ 169.2 (C=OOCH$_3$), 165.2 (C=OPh), 135.6 (Ar), 135.5 (Ar), 133.7 (Ar), 133.1 (Ar), 132.9 (Ar), 130.8 (Ar), 129.9 (Ar), 129.7 (Ar), 128.9 (Ar), 128.6 (Ar), 128.2 (Ar), 127.7 (Ar), 127.6 (Ar), 127.2 (Ar), 126.4 (Ar), 126.2 (Ar), 125.7 (Ar), 124.3 (Ar), 101.6 (CH(O)$_2$), 99.6 (C-1'), 85.5 (C-1), 81.9 (C-4'), 76.5 (C-4), 72.1 (C-2), 69.3 (C-5), 68.8 (C-3'), 68.3 (C-6'), 67.7 (C-3), 63.9 (C-2'), 63.5 (C-5'), 51.6 (OCH$_3$); HRMS (FAB) calcd for C$_{37}$H$_{36}$O$_{11}$SN$_3$ [M+H]$^+$: 730.2071; found: 730.2058. Note: Dibutyltin oxide (n-Bu$_2$SnO) is highly toxic. Obtain special instructions before use and do not handle until all safety precautions have been read and understood.

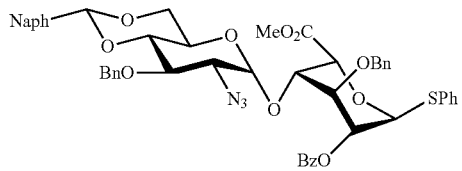

Methyl (2-azido-3-O-benzyl-2-deoxy-4,6-O-2-naphthylidene-α-D-glucopyranosyl)-(1→4)-(2-O-benzoyl-3-O-benzyl-1-phenylthio-α-L-idopyranoside) uronate (10)

To a solution of compound 9 (0.90 g, 1.2 mmol) in anhydrous DCM (35 mL) and DMF (35 mL) were added 4 Å molecular sieves, BnBr (9.0 mL, 76 mmol) and freshly prepared Ag$_2$O (9.0 g, 38 mmol). After stirring at RT for 12 h, the reaction was filtered, concentrated, and the crude residue was purified by silica gel column chromatography (elution with 7:1→5:1 hexanes/EtOAc) to afford compound 10 (0.81 g, 72%) as a colorless foam.

$R_f$ 0.74 (2:1 hexanes/EtOAc); $^1$H NMR (400 MHz, CD$_3$COCD$_3$): δ 8.20-8.18 (m, 2H, Ar), 8.07 (s, 1H, Ar), 8.00-7.95 (m, 3H, Ar), 7.70-7.55 (m, 7H, Ar), 7.46-7.18 (m, 14H, Ar), 5.97 (s, 1H, H-1), 5.87 (s, 1H, CH(O)$_2$), 5.44-5.43 (m, 1H, H-2), 5.37 (d, J=2.0 Hz, 1H, H-5), 5.08 (d, J=3.6 Hz, 1H, H-1'), 5.02 (d, J=11.6 Hz, 1H, Bn), 4.92 (d, J=11.6 Hz, 1H, Bn), 4.50 (d, J=11.3 Hz, 1H, Bn), 4.40 (dd, J=10.0, 5.0 Hz, 1H, H-6'), 4.37-4.33 (m, 2H, H-3, H-4), 4.10 (td, J=10.0, 5.0 Hz, 1H, H-5'), 3.98 (d, J=11.3 Hz, 1H, Bn), 3.82 (t, J=10.0 Hz, 1H, H-6'), 3.81 (s, 3H, OCH$_3$), 3.80 (t, J=10.0 Hz, 1H, H-4'), 3.67 (t, J=10.0 Hz, 1H, H-3'), 3.50 (dd, J=10.0, 3.6 Hz, 1H, H-2'); $^{13}$C NMR (100 MHz, CD$_3$COCD$_3$): δ 168.7 (C=OOCH$_3$), 165.1 (C=OPh), 138.5 (Ar), 137.7 (Ar), 135.6 (Ar), 135.5 (Ar), 133.7 (Ar), 133.2 (Ar), 133.0 (Ar), 131.2 (Ar), 130.1 (Ar), 129.9 (Ar), 129.0 (Ar), 128.8 (Ar), 128.3 (Ar), 128.3 (Ar), 128.0 (Ar), 127.9 (Ar), 127.8 (Ar), 127.4 (Ar), 127.3 (Ar), 126.7 (Ar), 126.5 (Ar), 126.3 (Ar), 125.5 (Ar), 124.1 (Ar), 101.2 (CH(O)$_2$), 100.1 (C-1'), 86.6 (C-1), 82.3 (C-4'), 76.9 (C-3'), 76.1 (C-4), 74.1 (CH$_2$Ph), 73.2 (C-3), 72.5 (CH$_2$Ph), 69.2 (C-2), 68.3 (C-5), 68.2 (C-6'), 63.6 (C-5'), 63.3 (C-2'), 51.6 (OCH$_3$); HRMS (FAB) calcd for C$_{51}$H$_{48}$O$_{11}$SN$_3$ [M+H]$^+$: 910.3010; found: 910.3022.

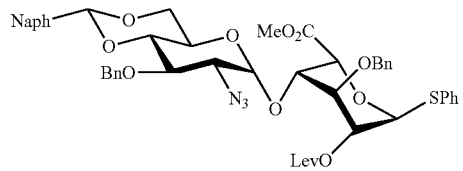

Methyl (2-azido-3-O-benzyl-2-deoxy-4,6-O-2-naphthylidene-α-D-glucopyranosyl)-(1→4)-(3-O-benzyl-2-O-levulinoyl-1-phenylthio-α-L-idopyranoside) uronate (11)

To a solution of disaccharide 10 (0.60 g, 0.66 mmol) in anhydrous DCM (12 mL) was added a solution of NaOMe in MeOH (0.05M, 24 mL) at RT. After stirring for 4 h, the reaction was quenched with 1M of aq. NH$_4$Cl (10 mL). DCM (120 mL) was then added, and the organic layer was washed with brine, dried over Na$_2$SO$_4$ and concentrated under reduced pressure to give the crude disaccharide intermediate. The intermediate was dissolved in DCM (6.0 mL), and EDC (1.3 g, 6.6 mmol), LevOH (0.78 g, 6.6 mmol), and DMAP (60 mg) were added at RT. The mixture was stirred at RT for 10 h. DCM (120 mL) was then added, and the organic layer was washed with brine, dried over Na$_2$SO$_4$, and concentrated. Purification by silica gel column chromatography (elution with 3:1→2:1 hexanes/EtOAc) afforded compound 11 (0.56 g, 91%) as a colorless foam.

$R_f$ 0.57 (2:1 hexanes/EtOAc); $^1$H NMR (400 MHz, CD$_3$COCD$_3$): δ 8.05 (s, 1H, Ar), 7.97-7.92 (m, 3H, Ar), 7.66-7.50 (m, 7H, Ar), 7.43-7.27 (m, 11H, Ar), 5.90 (s, 1H, CH(O)$_2$), 5.66 (d, J=2.2 Hz, 1H, H-1), 5.26 (d, J=2.4 Hz, 1H, H-5), 5.21 (d, J=3.6 Hz, 1H, H-1'), 5.20-5.19 (m, 1H, H-2), 5.02 (d, J=11.5 Hz, 1H, Bn), 4.91 (d, J=11.6 Hz, 1H, Bn), 4.83 (d, J=11.5 Hz, 1H, Bn), 4.82 (d, J=11.6 Hz, 1H, Bn), 4.36 (dd, J=10.0, 4.6 Hz, 1H, H-6'), 4.29 (t, J=3.0 Hz, 1H, H-4), 4.15 (t, J=3.0 Hz, 1H, H-3), 4.04-3.97 (m, 2H, H-3', H-5'), 3.91 (t, J=9.5 Hz, 1H, H-4'), 3.85 (t, J=10.0 Hz, 1H, H-6'), 3.80 (s, 3H, OCH$_3$), 3.62 (dd, J=9.8, 3.6 Hz, 1H, H-2'), 2.88-2.77 (m, 2H, CH$_2$), 2.70-2.66 (m, 2H, CH$_2$), 2.07 (s, 3H, CH$_3$C=O); $^{13}$C NMR (100 MHz, CD$_3$COCD$_3$): δ 205.5 (CH$_3$C=O), 171.7 (C=OCH$_2$), 168.8 (C=OOCH$_3$), 138.6 (Ar), 137.8 (Ar), 135.6 (Ar), 135.5 (Ar), 133.7 (Ar), 133.0 (Ar), 130.9 (Ar), 129.0 (Ar), 128.4 (Ar), 128.3 (Ar), 128.2 (Ar), 127.9 (Ar), 127.8 (Ar), 127.6 (Ar), 127.5 (Ar), 127.3 (Ar), 126.4 (Ar), 126.2 (Ar), 125.4 (Ar), 124.0 (Ar), 101.3 (CH(O)$_2$), 98.5 (C-1'), 85.9 (C-1), 82.4 (C-4'), 76.5 (C-3'), 74.3 (CH$_2$Ph), 73.7 (C-4), 72.9 (C-3), 72.6 (CH$_2$Ph), 68.9 (C-2), 68.6 (C-5), 68.3 (C-6'), 63.5 (C-5'), 63.1 (C-2'), 51.6 (OCH$_3$), 37.4 (CH$_2$), 28.8 (C=OCH$_3$), 27.8 (CH$_2$); HRMS (FAB) calcd for C$_{49}$H$_{50}$O$_{12}$N$_3$S [M+H]$^+$: 904.3115; found: 904.3136.

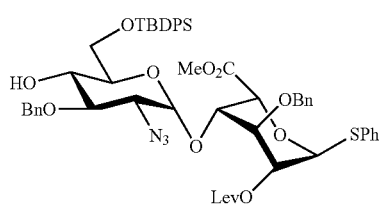

Methyl (2-azido-3-O-benzyl-2-deoxy-6-O-tert-butyl-diphenylsilyl-α-D-glucopyranosyl)-(1→4)-(3-O-benzyl-2-O-levulinoyl-1-phenylthio-α-L-idopyranoside)uronate (12)

To a solution of compound 11 (0.46 g, 0.51 mmol) in anhydrous MeOH (2.0 mL) and DCM (20 mL) was added p-toluenesulfonic acid (50 mg, 0.25 mmol) at RT. The reaction was stirred for 12 h, washed with water, and the organic phase was concentrated to give the crude diol product. To a solution of this diol in anhydrous DCM were added TBDPSCl (1.4 g, 5.1 mmol) and imidazole (0.52 g, 7.6 mmol). After stirring at RT for 12 h, the reaction was washed with brine, dried over $H_2SO_4$, and concentrated. Purification by silica gel column chromatography (elution with 4:1→3:1 hexanes/EtOAc) afforded the 6-OTBDPS-protected disaccharide 12 (0.44 g, 85%) as a colorless foam.

$R_f$ 0.57 (2:1 hexanes/EtOAc); $^1H$ NMR (400 MHz, $CD_3COCD_3$): δ 7.81-7.78 (m, 4H, Ar), 7.55-7.53 (m, 2H, Ar), 7.47-7.41 (m, 10H, Ar), 7.38-7.29 (m, 9H, Ar), 5.66 (d, J=3.6 Hz, 1H, H-1), 5.29 (d, J=3.5 Hz, 1H, H-1'), 5.19 (d, J=3.5 Hz, 1H, H-5), 5.16 (t, J=3.6 Hz, 1H, H-2), 5.06 (d, J=11.1 Hz, 1H, Bn), 4.87 (d, J=11.5 Hz, 1H, Bn), 4.84 (d, J=11.1 Hz, 1H, Bn), 4.78 (d, J=11.5 Hz, 1H, Bn), 4.30 (t, J=3.6 Hz, 1H, H-4), 4.22 (t, J=4.1 Hz, 1H, H-3), 4.06-3.99 (m, 2H, H-6'), 3.93-3.80 (m, 3H, H-3', H-4', H-5'), 3.73 (s, 3H, $OCH_3$), 3.42 (dd, J=10.0, 3.5 Hz, 1H, H-2'), 2.84-2.82 (m, 2H, $CH_2$), 2.74-2.65 (m, 2H, $CH_2$), 2.15 (s, 3H, $CH_3C=O$), 1.06 (s, 9H, t-Bu); $^{13}C$ NMR (100 MHz, $CD_3COCD_3$): δ 206.6 ($CH_3C=O$), 171.8 ($C=OCH_2$), 168.9 ($C=OOCH_3$), 138.9 (Ar), 137.8 (Ar), 135.7 (Ar), 135.5 (Ar), 135.2 (Ar), 133.6 (Ar), 133.4 (Ar), 131.1 (Ar), 129.7 (Ar), 129.0 (Ar), 128.3 (Ar), 128.1 (Ar), 127.8 (Ar), 127.7 (Ar), 127.6 (Ar), 127.4 (Ar), 96.9 (C-1'), 85.1 (C-1), 79.9 (C-4'), 74.5 ($CH_2Ph$), 73.5 (C-3'), 72.9 (C-3, Bn), 71.8 (C-4), 70.5 (C-5'), 69.7 (C-5), 69.3 (C-2), 63.1 (C-6'), 63.0 (C-2'), 51.5 ($OCH_3$), 37.4 ($CH_2$), 28.8 ($C=OCH_3$), 27.7 ($CH_2$), 26.4 ($C(CH_3)_3$), 19.0 ($C(CH_3)_3$); HRMS (FAB) calcd for $C_{54}H_{62}SiO_{12}N_3S$ $[M+H]^+$: 1004.3823; found: 1004.3836.

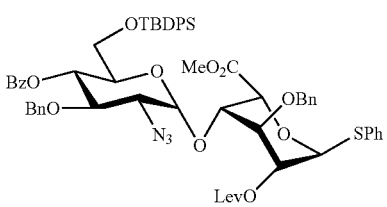

Methyl (2-azido-3-O-benzyl-4-O-benzoyl-2-deoxy-6-O-tert-butyldiphenylsilyl-α-D-glucopyranosyl)-(1→4)-(3-O-benzyl-2-O-levulinoyl-1-phenylthio-α-L-idopyranoside)uronate (13)

To a solution of the 6-OTBDPS-protected disaccharide 12 (0.44 g, 0.43 mmol) in pyridine (10 mL) was added BzCl (1.5 g, 11 mmol) at RT. After stirring overnight, the mixture was concentrated under reduced pressure, and the residue was dissolved in DCM (100 mL). The organic layer was washed with brine, dried over $Na_2SO_4$, and concentrated. Purification by silica gel column chromatography (elution with 4:1→3:1 hexanes/EtOAc) gave compound 13 (0.45 g, 93%) as a colorless foam.

$R_f$ 0.58 (2:1 hexanes/EtOAc); $^1H$ NMR (400 MHz, $CD_3COCD_3$): δ 8.10-8.08 (m, 2H, Ar), 7.76-7.70 (m, 3H, Ar), 7.65-7.54 (m, 6H, Ar), 7.47-7.45 (m, 2H, Ar), 7.40-7.19 (m, 17H, Ar), 5.68 (d, J=3.1 Hz, 1H, H-1), 5.63 (dd, J=10.1, 9.3 Hz, 1H, H-4'), 5.40 (d, J=3.5 Hz, 1H, H-1'), 5.24 (d, J=3.0 Hz, 1H, H-5), 5.21 (t, J=3.3 Hz, 1H, H-2), 4.90 (d, J=11.5 Hz, 1H, Bn), 4.82 (d, J=10.8 Hz, 1H, Bn), 4.81 (d, J=11.5 Hz, 1H, Bn), 4.69 (d, J=10.8 Hz, 1H, Bn), 4.34 (t, J=3.4 Hz, 1H, H-4), 4.25 (t, J=3.3 Hz, 1H, H-3), 4.19-4.14 (m, 1H, H-5'), 4.15 (dd, J=10.3, 9.3 Hz, 1H, H-3'), 3.86 (dd, J=11.5, 2.5 Hz, 1H, H-6'), 3.81 (dd, J=11.5, 3.6 Hz, 1H, H-6'), 3.73 (s, 3H, $OCH_3$), 3.72 (dd, J=10.3, 3.5 Hz, 1H, H-2'), 2.86-2.83 (m, 2H, $CH_2$), 2.77-2.73 (m, 2H, $CH_2$), 2.15 (s, 3H, $CH_3C=O$), 1.02 (s, 9H, t-Bu); $^{13}C$ NMR (100 MHz, $CD_3COCD_3$): δ 205.6 ($CH_3C=O$), 171.8 ($C=OCH_2$), 168.9 ($C=OOCH_3$), 164.7 ($C=OPh$), 137.9 (Ar), 137.8 (Ar), 135.6 (Ar), 135.4 (Ar), 135.3 (Ar), 133.4 (Ar), 133.0 (Ar), 132.9 (Ar), 131.1 (Ar), 129.9 (Ar), 129.7 (Ar), 129.6 (Ar), 129.0 (Ar), 128.8 (Ar), 128.3 (Ar), 128.1 (Ar), 128.0 (Ar), 127.8 (Ar), 127.7 (Ar), 127.6 (Ar), 127.5 (Ar), 127.4 (Ar), 97.1 (C-1'), 85.4 (C-1), 77.9 (C-3'), 74.3 ($CH_2Ph$), 72.8 ($CH_2Ph$), 72.6 (C-3), 72.3 (C-4), 71.4 (C-5'), 70.6 (C-4'), 69.2 (C-5), 69.1 (C-2), 63.1 (C-2'), 62.4 (C-6'), 51.6 ($OCH_3$), 37.4 ($CH_2$), 28.8 ($C=OCH_3$), 27.7 ($CH_2$), 26.4 ($C(CH_3)_3$), 18.0 ($C(CH_3)_3$); HRMS (FAB) calcd for $C_{61}H_{66}SiO_{13}N_3S$ $[M+H]^+$: 1108.4086; found: 1108.4091.

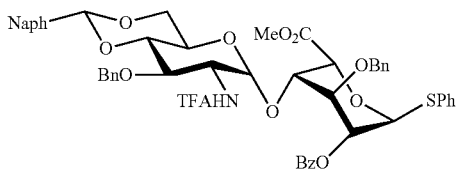

Methyl (3-O-benzyl-2-deoxy-4,6-O-2-naphthylidene-2-trifluoroacetamido-α-D-glucopyranosyl)-(1→4)-(2-O-benzoyl-3-O-benzyl-1-phenylthio-α-L-idopyranoside)uronate (14)

Triethylamine (0.80 mL) and 1,3-propanedithiol (0.80 mL) were added to a solution of compound 10 (0.40 g, 0.44 mol) in 5:1 pyridine/water (24 mL) at RT. The reaction was stirred at 50° C. for 5 h, after which it was concentrated to give the crude disaccharide, which was used in the next step without purification. To the crude disaccharide in pyridine (8.0 mL) was added TFAA (1.6 mL) dropwise at 0° C. After stirring for 2 h at RT, the mixture concentrated under reduced pressure and then dissolved in DCM (80 mL). The organic layer was washed with brine, dried over $Na_2SO_4$, and concentrated. Purification by silica gel column chromatography (elution with 4:1→3:1 hexanes/EtOAc) gave compound 14 (0.35 g, 81%) as a colorless foam.

$R_f$ 0.63 (2:1 hexanes/EtOAc); $^1H$ NMR (400 MHz, $CD_3COCD_3$): δ 8.13-8.10 (m, 3H, Ar), 8.00-7.95 (m, 3H, Ar), 7.73-7.49 (m, 7H, Ar), 7.41-7.13 (m, 14H, Ar), 5.96 (s, 1H, $CH(O)_2$), 5.93 (s, 1H, H-1), 5.54-5.53 (m, 1H, H-2), 5.41 (d, J=1.7 Hz, 1H, H-5), 5.25 (d, J=3.5 Hz, 1H, H-1'), 4.97 (d, J=12.0 Hz, 1H, Bn), 4.89 (d, J=12.0 Hz, 1H, Bn), 4.67 (d, J=11.7 Hz, 1H, Bn), 4.58 (t, J=2.2 Hz, 1H, H-4), 4.52-4.45 (m, 2H, H-5', H-6'), 4.38 (td, J=3.2, 1.0 Hz, 1H, H-3), 4.28-4.22 (m, 1H, H-2'), 4.15 (d, J=11.7 Hz, 1H, Bn), 4.02 (t, J=9.5 Hz, 1H, H-3'), 3.99-3.87 (m, 2H, H-4', H-6'), 3.82 (s, 3H, OCH$_3$); $^{13}$C NMR (100 MHz, CD$_3$COCD$_3$): δ 168.7 (C=OOCH$_3$), 165.0 (C=OPh), 157.0 (q, $^2J_{C,F}$=37.1 Hz, CF$_3$C=O), 139.0 (Ar), 137.7 (Ar), 135.6 (Ar), 135.5 (Ar), 133.7 (Ar), 133.1 (Ar), 133.0 (Ar), 131.5 (Ar), 129.8 (Ar), 129.0 (Ar), 128.9 (Ar), 128.4 (Ar), 128.35 (Ar), 128.31 (Ar), 127.9 (Ar), 127.8 (Ar), 127.7 (Ar), 127.5 (Ar), 127.4 (Ar), 126.7 (Ar), 126.5 (Ar), 126.3 (Ar), 125.5 (Ar), 124.2 (Ar), 115.9 (q, $^1J_{C,F}$=286.5 Hz, CF$_3$), 101.4 (CH(O)$_2$), 99.3 (C-1'), 87.2 (C-1), 82.9 (C-4'), 75.8 (C-3'), 75.5 (C-4), 74.6 (C-3), 74.0 (CH$_2$Ph), 72.4 (CH$_2$Ph), 69.4 (C-2), 68.3 (C-6'), 68.0 (C-5), 63.8 (C-5'), 54.0 (C-2'), 51.5 (OCH$_3$); HRMS (FAB) calcd for C$_{53}$H$_{49}$O$_{12}$SNF$_3$ [M+H]$^+$: 980.2928; found: 980.3380.

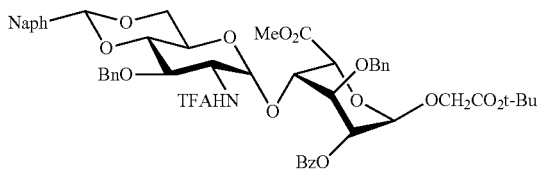

Methyl (3-O-benzyl-2-deoxy-4,6-O-2-naphth-ylidene-2-trifluoroacetamido-α-D-glucopyranosyl)-(1→4)-(2-O-benzoyl-3-O-benzyl-1-O-2-((tert-butoxy)-2-oxoacetyl)-α-L-idopyranoside)uronate (15)

A mixture of donor 14 (0.20 g, 0.20 mmol), t-butyl 2-hydroxyacetate (0.11 g, 0.80 mmol), and powdered 4 Å molecular sieves was suspended in anhydrous DCM (12 mL) and stirred at RT. After 10 min, NIS (0.11 g, 0.50 mmol) and AgOTf (26 mg, 0.10 mmol) were added. The solution was stirred for 8 h before Et$_3$N (50 µL) was added and the mixture was filtered. The filtrate was concentrated, and the resulting residue was purified by silica gel column chromatography (elution with 5:1→4:1 hexanes/EtOAc) to afford compound 15 (0.16 g, 82%) as a colorless foam.

R$_f$ 0.49 (2:1 hexanes/EtOAc); $^1$H NMR (400 MHz, CD$_3$COCD$_3$): δ 8.43 (d, J=8.8 Hz, 1H, NH), 8.14-8.12 (m, 3H, Ar), 8.01-7.96 (m, 3H, Ar), 7.76-7.74 (m, 1H, Ar), 7.60-7.55 (m, 2H, Ar), 7.46-7.27 (m, 8H, Ar), 7.26-7.20 (m, 3H, Ar), 7.15-7.13 (m, 2H, Ar), 5.98 (s, 1H, NapCH), 5.38-5.37 (m, 1H, H-2), 5.30 (s, 1H, H-1), 5.21-5.20 (m, 2H, H-1', H-5), 4.93 (d, J=12.0 Hz, 1H, Bn), 4.81 (d, J=12.0 Hz, 1H, Bn), 4.70 (d, J=11.7 Hz, 1H, Bn), 4.53-4.45 (m, 3H, H-4, H-6', H-5'), 4.33 (d, J=16.5 Hz, 1H, CH$_2$CO$_2$t-Bu), 4.29-4.28 (m, 1H, H-3), 4.26-4.17 (m, 3H, Bn, H-2', CH$_2$CO$_2$t-Bu), 4.04 (t, J=9.2 Hz, 1H, H-3'), 3.99-3.89 (m, 2H, H-4', H-6'), 3.79 (s, 3H, OCH$_3$), 1.46 (s, 9H, C(CH$_3$)$_3$); $^{13}$C NMR (100 MHz, CD$_3$COCD$_3$): δ 169.1 (C=OOCH$_3$), 168.7 (CO$_2$t-Bu), 164.8 (C=OPh), 157.0 (q, $^2J_{C,F}$=37.0 Hz, CF$_3$C=O), 139.0 (Ar), 138.1 (Ar), 135.6 (Ar), 133.7 (Ar), 133.2 (Ar), 133.0 (Ar), 129.8 (Ar), 129.7 (Ar), 128.9 (Ar), 128.31 (Ar), 128.27 (Ar), 127.94 (Ar), 127.88 (Ar), 127.7 (Ar), 127.6 (Ar), 127.4 (Ar), 127.1 (Ar), 126.7 (Ar), 126.5 (Ar), 126.3 (Ar), 125.6 (Ar), 124.2 (Ar), 116.1 (q, $^1J_{C,F}$=286.0 Hz, CF$_3$), 101.5 (NapCH), 100.0 (C-1), 98.7 (C-1'), 83.0 (C-4'), 80.9 (OC(CH$_3$)$_3$), 75.8 (C-3'), 75.2 (C-3), 75.0 (C-4), 74.0 (CH$_2$Ph), 71.8 (CH$_2$Ph), 68.3 (C-6'), 67.8 (C-2), 67.3 (C-5), 65.5 (OCH$_2$CO$_2$t-Bu), 63.8 (C-5'), 54.1 (C-2'), 51.3 (OCH$_3$), 27.3 (OC(CH$_3$)$_3$); HRMS (ESI) calcd for C$_{53}$H$_{54}$F$_3$NO$_{15}$Na [M+Na]$^+$: 1024.3343; found: 1024.3318.

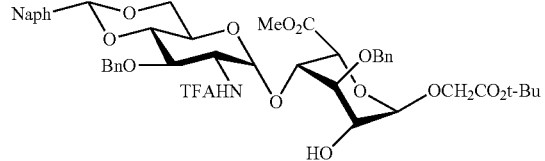

Methyl (3-O-benzyl-2-deoxy-4,6-O-2-naphth-ylidene-2-trifluoroacetamido-α-D-glucopyranosyl)-(1→4)-(3-O-benzyl-1-O-2-((tert-butoxy)-2-oxoacetyl)-α-L-idopyranoside)uronate (16)

To a solution of disaccharide 15 (0.15 g, 0.15 mmol) in anhydrous DCM (42 mL) was added the solution of NaOMe in MeOH (0.05M, 0.70 mL) at RT. After stirring for 6 h, additional NaOMe (0.05M in MeOH, 0.30 mL) was added at RT. The reaction was stirred for another 2 h and then quenched with saturated aq. NH$_4$Cl. The organic layer was washed with brine, dried over Na$_2$SO$_4$, and concentrated under reduced pressure. Purification by silica gel column chromatography (elution with 4:1→2:1 hexanes/EtOAc) afforded compound 16 (0.12 g, 89%) as a colorless foam.

R$_f$ 0.31 (2:1 hexanes/EtOAc); $^1$H NMR (400 MHz, CD$_3$COCD$_3$): δ 8.55 (d, J=8.9 Hz, 1H, NH), 8.06-7.93 (m, 4H, Ar), 7.67-7.65 (m, 1H, Ar), 7.56-7.54 (m, 2H, Ar), 7.46-7.22 (m, 10H, Ar), 5.91 (s, 1H, NapCH), 5.26 (d, J=3.6 Hz, 1H, H-1'), 5.09 (d, J=2.0 Hz, 1H, H-5), 5.03 (s, 1H, H-1), 5.00-4.98 (m, 1H, OH), 4.91 (d, J=11.6 Hz, 1H, Bn), 4.83 (d, J=11.6 Hz, 1H, Bn), 4.68 (d, J=11.6 Hz, 1H, Bn), 4.67 (d, J=11.6 Hz, 1H, Bn), 4.34-4.29 (m, 2H, H-2', H-6'), 4.27-4.25 (m, 1H, H-4), 4.24 (d, J=16.5 Hz, 1H, CH$_2$CO$_2$t-Bu), 4.09 (d, J=16.5 Hz, 1H, CH$_2$CO$_2$t-Bu), 4.04-3.99 (m, 2H, H-2, H-3), 3.95-3.89 (m, 3H, H-3', H-4', H-6'), 3.85 (s, 3H, OCH$_3$), 3.83-3.78 (m, 1H, H-5'), 1.47 (s, 9H, C(CH$_3$)$_3$); $^{13}$C NMR (100 MHz, CD$_3$COCD$_3$): δ 169.7 (C=OOCH$_3$), 169.0 (CO$_2$t-Bu), 157.1 (q, $^2J_{C,F}$=38.0 Hz, CF$_3$C=O), 138.9 (Ar), 138.4 (Ar), 135.5 (Ar), 133.7 (Ar), 133.0 (Ar), 128.3 (Ar), 128.2 (Ar), 128.0 (Ar), 127.9 (Ar), 127.7 (Ar), 127.5 (Ar), 127.4 (Ar), 127.2 (Ar), 127.1 (Ar), 126.4 (Ar), 126.2 (Ar), 125.5 (Ar), 124.0 (Ar), 116.1 (q, $^1J_{C,F}$=286.0 Hz, CF$_3$), 101.8 (C-1), 101.3 (NapCH), 96.3 (C-1'), 82.2 (C-4'), 80.9 (OC(CH$_3$)$_3$), 76.9 (C-3'), 74.1 (CH$_2$Ph), 73.5 (C-3), 72.6 (C-4), 71.5 (CH$_2$Ph), 68.3 (C-6'), 67.4 (C-5), 66.1 (C-2), 65.5 (OCH$_2$CO$_2$t-Bu), 63.5 (C-5'), 53.3 (C-2'), 51.6 (OCH$_3$), 27.3 (OC(CH$_3$)$_3$); HRMS (ESI-TOF) calcd for C$_{46}$H$_{50}$F$_3$NO$_{14}$Na [M+Na]$^+$: 920.3081; found: 920.3084.

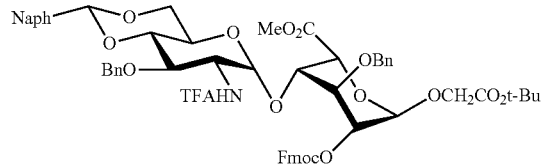

Methyl (3-O-benzyl-2-deoxy-4,6-O-2-naphth-ylidene-2-trifluoroacetamido-α-D-glucopyranosyl)-(1→4)-(3-O-benzyl-1-O-2-((tert-butoxy)-2-oxoacetyl)-2-O-((9H-fluoren-9-yl)methoxycarbonyl)-α-L-idopyranoside)uronate (17)

To a mixture of disaccharide 16 (0.12 g, 0.13 mmol) in pyridine (4.0 mL) at RT was added FmocCl (0.66 g, 2.6 mmol) portion-wise (0.22 g×3). The reaction was stirred for 2 h, concentrated under reduced pressure, and the resulting residue was dissolved in DCM. The organic layer was washed with brine, dried over $Na_2SO_4$, and concentrated. Purification by silica gel column chromatography (elution with 6:1→4:1 hexanes/EtOAc) afforded compound 17 (0.13 g, 90%) as a colorless foam.

$R_f$ 0.47 (2:1 hexanes/EtOAc); $^1$H NMR (400 MHz, $CD_3COCD_3$): δ 8.26 (d, J=9.3 Hz, 1H, NH), 8.05-7.91 (m, 4H, Ar), 7.85-7.83 (m, 2H, Ar), 7.67-7.62 (m, 3H, Ar), 7.55-7.53 (m, 2H, Ar), 7.42-7.25 (m, 9H, Ar), 7.21-7.16 (m, 5H, Ar), 5.93 (s, 1H, NapCH), 5.30 (d, J=3.7 Hz, 1H, H-1'), 5.22 (d, J=2.8 Hz, 1H, H-1), 5.14 (d, J=2.8 Hz, 1H, H-5), 4.99 (dd, J=4.4, 2.8 Hz, 1H, H-2), 4.90 (d, J=11.6 Hz, 1H, Bn), 4.82 (d, J=11.6 Hz, 1H, Bn), 4.71 (d, J=11.6 Hz, 1H, Bn), 4.68 (d, J=11.6 Hz, 1H, Bn), 4.59-4.53 (m, 1H, $OCO_2CH_2$—Fluoren), 4.44-4.41 (m, 2H, H-4, H-6'), 4.38-4.33 (m, 1H, H-2'), 4.30-4.24 (m, 3H, $OCO_2CH_2$—Fluoren, $OCO_2CH_2CH$, $CH_2CO_2t$-Bu), 4.15 (t, J=4.4 Hz, 1H, H-3), 4.14 (d, J=16.4 Hz, 1H, $CH_2CO_2t$-Bu), 4.11-4.03 (m, 2H, H-3', H-5'), 4.00-3.90 (m, 2H, H-4', H-6'), 3.84 (s, 3H, $OCH_3$), 1.46 (s, 9H, $C(CH_3)_3$); $^{13}$C NMR (100 MHz, $CD_3COCD_3$): δ 168.8 (C=OOCH_3), 168.5 (CO_2t-Bu), 157.0 (q, $^2J_{C,F}$=37.0 Hz, $CF_3C$=O), 154.0 (Fluoren-$CH_2^o$ C.=O), 143.4 (Ar), 143.3 (Ar), 141.1 (Ar), 138.9 (Ar), 138.8 (Ar), 135.5 (Ar), 133.0 (Ar), 128.31 (Ar), 128.29 (Ar), 127.95 (Ar), 127.85 (Ar), 127.82 (Ar), 127.7 (Ar), 127.6 (Ar), 127.3 (Ar), 127.2 (Ar), 127.0 (Ar), 126.4 (Ar), 126.2 (Ar), 125.4 (Ar), 125.3 (Ar), 125.1 (Ar), 124.0 (Ar), 120.0 (Ar), 118.7 (q, $^1J_{C,F}$=286.0 Hz, $CF_3$), 101.3 (NapCH), 98.9 (C-1), 97.4 (C-1'), 82.4 (C-4'), 81.0 ($OC(CH_3)_3$), 76.4 (C-3'), 74.7 (C-3), 74.2 ($CH_2Ph$), 73.5 (C-4), 72.5 (C-2), 72.3 ($CH_2Ph$), 70.1 (Fluoren-$CH_2O$), 68.6 (C-5), 68.3 (C-6'), 65.7 ($OCH_2CO_2t$-Bu), 63.7 (C-5'), 53.5 (C-2'), 51.6 ($OCH_3$), 46.5 ($CHCH_2$), 27.3 ($OC(CH_3)_3$); HRMS (ESI-TOF) calcd for $C_{61}H_{60}F_3NO_{16}Na$ [M+Na]$^+$: 1142.3762; found: 1142.3735.

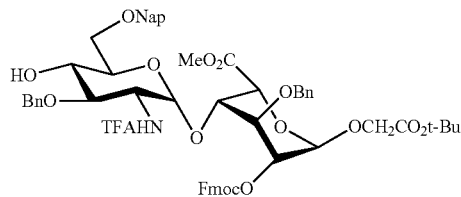

Methyl (3-O-benzyl-2-deoxy-6-O-2-naphthylmethyl-2-trifluoroacetamido-α-D-glucopyranosyl)-(1→4)-(3-O-benzyl-1-O-2-((tert-butoxy)-2-oxoacetyl)-2-O-((9H-fluoren-9-yl)methoxycarbonyl)-α-L-idopyranoside)uronate (18)

To a suspension of compound 17 (0.12 g, 0.11 mmol) and 4 Å activated molecular sieves in DCM (20 mL) were added triethylsilane (2.6 mL, 16 mmol) and TFA (0.82 mL, 10 mmol) at 0° C. The reaction was stirred at RT for 1 h and then quenched with saturated aq. $NaHCO_3$. The resulting mixture was filtered, diluted with DCM (20 mL), and the organic layer was washed with brine, dried over $Na_2SO_4$, and concentrated. Purification by silica gel column chromatography (elution with 3:1→2:1 hexanes/EtOAc) afforded compound 18 (86 mg, 72%) as a colorless foam.

$R_f$ 0.21 (2:1 hexanes/EtOAc); $^1$H NMR (400 MHz, $CDCl_3$): δ 7.86-7.75 (m, 6H, Ar), 7.54-7.47 (m, 5H, Ar), 7.42-7.39 (m, 2H, Ar), 7.34-7.29 (m, 7H, Ar), 7.25-7.17 (m, 3H, Ar), 7.14-7.12 (m, 2H, Ar), 6.86 (d, J=9.4 Hz, 1H, NH), 5.21 (s, 1H, H-1), 5.12 (d, J=1.8 Hz, 1H, H-5), 4.97-4.96 (m, 1H, H-2), 4.83 (d, J=3.4 Hz, 1H, H-1'), 4.81 (d, J=12.1 Hz, 1H, $NapCH_2$), 4.80 (d, J=11.9 Hz, 1H, 3-$OCH_2Ph$), 4.75 (d, J=12.1 Hz, 1H, $NapCH_2$), 4.62 (s, 2H, 3'-$OCH_2Ph$), 4.58 (d, J=11.9 Hz, 1H, 3-$OCH_2Ph$), 4.51 (dd, J=9.9, 6.8 Hz, 1H, $OCO_2CH_2$-Fluoren), 4.28 (d, J=16.4 Hz, 1H, $CH_2CO_2t$-Bu), 4.30-4.14 (m, 4H, $OCO_2CH_2$—Fluoren, H-2', H-4, $OCO_2CH_2CH$), 4.11 (d, J=16.4 Hz, 1H, $CH_2CO_2t$-Bu), 3.85-3.79 (m, 3H, H-3, H-4', H-6'), 3.76-3.69 (m, 2H, H-5', H-6'), 3.72 (s, 3H, $OCH_3$), 3.61 (dd, J=10.5, 8.7 Hz, 1H, H-3'), 1.47 (s, 9H, $C(CH_3)_3$); $^{13}$C NMR (100 MHz, $CDCl_3$): δ 169.3 (C=$OOCH_3$), 168.5 ($CO_2t$-Bu), 157.1 (q, $^2J_{C,F}$=37.0 Hz, $CF_3C$=O), 153.9 (Fluoren-$CH_2^o$ C.=O), 143.0 (Ar), 142.9 (Ar), 141.23 (Ar), 141.21 (Ar), 137.8 (Ar), 136.6 (Ar), 135.1 (Ar), 133.2 (Ar), 133.1 (Ar), 128.6 (Ar), 128.5 (Ar), 128.4 (Ar), 128.3 (Ar), 128.0 (Ar), 127.9 (Ar), 127.8 (Ar), 127.7 (Ar), 127.5 (Ar), 127.32 (Ar), 127.30 (Ar), 126.7 (Ar), 126.3 (Ar), 126.1 (Ar), 125.6 (Ar), 125.1 (Ar), 125.0 (Ar), 120.1 (Ar), 115.8 (q, $^1J_{C,F}$=286.0 Hz, $CF_3$), 98.7 (C-1), 96.2 (C-1'), 82.1 ($OC(CH_3)_3$), 79.3 (C-3'), 74.7 (3'-$OCH_2Ph$), 73.8 ($NapCH_2$), 72.3 (3-$OCH_2Ph$), 71.7 (C-4), 81.6 (C-4'), 71.1 (C-5'), 70.9 (Fluoren-$CH_2O$), 70.7 (C-3), 70.6 (C-2), 69.5 (C-6'), 67.5 (C-5), 65.9 ($OCH_2CO_2t$-Bu), 52.7 (C-2'), 52.3 ($OCH_3$), 46.5 ($CHCH_2$), 28.0 ($OC(CH_3)_3$); HRMS (ESI-TOF) calcd for $C_{61}H_{62}F_3NO_{16}Na$ [M+Na]$^+$: 1144.3918; found: 1144.3893.

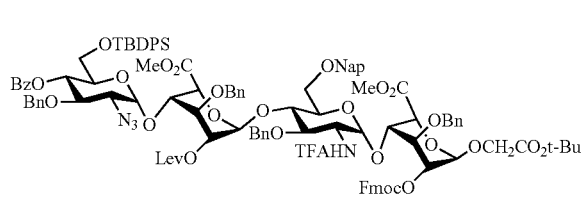

Methyl (2-azido-3-O-benzyl-4-O-benzoyl-2-deoxy-6-O-tert-butyldiphenylsilyl-α-D-glucopyranosyl)-(1→4)-(methyl 3-O-benzyl-2-O-levulinoyl-α-L-idopyranoosyluronate)-(1→4)-(3-O-benzyl-2-deoxy-6-O-2-naphthylmethyl-2-trifluoroacetamido-α-D-glucopyranosyl)-(1→4)-(3-O-benzyl-1-O-3-((tert-butoxy)-2-oxoacetyl)-2-O-((9H-fluoren-9-yl)methoxycarbonyl)-α-L-idopyranoside)uronate (21)

A mixture of donor 13 (0.11 g, 0.10 mmol), acceptor 18 (46 mg, 0.041 mmol) and powdered 4 Å molecular sieves was suspended in anhydrous DCM (4.0 mL) and stirred at RT. After 10 min, NIS (46 mg, 0.20 mmol) and AgOTf (catalytic amount) were added. The solution was stirred for another 12 h before $Et_3N$ (0.10 mL) was added. The mixture was filtered, and the residue was purified by silica gel column chromatography, eluting first with 4:1→2:1 hexanes/EtOAc to afford compound 21 (52 mg, 60%) as a colorless foam.

$R_f$ 0.21 (2:1 hexanes/EtOAc); $^1$H NMR (400 MHz, $CDCl_3$): δ 7.95-7.81 (m, 6H, Ar), 7.75-7.73 (m, 2H, Ar), 7.64-7.57 (m, 4H, Ar), 7.53-7.42 (m, 9H, Ar), 7.40-7.27 (m, 17H, Ar), 7.18-7.11 (m, 8H, Ar), 6.99-6.91 (m, 4H, Ar), 6.86 (d, J=9.6 Hz, 1H, NH), 5.58 (t, J=9.6 Hz, 1H, H-4'''), 5.38 (d, J=3.5 Hz, 1H, H-1''), 5.20 (s, 1H, H-1), 5.08-5.07 (m, 2H, H-5, H-1'''), 4.96-4.94 (m, 2H, H-2, H-2''), 4.83 (d, J=3.8 Hz, 1H, H-1'), 4.81-4.62 (m, 8H, $OCH_2Ph$, $OCH_2Nap$, H-5''), 4.55 (d, J=11.0 Hz, 1H, Bn), 4.55 (d, J=11.5 Hz, 1H, Bn), 4.46-4.41 (m, 2H, OCH$_2$Ph, OCH$_2$-Fluoren), 4.35 (apptd, J=10.5, 3.5 Hz, 1H, H-2'), 4.26 (d, J=16.3 Hz, 1H, CH$_2$CO$_2$t-Bu), 4.19-4.07 (m, 5H), 4.01-3.94 (m, 3H), 3.86-3.70 (m, 5H), 3.68-3.61 (m, 3H), 3.58 (s, 3H, OCH$_3$), 3.45 (dd, J=10.3, 3.5 Hz, 1H, H-2'''), 3.26 (s, 3H, OCH$_3$), 2.61-2.58 (m, 2H, CH$_2$), 2.44-2.40 (m, 2H, CH$_2$), 2.11 (s, 3H, C═OCH$_3$), 1.46 (s, 9H, OC(CH$_3$)$_3$), 0.97 (s, 9H, C(CH$_3$)$_3$); $^{13}$C NMR (100 MHz, CDCl$_3$): δ 205.9 (CH$_3$C═OCH$_2$), 172.0 (CH$_2$C═O), 169.3 (C═OOCH$_3$), 169.0 (C═OOCH$_3$), 168.5 (CO$_2$t-Bu), 164.8 (C═OPh), 157.0 (q, $^2J_{C,F}$=37.0 Hz, CF$_3$C═O), 153.9 (Fluoren-CH$_2^°$ C.═O), 143.1 (Ar), 142.9 (Ar), 141.20 (Ar), 141.16 (Ar), 137.6 (Ar), 137.4 (Ar), 137.1 (Ar), 136.6 (Ar), 135.7 (Ar), 135.5 (Ar), 135.4 (Ar), 133.32 (Ar), 133.28 (Ar), 133.0 (Ar), 132.9 (Ar), 129.7 (Ar), 129.6 (Ar), 129.5 (Ar), 128.6 (Ar), 128.5 (Ar), 128.31 (Ar), 128.26 (Ar), 128.20 (Ar), 128.05 (Ar), 128.00 (Ar), 127.95 (Ar), 127.91 (Ar), 127.8 (Ar), 127.7 (Ar), 127.6 (Ar), 127.5 (Ar), 127.3 (Ar), 126.9 (Ar), 126.8 (Ar), 126.6 (Ar), 126.2 (Ar), 126.1 (Ar), 125.9 (Ar), 125.1 (Ar), 125.0 (Ar), 120.0 (Ar), 115.7 (q, $^1J_{C,F}$=286 Hz, CF$_3$), 98.7 (C-1), 97.9 (C-1''), 97.2 (C-1'''), 96.0 (C-1'), 82.0 (OC(CH$_3$)$_3$), 78.1, 77.2, 75.1, 74.5, 74.1, 73.6, 73.5, 73.3, 72.4, 72.0, 71.9, 71.6, 71.2, 70.9, 70.8, 70.1 (C-4'''), 69.5, 69.2, 67.7 (C-5), 67.5, 65.8 (OCH$_2$CO$_2$t-Bu), 62.9, 61.9, 52.8 (C-2'), 52.2 (OCH$_3$), 51.6 (OCH$_3$), 46.4 (CHCH$_2$), 37.7 (CH$_2$C═O), 29.7 (CH$_3$C═O), 28.0 (CO$_2$C(CH$_3$)$_3$), 27.6 (CH$_2$C═O), 26.6 (SiC(CH$_3$)$_3$), 19.1 (SiC(CH$_3$)$_3$); HRMS (ESI-TOF) calcd for C$_{116}$H$_{121}$F$_3$N$_4$O$_{29}$S1Na [M+Na]$^+$: 2141.7736; found: 2141.7729; gHSQC 2-D NMR (without $^1$H decoupling): $^1J_{C1,H1}$=174.5 Hz, $^1J_{C1',H1'}$=173.1 Hz, $^1J_{C1'',H1''}$=174.3 Hz, $^1J_{C1''',H1'''}$=175.1 Hz. As the H-2 and H-2''' peaks overlap, we cannot identify the exact coupling constants between H-2'' and H-3''. However, the peaks of H-2 and H-2'' showed that the coupling constants of $^3J_{H2''-H3''}$ and $^3J_{H2-H3}$ are both less than 3.5 Hz, which indicates that both IdoA residues adopt primarily the $^1C_4$ conformation.[6] The coupling constants of $^1J_{C1,H1}$ (174.5 Hz) and $^1J_{C1'',H1''}$ (174.3 Hz) are above 170 Hz, which confirms the α configuration of the two IdoA-GlcN linkages.[7] In addition, the coupling constants of $^1J_{C1',H1'}$ (173.1 Hz) and $^1J_{C1''',H1'''}$ (175.1 Hz) are greater than 170 Hz, which is indicative of the α0 configuration for the two GlcN-IdoA linkages. Further elution with 2:1→1:1 hexanes/EtOAc afforded unreacted acceptor 18 (8.3 mg, 18%) and hydrolyzed donor (35 mg,), which could be potentially recycled.

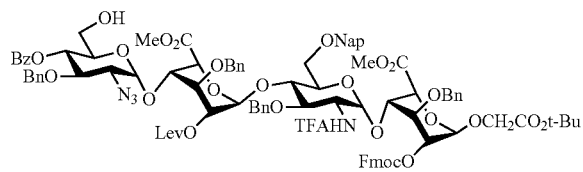

Methyl (2-azido-3-O-benzyl-4-O-benzoyl-2-deoxy-α-D-glucopyranosyl)-(1→4)-(methyl 3-O-benzyl-2-O-levulinoyl-α-L-idopyranoosyluronate)-(1→4)-(3-O-benzyl-2-deoxy-6-O-2-naphthylmethyl-2-trifluoroacetamido-α-D-glucopyranosyl)-(1→4)-(3-O-benzyl-1-O-3-((tert-butoxy)-2-oxoacetyl)-2-O-((9H-fluoren-9-yl)methoxycarbonyl)-α-L-idopyranoside)urinate (22)

To a solution of tetrasaccharide 21 (20 mg, 9.4 μmol) in pyridine (3.0 mL) was added hydrogen fluoride pyridine (0.80 ml) at 0° C. After stirring at RT for 2 h, the reaction was quenched with saturated aq. NaHCO$_3$. The mixture was then extracted with DCM, and the organic layer was dried over anhydrous Na$_2$SO$_4$, filtered, and concentrated. The resulting residue was purified by silica gel column chromatography (elution with 2:1→1:1 hexanes/EtOAc) to afford compound 22 (16 mg, 91%) as a white foam.

R$_f$ 0.20 (3:2 hexanes/EtOAc); $^1$H NMR (400 MHz, CDCl$_3$): δ 7.95-7.72 (m, 8H, Ar), 7.62-7.29 (m, 21H, Ar), 7.14-7.05 (m, 9H, Ar), 6.92-6.89 (m, 2H, Ar), 6.81 (d, J=9.6 Hz, 1H, NH), 5.32 (d, J=2.2 Hz, 1H, H-1"), 5.18 (s, 1H, H-1), 5.17 (dd, J=10.1, 9.2 Hz, 1H, H-4'''), 5.07 (d, J=1.8 Hz, 1H, H-5), 4.96 (d, J=3.5 Hz, 1H, H-1'''), 4.93 (s, 1H, H-2), 4.92 (s, 1H, H-2"), 4.82 (d, J=12.4 Hz, 1H, Bn), 4.78 (d, J=3.6 Hz, 1H, H-1'), 4.77-4.61 (m, 8H, OCH$_2$Ph, OCH$_2$Nap, H-5"), 4.53 (d, J=11.9 Hz, 1H, Bn), 4.45-4.39 (m, 2H, OCH$_2$Ph, OCH$_2$—Fluoren), 4.35 (apptd, J=10.0, 3.4 Hz, 1H, H-2'), 4.24 (d, J=16.4 Hz, 1H, CH$_2$CO$_2$t-Bu), 4.18-4.05 (m, 5H), 4.02 (t, J=9.9 Hz, 1H, H-3'''), 3.93 (s, 1H, H-3"), 3.93 (s, 1H, H-4"), 3.84 (dd, J=10.8, 2.8 Hz, 1H), 3.78-3.58 (m, 6H), 3.55 (s, 3H, OCH$_3$), 3.49-3.46 (m, 1H), 3.39 (dd, J=10.2, 3.5 Hz, 1H, H-2'''), 3.32 (s, 3H, OCH$_3$), 2.65 (br, 1H), 2.63-2.57 (m, 2H, CH$_2$), 2.49-2.41 (m, 2H, CH$_2$), 2.09 (s, 3H, C═OCH$_3$), 1.44 (s, 9H, OC(CH$_3$)$_3$); $^{13}$C NMR (100 MHz, CDCl$_3$): δ 205.8 (CH$_3$C═OCH$_2$), 172.0 (CH$_2$C═O), 169.3 (C═OOCH$_3$), 169.1 (C═OOCH$_3$), 168.5 (CO$_2$t-Bu), 166.4 (C═OPh), 153.9 (Fluoren-CH$_2^°$ C.═O), 143.1 (Ar), 142.8 (Ar), 141.2 (Ar), 137.5 (Ar), 137.20 (Ar), 137.16 (Ar), 136.5 (Ar), 135.4 (Ar), 133.9 (Ar), 133.1 (Ar), 133.0 (Ar), 129.9 (Ar), 128.74 (Ar), 128.69 (Ar), 128.61 (Ar), 128.58 (Ar), 128.3 (Ar), 128.2 (Ar), 128.0 (Ar), 127.96 (Ar), 127.86 (Ar), 127.7 (Ar), 127.3 (Ar), 127.0 (Ar), 126.6 (Ar), 126.1 (Ar), 126.0 (Ar), 125.9 (Ar), 125.1 (Ar), 125.0 (Ar), 120.1 (Ar), 98.7 (C-1), 98.0 (C-1"), 97.6 (C-1'''), 96.5 (C-1'), 82.0 (OC(CH$_3$)$_3$), 78.3, 77.3 (C-3"'), 74.9, 74.5, 74.1, 73.3, 73.2, 73.13, 73.08, 72.3, 72.2, 71.9 (C-4''), 71.3, 71.0, 70.90, 70.86, 70.7, 68.8, 68.3 (C-5"), 67.5, 65.9 (OCH$_2$CO$_2$t-Bu), 63.1 (C-2'''), 60.7, 52.9 (C-2'), 52.1 (OCH$_3$), 51.9 (OCH$_3$), 46.4 (CHCH$_2$), 37.7 (CH$_2$C═O), 29.7 (CH$_3$C═O), 28.0 (CO$_2$C(CH$_3$)$_3$), 27.7 (CH$_2$C═O); HRMS (ESI-TOF) calcd for C$_{100}$H$_{102}$F$_3$N$_4$O$_{29}$ [M−H]$^-$: 1879.6582; found: 1879.6582.

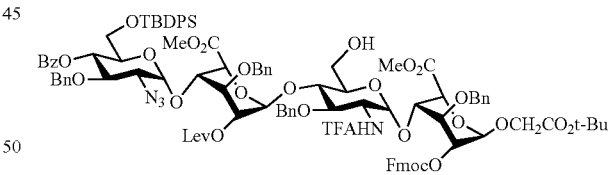

Methyl (2-azido-3-O-benzyl-4-O-benzoyl-2-deoxy-6-O-tert-butyldiphenylsilyl-α-D-glucopyranosyl)-(1→4)-(methyl 3-O-benzyl-2-O-levulinoyl-α-L-idopyranoosyluronate)-(1→4)-(3-O-benzyl-2-deoxy-2-trifluoroacetamido-α-D-glucopyranosyl)-(1→4)-(3-O-benzyl-1-O-3-((tert-butoxy)-2-oxoacetyl)-2-O-((9H-fluoren-9-yl)methoxycarbonyl)-α-L-idopyranoside)urinate (23)

To a solution of tetrasaccharide 21 (5.0 mg, 2.4 μmol) in 10:1 CH$_2$Cl$_2$/H$_2$O (2.0 mL) was added DDQ (0.044 mmol). The mixture was stirred at RT for 6 h, then diluted with DCM, and the organic layer was washed with saturated aq. NaHCO$_3$, dried over anhydrous Na$_2$SO$_4$, filtered, and concentrated. The resulting residue was purified by silica gel column chromatography (elution with 2:1→1:1 hexanes/EtOAc) to afford compound 23 (3.3 mg, 71%) as a colorless foam.

$R_f$ 0.12 (3:2 hexanes/EtOAc); $^1$H NMR (400 MHz, CDCl$_3$): δ 7.95-7.93 (m, 2H, Ar), 7.76-7.73 (m, 2H, Ar), 7.64-7.60 (m, 3H, Ar), 7.53-7.30 (m, 23H, Ar), 7.18-7.12 (m, 8H, Ar), 7.10-6.98 (m, 3H, Ar), 6.92-6.89 (m, 2H, Ar), 6.82 (d, J=9.5 Hz, 1H, NH), 5.55 (t, J=9.7 Hz, 1H, H-4′″), 5.34 (d, J=3.3 Hz, 1H, H-1″), 5.20 (s, 1H, H-1), 5.11 (d, J=2.0 Hz, 1H, H-5), 5.07 (d, J=3.5 Hz, 1H, H-1′″), 4.98 (d, J=3.3 Hz, 1H, H-2″), 4.96 (s, 1H, H-2), 4.82 (d, J=11.0 Hz, 1H, Bn), 4.79 (d, J=3.6 Hz, 1H, H-1′), 4.79 (d, J=10.5 Hz, 1H, Bn), 4.72-4.68 (m, 4H, OCH$_2$Ph, H-5″), 4.58 (d, J=11.5 Hz, 1H, Bn), 4.56 (d, J=10.5 Hz, 1H, Bn), 4.49-4.41 (m, 2H, OCH$_2$Ph, OCH$_2$-Fluoren), 4.29 (apptd, J=10.5, 3.5 Hz, 1H, H-2′), 4.28 (d, J=16.3 Hz, 1H, CH$_2$CO$_2$t-Bu), 4.17-4.04 (m, 6H), 4.02-3.92 (m, 2H), 3.88-3.78 (m, 4H), 3.79 (s, 3H, OCH$_3$), 3.70-3.64 (m, 4H), 3.47 (dd, J=10.3, 3.5 Hz, 1H, H-2′″), 3.27 (s, 3H, OCH$_3$), 2.82-2.75 (m, 2H, CH$_2$), 2.63-2.60 (m, 2H, CH$_2$), 2.37 (br, 1H), 2.21 (s, 3H, C=OCH$_3$), 1.47 (s, 9H, OC(CH$_3$)$_3$), 0.98 (s, 9H, C(CH$_3$)$_3$); $^{13}$C NMR (100 MHz, CDCl$_3$): δ 206.9 (CH$_3$C=OCH$_2$), 172.0 (CH$_2$C=O), 169.3 (C=OOCH$_3$), 169.1 (C=OOCH$_3$), 168.5 (CO$_2$t-Bu), 164.8 (C=OPh), 153.9 (Fluoren-CH$_2$°C.=O), 143.1 (Ar), 142.9 (Ar), 141.2 (Ar), 137.6 (Ar), 137.2 (Ar), 137.1 (Ar), 136.5 (Ar), 135.7 (Ar), 135.3 (Ar), 133.3 (Ar), 133.0 (Ar), 129.71 (Ar), 129.68 (Ar), 129.60 (Ar), 128.9.54 (Ar), 128.7 (Ar), 128.5 (Ar), 128.4 (Ar), 128.3 (Ar), 128.1 (Ar), 128.0 (Ar), 127.9 (Ar), 127.8 (Ar), 127.6 (Ar), 127.5 (Ar), 127.3 (Ar), 126.9 (Ar), 126.6 (Ar), 125.1 (Ar), 125.0 (Ar), 120.0 (Ar), 98.8 (C-1), 98.1 (C-1″), 96.6 (C-1′″), 96.4 (C-1′), 82.1 (OC(CH$_3$)$_3$), 77.9, 74.8, 74.6, 74.2, 72.95, 72.88, 72.4, 72.2, 71.6, 71.3, 71.0, 70.9, 70.8, 70.2 (C-4′″), 69.4 (C-2″), 69.2 (C-5″), 67.6 (C-5), 65.9 (OCH$_2$CO$_2$t-Bu), 63.1 (C-2′″), 62.0, 60.8, 53.0 (C-2′), 52.5 (OCH$_3$), 51.7 (OCH$_3$), 46.4 (CHCH$_2$), 38.0 (CH$_2$C=O), 29.7 (CH$_3$C=O), 28.0 (CO$_2$C(CH$_3$)$_3$), 27.8 (CH$_2$C=O), 26.6 (SiC(CH$_3$)$_3$), 19.1 (SiC(CH$_3$)$_3$); HRMS (ESI-TOF) calcd for C$_{105}$H$_{112}$F$_3$N$_4$O$_{29}$Si [M−H]$^-$: 1977.7134; found: 1977.7155.

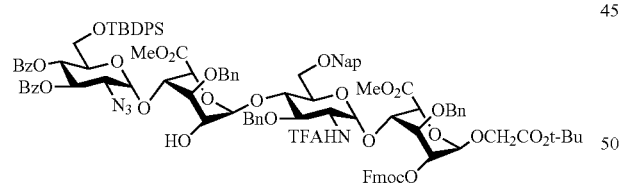

Methyl (2-azido-3-O-benzyl-4-O-benzoyl-2-deoxy-6-O-tert-butyldiphenylsilyl-α-D-glucopyranosyl)-(1→4)-(methyl 3-O-benzyl-α-L-idopyranoosyluronate)-(1→4)-(3-O-benzyl-2-deoxy-6-O-2-naphthylmethyl-2-trifluoroacetamido-α-D-glucopyranosyl)-(1→4)-(3-O-benzyl-1-O-3-((tert-butoxy)-2-oxoacetyl)-2-O-((9H-fluoren-9-yl)methoxycarbonyl)-α-L-idopyranoside)urinate (24)

A solution of tetrasaccharide 21 (5.0 mg, 2.4 μmol) and hydrazine acetate (20 mg, 0.22 mmol) in 9:1 CH$_2$Cl$_2$/CH$_3$OH (3.0 mL) was stirred at RT for 3 h. The solution was then concentrated, and the resulting residue was purified by silica gel column chromatography (elution with 4:1→2:1 hexanes/EtOAc) to afford compound 24 (4.3 mg, 90%) as a colorless foam.

$R_f$ 0.62 (3:2 hexanes/EtOAc); $^1$H NMR (400 MHz, CDCl$_3$): δ 7.96-7.83 (m, 6H, Ar), 7.75-7.73 (m, 2H, Ar), 7.66-7.56 (m, 4H, Ar), 7.53-7.43 (m, 8H, Ar), 7.40-7.27 (m, 18H, Ar), 7.16-7.12 (m, 8H, Ar), 7.01-6.96 (m, 2H, Ar), 6.86-6.84 (m, 2H, Ar), 6.78 (d, J=9.6 Hz, 1H, NH), 5.55 (t, J=9.7 Hz, 1H, H-4′″), 5.37 (s, 1H, H-1″), 5.19 (s, 1H, H-1), 5.08 (d, J=1.5 Hz, 1H, H-5), 5.01 (d, J=3.7 Hz, 1H, H-1′″), 4.96 (s, 1H, H-2), 4.91 (d, J=11.5 Hz, 1H, Bn), 4.84 (d, J=1.2 Hz, 1H, H-5″), 4.79 (d, J=3.3 Hz, 1H, H-1′), 4.79-4.63 (m, 6H, OCH$_2$Ph, OCH$_2$Nap,), 4.54 (d, J=11.0 Hz, 1H, Bn), 4.51 (d, J=10.2 Hz, 1H, Bn), 4.46 (d, J=11.8 Hz, 1H, Bn), 4.43-4.36 (m, 2H, OCH$_2$—Fluoren, H-2′), 4.26 (d, J=16.3 Hz, 1H, CH$_2$CO$_2$t-Bu), 4.19-4.02 (m, 6H), 3.94 (t, J=9.5 Hz, 1H), 3.90 (t, J=3.5 Hz, 1H), 3.82-3.60 (m, 10H), 3.51 (s, 3H, OCH$_3$), 3.05 (s, 3H, OCH$_3$), 2.35 (br, 1H), 1.45 (s, 9H, OC(CH$_3$)$_3$), 0.99 (s, 9H, C(CH$_3$)$_3$); $^{13}$C NMR (100 MHz, CDCl$_3$): δ 169.25 (C=OOCH$_3$), 169.19 (C=OOCH$_3$), 168.5 (CO$_2$t-Bu), 164.7 (C=OPh), 153.9 (Fluoren-CH$_2$°C.=O), 143.2 (Ar), 142.8 (Ar), 141.2 (Ar), 137.5 (Ar), 137.3 (Ar), 136.9 (Ar), 136.5 (Ar), 135.7 (Ar), 135.5 (Ar), 133.3 (Ar), 133.1 (Ar), 132.9 (Ar), 129.7 (Ar), 129.6 (Ar), 129.5 (Ar), 128.6 (Ar), 128.55 (Ar), 128.47 (Ar), 128.4 (Ar), 128.3 (Ar), 128.0 (Ar), 127.96 (Ar), 127.89 (Ar), 127.7 (Ar), 127.57 (Ar), 127.53 (Ar), 127.30 (Ar), 127.27 (Ar), 127.0 (Ar), 126.8 (Ar), 126.15 (Ar), 126.1 (Ar), 125.9 (Ar), 125.0 (Ar), 120.0 (Ar), 101.3 (C-1″), 98.8 (C-1), 96.9 (C-1′), 95.4 (C-1′″), 82.0 (OC(CH$_3$)$_3$), 78.7, 78.3, 75.5, 74.8, 73.7, 73.5, 72.7, 72.5, 72.3, 71.2 (CHCH$_2$), 70.9 (C-2), 70.0 (C-4′″), 67.9, 67.6 (C-5″), 67.4 (C-5), 65.9 (OCH$_2$CO$_2$t-Bu), 63.4, 61.7, 52.8 (C-2′), 52.0 (OCH$_3$), 51.6 (OCH$_3$), 46.1 (CHCH$_2$), 28.0 (CO$_2$C(CH$_3$)$_3$), 26.6 (SiC(CH$_3$)$_3$), 19.1 (SiC(CH$_3$)$_3$); HRMS (ESI-TOF) calcd for C$_{111}$H$_{114}$F$_3$N$_4$O$_{27}$Si [M−H]$^-$: 2019.7391; found: 2019.7411.

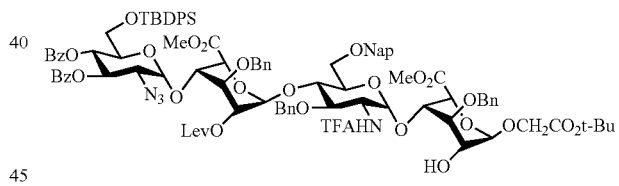

Methyl (2-azido-3-O-benzyl-4-O-benzoyl-2-deoxy-6-O-tert-butyldiphenylsilyl-α-D-glucopyranosyl)-(1→-4)-(methyl 3-O-benzyl-2-O-levulinoyl-α-L-idopyranoosyluronate)-(1→4)-(3-O-benzyl-2-deoxy-6-O-2-naphthylmethyl-2-trifluoroacetamido-α-D-glucopyranosyl)-(1→4)-(3-O-benzyl-1-O-3-((tert-butoxy)-2-oxoacetyl))-α-L-idopyranoside)urinate (25)

Piperidine (100 mg, 1.2 mmol) was added to a solution of tetrasaccharide 21 (25 mg, 0.012 mmol) in DCM (10 mL) at RT. After stirring for 3 h, the mixture was concentrated and the resulting residue purified by silica gel column chromatography (elution with 3:1→2:1 hexanes/EtOAc) to afford compound 25 (22 mg, 88%) as a white foam.

$R_f$ 0.38 (3:2 hexanes/EtOAc); $^1$H NMR (400 MHz, CDCl$_3$): δ 8.03-7.71 (m, 8H, Ar), 7.65-7.45 (m, 10H, Ar), 7.39-7.23 (m, 12H, Ar), 7.24 (d, J=9.1 Hz, 1H, NH), 7.18-7.09 (m, 12H, Ar), 5.58 (t, J=9.7 Hz, 1H, H-4′″), 5.40 (d, J=3.6 Hz, 1H, H-1″), 5.13 (d, J=3.4 Hz, 1H, H-1), 5.07

(s, 1H, H-1'''), 4.97 (d, J=2.0 Hz, 1H, H-5), 4.93 (t, J=4.1 Hz, 1H, H-2''), 4.88 (d, J=3.4 Hz, 1H, H-1'), 4.78-4.68 (m, 7H, OCH₂Ph, OCH₂Nap, H-5''), 4.61 (d, J=11.5 Hz, 1H, Bn), 4.57 (d, J=10.6 Hz, 1H, Bn), 4.54 (d, J=11.6 Hz, 1H, Bn), 4.43 (d, J=11.6 Hz, 1H, Bn), 4.30-4.24 (m, 1H, H-2'), 4.25 (d, J=16.6 Hz, 1H, CH₂CO₂t-Bu), 4.13-3.95 (m, 7H), 3.91-3.87 (m, 1H), 3.84-3.81 (m, 1H), 3.71-3.57 (m, 6H), 3.60 (s, 3H, OCH₃), 3.45 (dd, J=10.3, 3.5 Hz, 1H, H-2'''), 3.28 (s, 3H, OCH₃), 2.75 (br, 1H), 2.61-2.58 (m, 2H, CH₂), 2.44-2.38 (m, 2H, CH₂), 2.09 (s, 3H, C=OCH₃), 1.48 (s, 9H, OC(CH₃)₃), 0.98 (s, 9H, C(CH₃)₃); ¹³C NMR (100 MHz, CDCl₃): δ 206.3 (CH₃C=OCH₂), 172.2 (CH₂C=O), 170.1 (C=OOCH₃), 169.50 (C=OOCH₃), 169.48 (CO₂t-Bu), 165.1 (C=OPh), 157.6 (q, ²J$_{C,F}$=37.3 Hz, CF₃C=O), 141.3 (Ar), 138.1 (Ar), 137.7 (Ar), 137.4 (Ar), 137.3 (Ar), 136.0 (Ar), 135.8 (Ar), 135.7 (Ar), 133.64 (Ar), 133.32 (Ar), 133.27 (Ar), 130.0 (Ar), 129.93 (Ar), 129.87 (Ar), 128.9 (Ar), 128.8 (Ar), 128.6 (Ar), 128.5 (Ar), 128.4 (Ar), 128.3 (Ar), 128.2 (Ar), 128.0 (Ar), 127.9 (Ar), 127.86 (Ar), 127.80 (Ar), 127.6 (Ar), 127.1 (Ar), 126.5 (Ar), 126.4 (Ar), 126.2 (Ar), 125.8 (Ar), 120.0 (Ar), 116.1 (q, ¹J$_{C,F}$=288 Hz, CF₃), 101.8 (C-1'''), 98.1 (C-1''), 97.5 (C-1), 96.5 (C-1'), 82.5 (OC(CH₃)₃), 77.8, 77.6, 75.6, 74.8, 74.7, 74.1, 73.8, 73.7, 72.7, 72.5, 72.4, 72.1, 71.6, 70.5 (C-4'''), 70.0 (C-2''), 69.7 (C-5''), 68.3 (C-5), 67.9, 67.4, 65.8 (OCH₂CO₂t-Bu), 63.2 (C-2'''), 62.3, 53.2 (C-2'), 52.6 (OCH₃), 52.1 (OCH₃), 38.0 (CH₂C=O), 30.0 (CH₃C=O), 28.4 (CO₂C(CH₃)₃), 27.9 (CH₂C=O), 26.9 (SiC(CH₃)₃), 19.4 (SiC(CH₃)₃); HRMS (ESI-TOF) calcd for C₁₀₁H₁₁₀F₃N₄O₂₇Si [M−H]⁻: 1895.7079; found: 1895.7070.

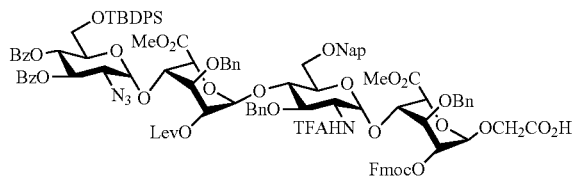

Methyl (2-azido-3-O-benzyl-4-O-benzoyl-2-deoxy-6-O-tert-butyldiphenylsilyl-α-D-glucopyranosyl)-(1→4)-(methyl 3-O-benzyl-2-O-levulinoyl-α-L-idopyranoosyluronate)-(1→4)-(3-O-benzyl-2-deoxy-6-O-2-naphthylmethyl-2-trifluoroacetamido-α-D-glucopyranosyl)-(1→4)-(3-O-benzyl-1-O-3-(2-carboxylacetyl)-2-O-((9H-fluoren-9-yl)methoxycarbonyl)-α-L-idopyranoside)urinate (26)

To a solution of tetrasaccharide 21 (5.0 mg, 2.4 µmol) in anhydrous DCM (2.0 mL) was added 60 µL of TFA at 0° C. The reaction was stirred at RT under argon for 12 h. The mixture was then diluted with DCM, and the organic layer was washed with saturated aq. NaHCO₃, dried over anhydrous Na₂SO₄, filtered, and concentrated. The resulting residue was purified by silica gel column chromatography (elution with 40:1→20:1 DCM/MeOH) to give compound 26 (4.0 mg, 82%) as a colorless foam.

R$_f$ 0.20 (15:1 DCM/MeOH); ¹H NMR (400 MHz, CDCl₃): δ 7.96-7.82 (m, 6H, Ar), 7.75-7.73 (m, 2H, Ar), 7.66-7.58 (m, 5H, Ar), 7.53-7.29 (m, 24H, Ar), 7.19-7.12 (m, 9H, Ar), 7.02-6.95 (m, 4H, Ar), 6.67 (d, J=9.5 Hz, 1H, NH), 5.57 (t, J=9.5 Hz, 1H, H-4''), 5.40 (d, J=3.9 Hz, 1H, H-1''), 5.19 (d, J=2.1 Hz, 1H, H-1), 5.11 (d, J=3.3 Hz, 1H, H-1'''), 4.96-4.93 (m, 2H, H-5, H-2''), 4.91 (d, J=3.6 Hz, 1H, H-1'), 4.87 (t, J=2.6 Hz, 1H, H-2), 4.81-4.65 (m, 7H, OCH₂Ph, OCH₂Nap, H-5''), 4.61 (d, J=11.5 Hz, 1H, Bn), 4.56 (d, J=10.8 Hz, 1H, Bn), 4.55 (d, J=11.7 Hz, 1H, Bn), 4.47-4.41 (m, 2H, OCH₂Ph, OCH₂—Fluoren), 4.36-4.26 (m, 3H, H-2', CH₂CO₂t-Bu), 4.22-4.11 (m, 4H), 4.04-3.94 (m, 3H), 3.89-3.70 (m, 5H), 3.72-3.57 (m, 3H), 3.61 (s, 3H, OCH₃), 3.45 (dd, J=10.3, 3.5 Hz, 1H, H-2'''), 3.32 (s, 3H, OCH₃), 2.63-2.54 (m, 2H, CH₂), 2.41-2.32 (m, 2H, CH₂), 2.11 (s, 3H, C=OCH₃), 0.97 (s, 9H, C(CH₃)₃); ¹³C NMR (100 MHz, CDCl₃): δ 206.1 (CH₃C=OCH₂), 171.9 (CH₂C=O), 171.3 (C=OOCH₃), 169.1 (C=OOCH₃), 169.0 (CO₂H), 164.7 (C=OPh), 156.9 (q, ²J$_{C,F}$=37.0 Hz, CF₃C=O), 154.0 (Fluoren-CH₂OC=O), 143.0 (Ar), 142.9 (Ar), 141.23 (Ar), 141.19 (Ar), 137.6 (Ar), 137.4 (Ar), 137.1 (Ar), 136.4 (Ar), 135.6 (Ar), 135.3 (Ar), 133.3 (Ar), 133.0 (Ar), 132.9 (Ar), 129.74 (Ar), 129.70 (Ar), 129.6 (Ar), 129.5 (Ar), 128.6 (Ar), 128.52 (Ar), 128.47 (Ar), 128.36 (Ar), 128.31 (Ar), 128.2 (Ar), 128.04 (Ar), 127.99 (Ar), 127.86 (Ar), 127.82 (Ar), 127.72 (Ar), 127.69 (Ar), 127.6 (Ar), 127.5 (Ar), 127.31 (Ar), 127.26 (Ar), 126.92 (Ar), 126.86 (Ar), 126.2 (Ar), 126.1 (Ar), 125.9 (Ar), 125.1 (Ar), 125.0 (Ar), 120.0 (Ar), 115.7 (q, ¹J$_{C,F}$=286 Hz, CF₃), 98.5 (C-1), 98.0 (C-1''), 97.3 (C-1'''), 95.9 (C-1'), 77.8, 77.4, 75.2, 74.5, 74.2, 74.1, 73.5, 72.8, 72.3, 72.0, 71.7, 71.5, 71.3, 70.9 (Fluoren-CH₂), 70.1 (C-4'''), 70.0 (C-2''), 69.6, 68.5, 67.5, 65.0 (OCH₂CO₂H), 62.9 (C-2'''), 61.9, 52.7 (C-2'), 52.3 (OCH₃), 51.7 (OCH₃), 46.4 (CHCH₂), 37.7 (CH₂C=O), 29.7 (CH₃C=O), 27.2 (CH₂C=O), 26.6 (SiC(CH₃)₃), 19.1 (SiC(CH₃)₃); HRMS (ESI-TOF) calcd for C₁₁₂H₁₁₂F₃N₄O₂₉Si [M−H]⁻: 2061.7134; found: 2061.7124.

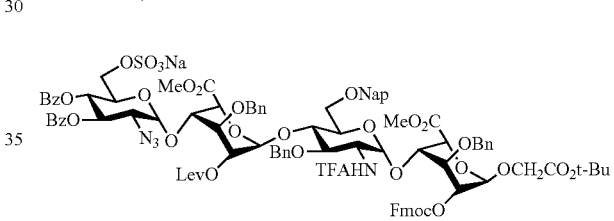

Methyl (2-azido-3-O-benzyl-4-O-benzoyl-2-deoxy-6-O-sulfonato-α-D-glucopyranosyl)-(1→4)-(methyl 3-O-benzyl-2-O-levulinoyl-α-L-idopyranoosyluronate)-(1→4)-(3-O-benzyl-2-deoxy-6-O-2-naphthylmethyl-2-trifluoroacetamido-α-D-glucopyranosyl)-(1→4)-(3-O-benzyl-2-O-((9H-fluoren-9-yl)methoxycarbonyl)-1-O-3-((tert-butoxy)-2-oxoacetyl))-α-L-idopyranoside)uronate mono sodium salt (27)

A solution of the tetrasaccharide 22 (16 mg, 8.5 µmol) and SO₃Et₃N (15 mg, 85 µmol) in DMF (2.0 mL) was stirred at RT under N₂ atmosphere. After stirring for 12 h, a solution of saturated aq. NaHCO₃ was added to the mixture, and the resulting solution was stirred for 1 h. The mixture was extracted with DCM, and the organic layer was dried over anhydrous Na₂SO₄, filtered, and concentrated. The resulting residue was purified by silica gel column chromatography (elution with 20:1→10:1 DCM/MeOH) and then incubated with Dowex 50WX4Na+ resin to obtain the O-sulfated compound 27 (14 mg, 85%).

R$_f$ 0.37 (9:1 DCM/MeOH); ¹H NMR (400 MHz, CDCl₃): δ 7.94-7.81 (m, 5H, Ar), 7.75-7.73 (m, 2H, Ar), 7.56-7.33 (m, 13H, Ar), 7.30-7.25 (m, 11H, Ar), 7.12-6.95 (m, 10H, Ar, NH), 5.40-5.35 (m, 1H, H-4'''), 5.29 (s, 1H, H-1''), 5.21 (s, 1H, H-1), 5.08 (d, J=1.5 Hz, 1H), 5.04 (s, 1H, H-1'''), 4.94 (s, 1H, H-2 or H-2''), 4.93 (s, 1H, H-2 or H-2''), 4.87 (d,

J=3.5 Hz, 1H, H-1'), 4.83-4.62 (m, 7H, OCH$_2$Ph, OCH$_2$Nap, H-5"), 4.55-4.37 (m, 5H, OCH$_2$Ph, H-2'), 4.31-4.06 (m, 8H), 4.01-3.85 (m, 5H), 3.83-3.63 (m, 5H), 3.56 (s, 3H, OCH$_3$), 3.51-3.48 (m, 1H), 3.35 (s, 3H, OCH$_3$), 2.60-2.57 (m, 2H, CH$_2$), 2.48-2.46 (m, 2H, CH$_2$), 2.07 (s, 3H, C=OCH$_3$), 1.45 (s, 9H, OC(CH$_3$)$_3$); $^{13}$C NMR (100 MHz, CDCl$_3$): δ 205.5 (CH$_3$C=OCH$_2$), 171.1 (C=O), 168.4 (C=O), 167.5 (C=O), 164.7 (C=O), 156.0 (q, $^2J_{C,F}$=37.6 Hz, CF$_3$C=O), 152.9 (Fluoren-CH$_2$° C.=O), 142.1 (Ar), 141.9 (Ar), 140.2 (Ar), 140.1 (Ar), 136.4 (Ar), 135.6 (Ar), 134.5 (Ar), 132.5 (Ar), 132.3 (Ar), 132.0 (Ar), 128.8 (Ar), 127.5 (Ar), 127.2 (Ar), 127.13 (Ar), 127.10 (Ar), 127.05 (Ar), 127.02 (Ar), 126.98 (Ar), 126.8 (Ar), 126.7 (Ar), 126.6 (Ar), 126.2 (Ar), 125.73 (Ar), 125.68 (Ar), 125.06 (Ar), 125.02 (Ar), 124.8 (Ar), 124.1 (Ar), 124.0 (Ar), 119.0 (Ar), 114.7 (q, $^1J_{C,F}$=288 Hz, CF$_3$), 97.7 (C-1), 97.2 (C-1"), 96.5 (C-1"'), 94.8 (C-1'), 81.0 (OC(CH$_3$)$_3$), 76.9, 73.6, 73.4, 72.2, 71.9, 71.3, 70.9, 70.5, 70.3, 69.9, 69.8, 69.4, 68.9, 68.8, 68.4, 68.3, 68.2, 68.1, 66.7, 66.5, 64.9, 61.6, 52.4 (C-2'), 51.2 (OCH$_3$), 51.1 (OCH$_3$), 45.4 (CHCH$_2$), 36.7 (CH$_2$C=O), 28.7 (CH$_3$C=O), 27.0 (CO$_2$C(CH$_3$)$_3$), 26.6 (CH$_2$C=O); HRMS (ESI-TOF) calcd for C$_{100}$H$_{102}$F$_3$N$_4$O$_{32}$S [M-Na]$^-$: 1959.6150; found: 1959.6136.

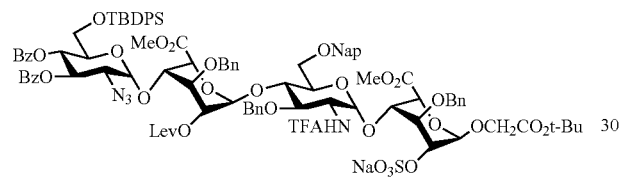

Methyl (2-azido-3-O-benzyl-4-O-benzoyl-2-deoxy-6-O-tert-butyldiphenylsilyl-α-D-glucopyranosyl)-(1→4)-(methyl 3-O-benzyl-2-O-levulinoyl-α-L-idopyranoosyluronate)-(1→4)-(3-O-benzyl-2-deoxy-6-O-2-naphthylmethyl-2-trifluoroacetamido-α-D-glucopyranosyl)-(1→4)-(3-O-benzyl-2-O-sulfonato-1-O-3-((tert-butoxy)-2-oxoacetyl))-α-L-idopyranoside)urinate mono sodium salt (28)

A solution of the tetrasaccharide 25 (22 mg, 0.011 mmol) and SO$_3$Et$_3$N (21 mg, 0.11 mmol) in DMF (3.0 mL) was stirred at 60° C. for 36 h under N$_2$ atmosphere. After cooling to RT, a solution of saturated aq. NaHCO$_3$ was added to the mixture, and the resulting solution was stirred for 1 h. The mixture was extracted with DCM, and the organic layer was dried over anhydrous Na$_2$SO$_4$, filtered, and concentrated. The resulting residue was purified by Sephadex LH-20 (elution with 1:1 DCM/MeOH) and then incubated with Dowex 50WX4Na+ resin to obtain the O-sulfated compound 28 (17 mg, 72%).

R$_f$ 0.13 (15:1 DCM/MeOH); $^1$H NMR (400 MHz, CDCl$_3$): δ 7.96-7.94 (m, 2H, Ar), 7.83-7.76 (m, 4H, Ar, NH), 7.65-7.41 (m, 11H, Ar), 7.37-7.23 (m, 12H, Ar), 7.18-7.06 (m, 14H, Ar), 5.58 (t, J=9.6 Hz, 1H, H-4'''), 5.42 (d, J=4.3 Hz, 1H, H-1"), 5.18 (d, J=3.4 Hz, 1H, H-1'''), 5.12 (d, J=2.8 Hz, 1H, H-1'), 5.07 (s, 1H, H-1), 5.00 (d, J=2.8 Hz, 1H, H-5), 4.96 (d, J=10.4 Hz, 1H, OCH$_2$Ph), 4.91 (t, J=4.9 Hz, 1H, H-2"), 4.73-4.65 (m, 6H, OCH$_2$Ph, OCH$_2$Nap), 4.58-4.54 (m, 3H, OCH$_2$Ph), 4.45 (d, J=11.3 Hz, 1H, OCH$_2$Ph), 4.28 (d, J=15.5 Hz, 1H, OCH$_2$CO$_2$t-Bu), 4.23-4.07 (m, 5H), 4.06-3.94 (m, 4H), 3.89-3.75 (m, 4H), 3.71-3.59 (m, 4H), 3.64 (s, 3H, OCH$_3$), 3.46 (dd, J=10.3, 3.3 Hz, 1H, H-2'''), 3.43 (s, 3H, OCH$_3$), 2.56-2.51 (m, 2H, CH$_2$), 2.36-2.26 (m, 2H, CH$_2$), 2.08 (s, 3H, C=OCH$_3$), 1.46 (s, 9H, OC(CH$_3$)$_3$), 0.98 (s, 9H, C(CH$_3$)$_3$); $^{13}$C NMR (100 MHz, CDCl$_3$): δ 206.6 (CH$_3$C=OCH$_2$), 172.0 (CH$_2$C=O), 169.9 (CO$_2$t-Bu), 169.3 (C=OOCH$_3$), 168.6 (C=OOCH$_3$), 164.8 (C=OPh), 137.9 (Ar), 137.3 (Ar), 137.1 (Ar), 135.6 (Ar), 135.5 (Ar), 135.2 (Ar), 133.3 (Ar), 133.2 (Ar), 130.0 (Ar), 132.9 (Ar), 129.7 (Ar), 129.65 (Ar), 128.6 (Ar), 128.56 (Ar), 128.53 (Ar), 128.3 (Ar), 128.2 (Ar), 128.1 (Ar), 128.06 (Ar), 128.0 (Ar), 127.9 (Ar), 127.7 (Ar), 127.63 (Ar), 127.56 (Ar), 127.4 (Ar), 127.3 (Ar), 115.6 (q, $^1J_{C,F}$=288 Hz, CF$_3$), 100.4 (C-1'), 97.7 (C-1"), 97.1 (C-1'''), 83.0 (OC(CH$_3$)$_3$), 77.5, 77.2, 76.8, 75.3, 74.5, 73.7, 73.5, 72.1, 71.4, 71.2, 70.3 (C-2"), 70.2 (C-4'''), 70.0 (C-5"), 67.6, 66.0 (OCH$_2$CO$_2$t-Bu), 62.9 (C-2'''), 62.0, 53.0 (C-2'), 52.3 (OCH$_3$), 51.8 (OCH$_3$), 37.6 (CH$_2$C=O), 29.7 (CH$_3$C=O), 27.9 (CO$_2$C(CH$_3$)$_3$), 27.6 (CH$_2$C=O), 26.6 (SiC(CH$_3$)$_3$), 19.1 (SiC(CH$_3$)$_3$); HRMS (ESI-TOF) calcd for C$_{101}$H$_{110}$F$_3$N$_4$O$_{30}$SSi [M-Na]$^-$: 1975.6647; found: 1975.6633.

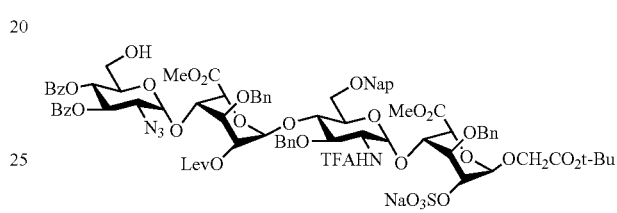

Methyl (2-azido-3-O-benzyl-4-O-benzoyl-2-deoxy-X-D-glucopyranosyl)-(1→4)-(methyl 3-O-benzyl-2-O-levulinoyl-α-L-idopyranoosyluronate)-(1→4)-(3-O-benzyl-2-deoxy-6-O-2-naphthylmethyl-2-trifluoroacetamido-α-D-glucopyranosyl)-(1→4)-(3-O-benzyl-2-O-sulfonato-1-O-3-((tert-butoxy)-2-oxoacetyl))-α-L-idopyranoside)urinate mono sodium salt (28a)

To a solution of O-sulfated tetrasaccharide 28 (17 mg, 8.5 μmol) in pyridine (2.0 mL) was added hydrogen fluoride pyridine (0.40 ml) at 0° C. After stirring at RT for 3 h, the reaction was quenched with saturated aq. NaHCO$_3$. The mixture was extracted by DCM, and the organic layer was dried over anhydrous Na$_2$SO$_4$, filtered, and concentrated. The resulting residue was purified by Sephadex LH-20 (elution with 1:1 DCM/MeOH) and then incubated with Dowex 50WX4Na+ resin to afford tetrasaccharide 28a (14 mg, 91%) as colorless foam.

R$_f$ 0.10 (15:1 DCM/MeOH); $^1$H NMR (400 MHz, CDCl$_3$): δ 7.99-7.97 (m, 2H, Ar), 7.85-7.78 (m, 4H, Ar), 7.65-7.62 (m, 1H, Ar), 7.53-7.42 (m, 5H, Ar), 7.39-7.30 (m, 7H, Ar), 7.26-7.14 (m, 13H, Ar), 5.39 (d, J=3.5 Hz, 1H, H-1"), 5.21 (t, J=9.6 Hz, 1H, H-4"), 5.17 (s, 1H, H-1'), 5.13 (d, J=3.1 Hz, 1H, H-1'''), 4.98-4.89 (m, 4H, H-1, H-5, OCH$_2$Ph, H-2"), 4.83-4.54 (m, 10H, OCH$_2$Ph, OCH$_2$Nap, H-5"), 4.45 (d, J=11.3 Hz, 1H, OCH$_2$Ph), 4.30-4.26 (m, 1H, H-2'), 4.20-3.97 (m, 8H), 3.84-3.57 (m, 7H), 3.61 (s, 3H, OCH$_3$), 3.53 (s, 3H, OCH$_3$), 3.53-3.49 (m, 1H), 3.38 (dd, J=9.7, 3.0 Hz, 1H, H-2'''), 2.55-2.49 (m, 2H, CH$_2$), 2.37-2.28 (m, 2H, CH$_2$), 2.09 (s, 3H, C=OCH$_3$), 2.01 (Br, 1H), 1.43 (s, 9H, OC(CH$_3$)$_3$); $^{13}$C NMR (100 MHz, CDCl$_3$): δ 206.9 (CH$_3$C=OCH$_2$), 172.0 (CH$_2$C=O), 169.8 (C=OOCH$_3$), 169.6 (C=OOCH$_3$), 169.5 (CO$_2$t-Bu), 166.1 (C=OPh), 157.6 (q, $^2J_{C,F}$=37.3 Hz, CF$_3$C=O), 137.8 (Ar), 137.4 (Ar), 137.1 (Ar), 135.3 (Ar), 133.9 (Ar), 133.2 (Ar), 133.0 (Ar), 129.8 (Ar), 128.9 (Ar), 128.8 (Ar), 128.7 (Ar), 128.5 (Ar), 128.34 (Ar), 128.25 (Ar), 128.16 (Ar), 128.0 (Ar), 127.97

(Ar), 127.9 (Ar), 127.8 (Ar), 127.64 (Ar), 127.59 (Ar), 127.4 (Ar), 126.8 (Ar), 126.2 (Ar), 126.1 (Ar), 125.9 (Ar), 115.7 (q, $^1J_{C,F}$=288 Hz, CF$_3$), 100.0 (C-1'), 98.3 (C-1"), 97.9 (C-1'''), 83.0 (OC(CH$_3$)$_3$), 76.9, 76.7, 74.9, 74.7, 73.7, 73.5, 72.8, 71.3, 71.1, 71.1 (C-4'''), 71.07 (C-2"), 70.1 (C-5"), 67.4, 66.0 (OCH$_2$CO$_2$t-Bu), 62.8 (C-2'''), 60.7, 52.8 (C-2'), 52.2 (OCH$_3$), 52.1 (OCH$_3$), 37.6 (CH$_2$C=O), 29.7 (CH$_3$C=O), 27.9 (CO$_2$C(CH$_3$)$_3$), 27.7 (CH$_2$C=O); HRMS (ESI-TOF) calcd for C$_{85}$H$_{92}$F$_3$N$_4$O$_{30}$S [M-Na]$^-$: 1737.5469; found: 1737.5461.

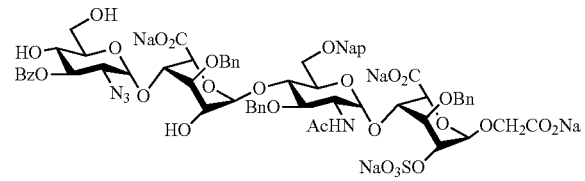

Carboxylmethyl 2-azido-3-O-benzyl-2-deoxy-α-D-glucopyranosyl-(1→4)-3-O-benzyl-α-L-idopyranosyluronate)-(1→4)-3-O-benzyl-2-deoxy-6-O-2-naphthylmethyl-2-acetamido-α-D-glucopyranosyl-(1→4)-3-O-benzyl-2-O-sulfonato-α-L-idopyranoside uronate tetra sodium salt (29)

Compound 28a (13 mg, 7.3 μmol) was dissolved in MeOH (1.0 mL), and 1.0 M aq. LiOH (2 mL) was added dropwise at 0° C. The reaction mixture was stirred at RT for 36 h, then brought to pH 8-8.5 by the addition of IR 120 H$^+$ resin to give the intermediate with a free amine group. The intermediate was dissolved in a mixture of anhydrous MeOH (3.0 mL) and Et$_3$N (15 mg, 0.15 mmol), to which was added acetic anhydride (7.5 mg, 73 μmol). The reaction mixture was stirred for 4 h at RT and concentrated under reduced pressure. The resulting residue was purified by Sephadex LH-20 (elution with MeOH) and then incubated with Dowex 50WX4Na+ resin to obtain compound 29 (9.3 mg, 85%) as a colorless foam.

$^1$H NMR (400 MHz, CD$_3$OD): δ 7.97-7.94 (m, 1H, Ar), 7.88-7.82 (m, 3H, Ar, NH), 7.57-7.55 (m, 1H, Ar), 7.46-7.21 (m, 22H, Ar), 5.36 (d, J=2.3 Hz, 1H, H-1"), 5.31 (s, 1H, H-1), 5.13 (d, J=3.6 Hz, 1H, H-1'''), 5.05 (d, J=10.8 Hz, 1H, OCH$_2$Ph), 4.82-4.70 (m, 8H, H-5", OCH$_2$Ph, OCH$_2$Nap), 4.62 (d, J=11.7 Hz, 1H, OCH$_2$Ph), 4.61 (d, J=11.1 Hz, 1H, OCH$_2$Ph), 4.58 (d, J=1.6 Hz, 1H, H-5), 4.54 (s, 1H, H-2), 4.50 (d, J=3.2 Hz, 1H, H-1'), 4.33 (s, 1H, H-4"), 4.26-4.23 (m, 1H, H-5'), 4.21 (d, J=15.6 Hz, 1H, CH$_2$CO$_2$), 4.16-4.13 (m, 1H, H-2'), 4.10 (s, 1H, H-4), 4.05-3.99 (m, 3H, H-3', H-4', CH$_2$CO$_2$), 3.94-3.80 (m, 8H, H-2", H-3, H-3''', H-3", H-5''', H-6a', H-6b', H-6a'''), 3.73 (dd, J=11.9, 4.6 Hz, 1H, H-6b'''), 3.56 (t, J=9.3 Hz, 1H, H-4'''), 3.52 (dd, J=10.2, 3.6 Hz, 1H, H-2'''), 1.93 (s, 3H, C=OCH$_3$); $^{13}$C NMR (100 MHz, CD$_3$OD): δ 175.1 (CH$_2$CO$_2$), 174.6 (CO$_2$), 174.2 (CO$_2$), 172.6 (C=ONH), 138.56 (Ar), 138.54 (Ar), 138.2 (Ar), 136.6 (Ar), 135.8 (Ar), 133.4 (Ar), 133.1 (Ar), 129.8 (Ar), 128.8 (Ar), 128.5 (Ar), 128.3 (Ar), 128.0 (Ar), 127.9 (Ar), 127.8 (Ar), 127.77 (Ar), 127.72 (Ar), 127.64 (Ar), 127.56 (Ar), 127.52 (Ar), 127.30 (Ar), 127.27 (Ar), 127.24 (Ar), 127.2 (Ar), 127.0 (Ar), 126.4 (Ar), 125.8 (Ar), 125.6 (Ar), 125.5 (Ar), 98.9 (C-1"), 98.4 (C-1), 96.4 (C-1'''), 94.5 (C-1'), 80.9 (C-3'''), 77.4 (C-3'), 75.9 (C-4'), 74.9 (OCH$_2$Ph), 74.7 (C-3"), 73.9 (OCH$_2$Nap), 73.4 (OCH$_2$Ph), 72.8 (C-4"), 72.4 (C-5'''), 71.59 (OCH$_2$Ph), 71.57 (OCH$_2$Ph), 71.3 (C-2), 71.0 (C-3, C-4'''), 70.9 (C-4), 70.4 (C-5'), 70.1 (C-5"), 68.8 (C-6'), 68.5 (C-2"), 67.5 (C-5, CH$_2$CO$_2$), 63.6 (C-2'''), 60.6 (C-6'''), 52.8 (C-2'), 21.9 (CH$_3$C=O); HRMS (ESI-TOF) calcd for C$_{67}$H$_{70}$N$_4$O$_{27}$SNa$_3$ [M-Na]$^-$: 1463.3641; found: 1463.3641.

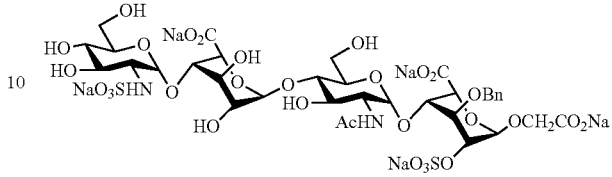

Carboxylmethyl 2-deoxy-2-sulfamino-α-D-glucopyranosyl-(1→-4)-α-L-idopyranosyluronate)-(1→4)-2-deoxy-2-acetamido-α-D-glucopyranosyl-(1→4)-2-O-sulfonato-α-L-idopyranoside uronate penta sodium salt (30)

To a solution of compound 29 (5.7 mg, 0.0038 mmol) in 1:1 tert-butanol/water (2.0 mL) was added palladium hydroxide on carbon (30 mg). The reaction mixture was stirred under hydrogen atmosphere for 36 h. After completion of the reaction, the mixture was filtered, and the residue was washed with a mixture of 1:1 tert-butanol/H$_2$O (2.0 mL). The combined solvents were concentrated under reduced pressure, and the residue was dissolved in distilled water (0.5 mL), NaHCO$_3$ (5.0 mg, 0.060 mmol) and pyridine sulfur trioxide complex (5.0 mg, 0.030 mmol) was added with vigorous stirring. This procedure was repeated after 2 h and 4 h. The reaction mixture was stirred for 12 h at RT and then purified by Sephadex G15 (elution with H$_2$O) to give sulfated compound 30 (3.5 mg, 86%).

$^1$H NMR (400 MHz, D$_2$O): δ 5.28 (d, J=3.5 Hz, 1H, H-1'''), 5.01 (s, 1H, H-1), 5.00 (d, J=3.5 Hz, 1H, H-1'), 4.81 (d, J=2.3 Hz, 1H, H-1"), 4.64 (s, 1H, H-5"), 4.46 (s, 1H, H-5), 4.24 (s, 1H, H-3), 4.21 (s, 1H, H-2), 4.02 (d, J=15.7 Hz, 1H, CH$_2$CO$_2$), 3.98-3.88 (m, 5H, H-3", H-4", H-4, H-2', CH$_2$CO$_2$), 3.79-3.57 (m, 9H, H-2", H-3', H-4', H-5', H-5''', H-6a', H-6b', H-6a''', H-6b'''), 3.51 (t, J=9.8 Hz, 1H, H-3'''), 3.34 (t, J=9.5 Hz, 1H, H-4'''), 3.09 (dd, J=10.2, 3.2 Hz, 1H, H-2'''), 1.93 (s, 3H, C=OCH$_3$); $^{13}$C NMR (100 MHz, D$_2$O): δ 177.1 (CH$_2$CO$_2$), 175.24 (CO$_2$), 175.17 (CO$_2$), 174.3 (C=ONH), 101.6 (C-1"), 98.2 (C-1), 95.3 (C-1'''), 93.2 (C-1'), 76.7 (C-4'), 74.8 (C-4"), 72.8 (C-3), 71.6 (C-5"), 71.2 (C-3'''), 71.1 (C-5'), 70.1 (C-4), 69.9 (C-3'), 69.7 (C-4'''), 69.4 (C-5"), 69.3 (C-2"), 68.9 (C-3"), 66.7 (CH$_2$CO$_2$), 66.6 (C-5), 62.9 (C-2), 60.1 (C-6'''), 59.6 (C-6'), 57.8 (C-2"), 53.5 (C-2'), 22.2 (CH$_3$C=O); HRMS (ESI-TOF) calcd for C$_{28}$H$_{39}$N$_2$O$_{30}$S2Na$_4$ [M-Na]$^-$: 1039.0620; found: 1039.0638.

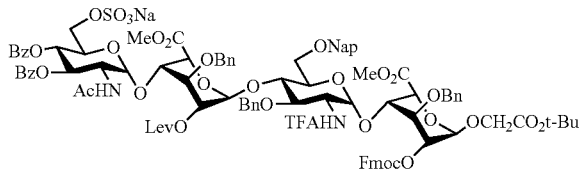

Methyl (2-acetamido-3-O-benzyl-4-O-benzoyl-2-deoxy-6-O-sulfonato-α-D-glucopyranosyl)-(1→4)-(methyl 3-O-benzyl-2-O-levulinoyl-α-L-idopyranoosyluronate)-(1→4)-(3-O-benzyl-2-deoxy-6-O-2-naphthylmethyl-2-trifluoroacetamido-α-D-glucopyranosyl)-(1→4)-(3-O-benzyl-2-O-((9H-fluoren-9-yl)methoxycarbonyl)-1-O-3-((tert-butoxy)-2-oxoacetyl))-α-L-idopyranoside)uronate mono sodium salt (31)

To a solution of compound 27 (13 mg, 6.5 μmol) in DCM (0.30 mL) was added pyridine (0.50 mL) followed by thioacetic acid (0.50 mL) at RT. After stirring for 18 h, the mixture was diluted with DCM and washed with saturated aq. NaHCO$_3$ and then brine. The organic layer was dried over anhydrous Na$_2$SO$_4$, filtered, and concentrated. The resulting residue was purified by silica gel column chromatography (elution with 20:1→10:1 DCM/MeOH) and then incubated with Dowex 50WX4Na+ resin to obtain the O-sulfated compound 31 (11 mg, 82%).

R$_f$ 0.34 (9:1 DCM/MeOH); $^1$H NMR (400 MHz, CDCl$_3$): δ 7.92-7.72 (m, 8H, Ar), 7.52-7.29 (m, 18H, Ar), 7.27-6.82 (m, 16H, Ar, NH), 5.64 (br, 1H, H-4'''), 5.24 (s, 1H, H-1''), 5.20 (s, 1H, H-1), 5.07 (s, 1H, H-5 or H-5''), 5.01 (s, 1H, H-1'''), 4.96 (s, 1H, H-2 or H-2''), 4.94 (s, 1H, H-2 or H-2''), 4.88 (s, 1H, H-5 or H-5''), 4.82 (s, 1H, H-1'), 4.79-4.52 (m, 7H, OCH$_2$Ph, OCH$_2$Nap), 4.46-4.32 (m, 5H, OCH$_2$Ph, OCH$_2$—Fluoren, H-2'), 4.29-3.96 (m, 10H), 3.89-3.62 (m, 8H), 3.56 (s, 3H, OCH$_3$), 3.28 (s, 3H, OCH$_3$), 2.66-2.56 (m, 2H, CH$_2$), 2.48-2.40 (m, 2H, CH$_2$), 2.03 (s, 3H, C=OCH$_3$), 1.70 (s, 3H, C=OCH$_3$), 1.45 (s, 9H, OC(CH$_3$)$_3$); $^{13}$C NMR (100 MHz, CDCl$_3$): δ 207.2 (CH$_3$C=OCH$_2$), 172.0 (C=O), 171.9 (C=O), 169.2 (C=O), 168.5 (C=O), 165.6 (C=O), 165.5 (C=O), 157.0 (q, $^2J_{C,F}$=37.6 Hz, CF$_3$C=O), 153.9 (Fluoren-CH$_2$° C.=O), 143.1 (Ar), 142.8 (Ar), 141.2 (Ar), 137.6 (Ar), 136.6 (Ar), 135.5 (Ar), 133.5 (Ar), 133.3 (Ar), 132.9 (Ar), 129.9 (Ar), 129.2 (Ar), 128.6 (Ar), 128.3 (Ar), 128.2 (Ar), 128.0 (Ar), 127.9 (Ar), 127.7 (Ar), 127.5 (Ar), 127.3 (Ar), 127.0 (Ar), 126.5 (Ar), 126.4 (Ar), 126.1 (Ar), 125.9 (Ar), 125.8 (Ar), 125.0 (Ar), 124.9 (Ar), 120.0 (Ar), 115.7 (q, $^1J_{C,F}$=288 Hz, CF$_3$), 98.7 (C-1), 97.9 (C-1''), 96.2 (C-1'), 82.0 (OC(CH$_3$)$_3$), 78.3, 74.3, 74.1, 73.1, 72.7, 72.3, 72.1, 71.8, 71.4, 71.0, 70.8, 70.1, 69.7, 69.6, 69.5, 69.3, 68.6, 67.6, 67.5, 65.9, 64.5, 53.1 (C-2'), 52.1 (OCH$_3$), 51.8 (OCH$_3$), 46.4 (CHCH$_2$), 37.7 (CH$_2$C=O), 29.7 (CH$_3$C=O), 28.0 (CO$_2$C(CH$_3$)$_3$), 27.6 (CH$_2$C=O), 22.7 (CH$_3$C=O); HRMS (ESI-TOF) calcd for C$_{102}$H$_{106}$F$_3$N$_2$O$_{33}$S [M-Na]$^-$: 1975.6351; found: 1975.6366.

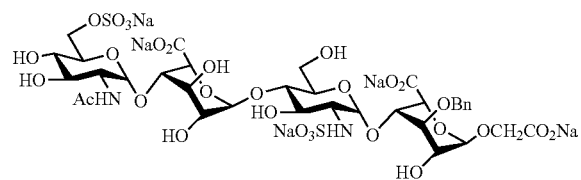

Carboxylmethyl 2-deoxy-2-acetamido-6-O-sulfonato-α-D-glucopyranosyl-(1→4)-α-L-idopyranosyluronate-(1→4)-2-deoxy-2-sulfamino-α-D-glucopyranosyl-(1→4)-α-L-idopyranoside uronate penta sodium salt (32)

Compound 31 (9.0 mg, 4.5 μmol) was dissolved in MeOH (0.3 mL), and 1.0 M aq. LiOH (1.0 mL) was added dropwise at 0° C. The reaction mixture was stirred at RT for 12 h, then brought to pH 8-8.5 by the addition of IR 120 H+ resin. After filtration and concentration, the crude intermediate was obtained. This intermediate was dissolved in 1:1 tert-butanol/water (4.0 mL) and palladium hydroxide on carbon (30 mg) was added. The reaction mixture was stirred under a H$_2$ atmosphere for 36 h. After completion of the reaction, the mixture was filtered, and the residue was washed with a mixture of 1:1 tert-butanol/H$_2$O (4.0 mL). The combined solvents were concentrated under reduced pressure, and the resulting residue was dissolved in distilled water (0.5 mL). NaHCO$_3$ (5.0 mg, 0.060 mmol) and sulfur trioxide pyridine complex (5.0 mg, 0.030 mmol) were then added with vigorous stirring. This procedure was repeated after 2 h and 4 h. The reaction mixture was stirred for 12 h at RT and then purified by Sephadex G15 (elution with H$_2$O) to give sulfated compound 32 (3.4 mg, 71%).

$^1$H NMR (400 MHz, D$_2$O): δ 5.27 (d, J=3.5 Hz, 1H, H-1'), 5.15 (d, J=3.5 Hz, 1H, H-1'''), 4.87 (s, 1H, H-1 or H-1''), 4.86 (s, 1H, H-1 or H-1''), 4.72 (s, 1H, H-5'' or H-5), 4.46 (d, J=1.8 Hz, 1H, H-5'' or H-5), 4.31 (dd, J=11.2, 2.5 Hz, 1H, H-6'''), 4.15 (dd, J=11.2, 1.0 Hz, 1H, H-6'''), 4.12-4.04 (m, 3H), 3.98-3.92 (m, 3H), 3.90 (dd, J=10.0, 3.5 Hz, 1H, H-2'''), 3.83-3.74 (m, 5H), 3.70-3.64 (m, 3H), 3.61 (t, J=9.2 Hz, 1H, H-3'), 3.52 (t, J=9.6 Hz, 1H, H-4'''), 3.09 (dd, J=10.0, 3.5 Hz, 1H, H-2'), 1.97 (s, 3H, C=OCH$_3$); $^{13}$C NMR (100 MHz, D$_2$O): δ 177.5 (C=O), 175.4 (C=O), 174.9 (C=O), 174.3 (C O), 101.4 (C-1 or C-1''), 100.4 (C-1 or C-1''), 95.7 (C-1'), 94.3 (C-1'''), 76.8, 74.4 (2×C), 70.95, 70.86, 70.1, 69.8 (2×C), 69.65, 69.61, 69.0 (C-4'''), 67.9, 67.7, 67.2, 66.5 (CH$_2$CO$_2$), 66.3 (C-6'''), 59.6 (C-6'), 57.9 (C-2'), 53.2 (C-2'''), 21.9 (CH$_3$C=O); HRMS (ESI-TOF) calcd for C$_{28}$H$_{39}$N$_2$O$_{30}$S$_2$Na$_4$ [M-Na]$^-$: 1039.0620; found: 1039.0621.

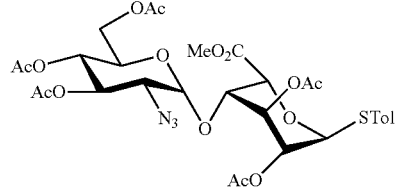

Methyl (2-azido-3,4,6-tri-O-acetyl-2-deoxy-α-D-glucopyranosyl)-(1→4)-(2,3-di-O-acetyl-1-p-tolyl-thio-α-L-idopyranoside)uronate (S1)

To a solution of compound 1b (2.0 g, 3.1 mmol) in anhydrous DCM (20 mL) were added trimethyl(p-tolylthio)silane (TMSSTol, 1.8 g, 9.3 mmol) and ZnI$_2$ (3.9 g, 12 mmol). After stirring at RT overnight, the reaction was diluted with DCM (80 mL), and the organic layer was washed with saturated aq. NaHCO$_3$, dried over anhydrous MgSO$_4$, filtered, and concentrated. Purification of the residue via silica gel column chromatography (20×3 cm; elution using 2:1 hexanes/EtOAc) gave compound S1 (1.9 g, 89%) as an off-white foam. R$_f$ 0.5 (1:1 hexanes/EtOAc); $^1$H NMR (500 MHz, CDCl$_3$): δ 7.36 (d, J=8.1 Hz, 2H, Ar), 7.10 (d, J=8.1 Hz, 2H, Ar), 5.55 (d, J=1.9 Hz, 1H, H-1), 5.38 (dd, J=10.6, 9.3 Hz, 1H, H-3'), 5.26 (t, J=3.4 Hz, 1H, H-3), 5.21 (d, J=2.5 Hz, 1H, H-5), 5.10 (d, J=3.5 Hz, 1H, H-1'), 5.04 (dd, J=10.0, 9.3 Hz, 1H, H-4'), 5.00 (dd, J=3.4, 1.9 Hz, 1H, H-2), 4.22 (dd, J=12.5, 3.5 Hz, 1H, H-6'), 4.16-4.09 (m, 3H, H-4, H-5', H-6'), 3.85 (s, 3H, OCH$_3$), 3.45 (dd, J=10.6, 3.5

Hz, 1H, H-2'), 2.32 (s, 3H), 2.18 (s, 3H), 2.16 (s, 3H), 2.06 (s, 6H), 1.99 (s, 3H); $^{13}$C NMR (125 MHz, CDCl$_3$): δ 170.7 (C=O), 170.1 (C=O), 169.9 (C=O), 169.8 (C=O), 169.1 (C=O), 168.9 (C=O), 138.3, 132.5, 130.3, 130.0, 98.7 (C-1'), 86.6 (C-1), 73.7 (C-4), 70.7 (C-3'), 68.7 (C-5'), 68.6 (C-2, C-5), 68.2 (C-4'), 67.4 (C-3), 61.4 (C-6'), 61.3 (C-2'), 52.75 (OCH$_3$), 21.26, 21.01, 20.84, 20.79, 20.78, 20.69; HRMS (ESI-TOF) calcd for C$_{30}$H$_{37}$N$_3$O$_{15}$SNa [M+Na]$^+$: 734.1843; found: 734.1839.

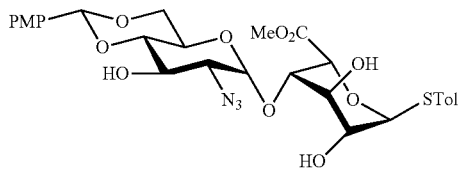

Methyl (2-azido-2-deoxy-4,6-O-p-methoxyben-zylidene-α-D-glucopyranosyl)-(1→4)-(1-p-tolylthio-C-L-idopyranoside)uronate (S2)

To a solution of disaccharide S1 (1.9 g, 3.8 mmol) in anhydrous MeOH (40 mL) was added 25 wt % of NaOMe in MeOH (0.40 mL, 1.8 mmol) at 0° C. The reaction was stirred at RT under argon for 2 h, quenched with IR-120 resin, and stirred for an additional 15 min. The solution was filtered and concentrated under reduced pressure to give the unprotected disaccharide. To a solution of the unprotected disaccharide in anhydrous CH$_3$CN (30 mL) were added p-methoxybenzaldehyde dimethylacetal (1.4 mg, 7.8 mmol) and pTsOH (49 mg, 0.26 mmol). After stirring at 45° C. for 1 h, the reaction was quenched with Et$_3$N (35 µL, 0.26 mmol) and concentrated. Purification by silica gel column chromatography (elution with 2:1→1:1 hexanes/EtOAc) gave compound S2 (1.4 g, 84%) as a colorless foam. R$_f$ 0.6 (1:4 hexanes/EtOAc); $^1$H NMR (500 MHz, CD$_3$COCD$_3$): δ 7.42-7.37 (m, 4H, Ar), 7.15 (d, J=7.8 Hz, 2H, Ar), 6.92 (d, J=8.8 Hz, 2H, Ar), 5.56 (s, 1H), 5.47 (d, J=2.8 Hz, 1H, H-1), 5.32 (d, J=3.8 Hz, 1H, H-1'), 5.26 (d, J=4.6 Hz, 1H, OH-3'), 5.22 (d, J=2.8 Hz, 1H, H-5), 4.95 (d, J=3.9 Hz, 1H, OH-3), 4.25-4.20 (m, 2H, H-3, OH-2), 4.19 (dd, J=10.0, 4.7 Hz, 1H, H-6'), 4.15 (t, J=2.8 Hz, 1H, H-4), 3.98-3.91 (m, 1H, H-3'), 3.81 (s, 3H, OCH$_3$), 3.80 (s, 3H, OCH$_3$), 3.73 (t, J=10.0 Hz, 1H, H-6'), 3.71-3.69 (m, 1H, H-2), 3.67 (dd, J=9.9, 3.8 Hz, 1H, H-2'), 3.63 (td, J=10.0, 4.7 Hz, 1H, H-5'), 3.55 (t, J=10.0 Hz, 1H, H-4'), 2.30 (s, 3H); $^{13}$C NMR (125 MHz, CD$_3$COCD$_3$): δ 170.3 (C=O), 161.1, 137.7, 133.7, 131.9, 131.3, 130.4, 128.6, 114.1, 102.4, 97.2 (C-1'), 89.9 (C-1), 82.1 (C-4'), 74.9 (C-4), 72.3 (C-2), 70.6 (C-3'), 69.4 (C-5), 68.9 (C-6'), 67.4 (C-3), 65.1 (C-2'), 64.3 (C-5') 55.56 (OCH$_3$), 52.46 (OCH$_3$), 21.00; HRMS (ESI-TOF) calcd for C$_{28}$H$_{33}$N$_3$O$_{11}$SNa [M+Na]$^+$: 642.1733; found: 642.1749.

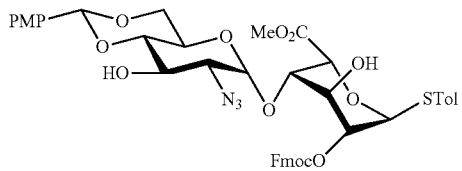

Methyl (2-azido-2-deoxy-4,6-O-p-methoxyben-zylidene-α-D-glucopyranosyl)-(1→4)-2-O-((9H-fluoren-9-yl)methylcarbonyl)-1-p-tolylthio-α-L-idopyranoside)uronate (S3)

To a solution of S2 (0.60 g, 0.97 mmol) in anhydrous toluene (40 mL) were added dibutyltin oxide (0.48 g, 1.9 mmol) and TBAI (0.71 g, 1.9 mmol). The mixture was refluxed for 1 h, then allowed to cool to 90° C., and fluorenylmethyloxycarbonyl chloride (FmocCl) (0.75 g, 2.9 mmol) was added. After stirring at 90° C. for an additional 1 h, the reaction was quenched using saturated aq. NaHCO$_3$ (50 mL) and extracted with EtOAc (100 mL×3). The organic layer was washed with water (50 mL), dried over Na$_2$SO$_4$, and concentrated. Purification by silica gel column chromatography (elution with 3:2 hexanes/EtOAc) afforded S3 (0.69 g, 85%) as a white foam. R$_f$ 0.5 (1:1 hexanes/EtOAc); $^1$H NMR (500 MHz, CD$_3$COCD$_3$): δ 7.85 (d, J=7.5 Hz, 2H, Ar), 7.73 (d, J=7.5 Hz, 1H, Ar), 7.70 (d, J=7.5 Hz, 1H, Ar), 7.43-7.25 (m, 8H, Ar), 7.15 (d, J=7.9 Hz, 2H, Ar), 6.83 (d, J=8.7 Hz, 2H, Ar), 5.68 (d, J=4.1 Hz, 1H, H-1), 5.53 (s, 1H), 5.28 (d, J=4.5 Hz, 1H, OH-3), 5.21 (d, J=3.5 Hz, 1H, H-1'), 5.18 (d, J=3.3 Hz, 1H, H-5), 5.05 (d, J=4.4 Hz, 1H, OH-3'), 4.80 (t, J=4.1 Hz, 1H, H-2), 4.46-4.39 (m, 3H, H-3, Fmoc-CH$_2$), 4.33 (t, J=7.4 Hz, 1H), 4.26 (dd, J=10.0, 4.9 Hz, 1H, H-6'), 4.21-4.15 (m, 2H, H-3', H-4), 3.94 (td, J=10.0, 4.9 Hz, 1H, H-5'), 3.79 (s, 3H, OCH$_3$), 3.75 (s, 3H, OCH$_3$), 3.69 (t, J=10.0 Hz, 1H, H-6'), 3.52 (t, J=10.0 Hz, 1H, H-4'), 3.40 (dd, J=10.0, 3.5 Hz, 1H, H-2'), 2.31 (s, 3H); $^{13}$C NMR (125 MHz, CD$_3$COCD$_3$): δ 170.0 (C=O), 160.9, 155.2 (C=O), 144.7, 144.3, 142.1, 141.9, 138.3, 132.4, 132.4, 131.3, 130.5, 128.7, 128.6, 128.6, 128.2, 128.1, 126.3, 126.2, 120.82, 120.80, 114.0, 102.4, 100.4 (C-1'), 86.2 (C-1), 82.7 (C-4'), 77.04 (C-4), 76.04 (C-2), 70.7, 70.4 (C-5), 69.4 (C-3'), 69.0 (C-6'), 68.2 (C-3), 64.82 (C-2'), 64.3 (C-5'), 55.5 (OCH$_3$), 52.4 (OCH$_3$), 47.5, 21.0; HRMS (ESI-TOF) calcd for C$_{43}$H$_{43}$N$_3$O$_{13}$SNa [M+Na]$^+$: 864.2415; found: 864.2440. Note: Dibutyltin oxide (n-Bu$_2$SnO) is highly toxic. Obtain special instructions before use and do not handle until all safety precautions have been read and understood.

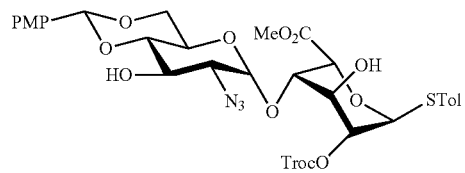

Methyl (2-azido-2-deoxy-4,6-O-p-methoxyben-zylidene-O-D-glucopyranosyl)-(1→4)-(1-p-tolyl-thio-2-O-((2,2,2-trichloroethoxy)carbonyl)-α-L-idopyranoside)uronate (S4)

To a solution of S2 (0.11 g, 0.18 mmol) in anhydrous toluene (10 mL) were added dibutyltin oxide (92 mg, 0.37 mmol) and TBAI (0.14 g, 0.37 mmol). The mixture was refluxed for 1 h, then allowed to cool to 70° C., and 2,2,2-trichloroethyl chloroformate (78 mg, 0.37 mmol) was added. After stirring at 70° C. for an additional 1 h, the reaction was quenched using saturated aq. NaHCO$_3$ (25 mL) and extracted with EtOAc (40 mL×3). The organic layer was washed with water (50 mL), dried over Na$_2$SO$_4$, and concentrated. Purification by silica gel column chromatography (eluted with 3:2 hexanes/EtOAc) afforded S4 (0.11 g, 73%) as an off-white foam. $R_f$ 0.5 (6:4 hexanes/EtOAc); $^1$H NMR (500 MHz, CD$_3$COCD$_3$): δ 7.43-7.36 (m, 4H, Ar), 7.15 (d, J=7.9 Hz, 2H, Ar), 6.90 (d, J=8.8 Hz, 2H, Ar), 5.67 (d, J=4.5 Hz, 1H, H-1), 5.54 (s, 1H), 5.32 (d, J=4.7 Hz, 1H, OH-3), 5.21 (d, J=3.6 Hz, 1H, H-1'), 5.14 (d, J=3.7 Hz, 1H, H-5), 5.04 (d, J=4.4 Hz, 1H, OH-3'), 5.00 (d, J=12.0 Hz, 1H, CCl$_3$CH$_2$), 4.85 (d, J=12.0 Hz, 1H, CCl$_3$CH$_2$), 4.81 (t, J=4.5 Hz, 1H, H-2), 4.42-4.37 (m, 1H, H-3), 4.24 (dd, J=10.1, 4.8 Hz, 1H, H-6'), 4.15 (dd, J=5.0, 3.7 Hz, 1H, H-4), 4.10-4.04 (m, 1H, H-3'), 3.88-3.80 (m, 1H, H-5'), 3.79 (s, 3H, OCH$_3$), 3.78 (s, 3H, OCH$_3$), 3.69 (t, J=10.1 Hz, 1H, H-6'), 3.51 (t, J=9.4 Hz, 1H, H-4'), 3.35 (dd, J=10.0, 3.6 Hz, 1H, H-2'), 2.31 (s, 3H); $^{13}$C NMR (125 MHz, CD$_3$COCD$_3$): δ 169.9 (C=O), 161.0, 154.1 (C=O), 138.4, 132.5, 132.0, 131.3, 130.5, 128.6, 114.1, 102.4, 100.2 (C-1'), 95.5, 85.72 (C-1), 82.61 (C-4'), 77.6, 76.9 (C-2), 76.5 (C-4), 70.8 (C-5), 69.2 (C-3'), 69.0 (C-6'), 68.1 (C-3), 64.7 (C-2'), 64.3 (C-5'), 55.5 (OCH$_3$), 52.4 (OCH$_3$), 21.0; HRMS (ESI-TOF) calcd for C$_{31}$H$_{34}$C$_{13}$N$_3$O$_{13}$SNa [M+Na]$^+$: 816.0776; found: 816.0759. Note: Dibutyltin oxide (n-Bu$_2$SnO) is highly toxic. Obtain special instructions before use and do not handle until all safety precautions have been read and understood.

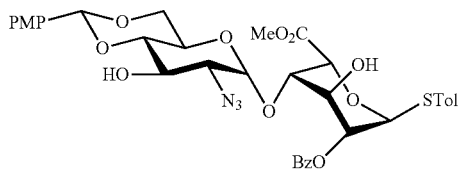

Methyl (2-azido-2-deoxy-4,6-O-p-methoxyben-zylidene-α-D-glucopyranosyl)-(1→4)-(2-O-benzoyl-1-p-tolylthio-α-L-idopyranoside)uronate (S5)

To a solution of S2 (50 mg, 0.080 mmol) in anhydrous toluene (6 mL) were added dibutyltin oxide (40 mg, 0.16 mmol) and TBAI (59 mg, 0.16 mmol). The mixture was refluxed for 1 h, then allowed to cool to 70° C., and benzoyl chloride (23 mg, 0.16 mmol) was added. After stirring for an additional 2 h at 70° C., the reaction was quenched using saturated aq. NaHCO$_3$ (20 mL) and extracted with EtOAc (30 mL×3). The organic layer was washed with water (30 mL), dried over Na$_2$SO$_4$, and concentrated. Purification by silica gel column chromatography (elution with 1:1 hexanes/EtOAc) afforded S5 (43 mg, 74%) as an off-white solid. $R_f$ 0.6 (2:3 hexanes/EtOAc); $^1$H NMR (500 MHz, CD$_3$COCD$_3$): δ 8.12 (d, J=8.4 Hz, 2H, Ar), 7.55 (t, J=8.0 Hz, 1H, Ar), 7.45-7.36 (m, 6H, Ar), 7.10 (d, J=7.8 Hz, 2H, Ar), 6.91 (d, J=8.8 Hz, 2H, Ar), 5.75 (d, J=6.4 Hz, 1H, H-1), 5.46 (s, 1H), 5.11 (t, J=6.4 Hz, 1H, H-2), 5.04 (d, J=3.8 Hz, 1H, H-1'), 5.00 (d, J=4.7 Hz, 1H, H-5), 4.45 (bt, J=6.4 Hz, 1H, H-3), 4.28 (dd, J=10.1, 4.9 Hz, 1H, H-6'), 3.99 (dd, J=6.4, 4.7 Hz, 1H, H-4), 3.94 (t, J=9.7 Hz, 1H, H-3'), 3.93-3.88 (m, 1H, H-5'), 3.83 (s, 3H, OCH$_3$), 3.82 (s, 3H, OCH$_3$), 3.67 (t, J=10.1 Hz, 1H, H-6'), 3.43 (t, J=9.7 Hz, 1H, H-4'), 3.38 (dd, J=9.7, 3.8 Hz, 1H, H-2'), 3.24 (bs, 1H, OH), 2.45 (bs, 1H, OH), 2.33 (s, 3H); $^{13}$C NMR (125 MHz, CD$_3$COCD$_3$): δ 169.5 (C=O), 165.9 (C=O), 160.5, 138.4, 133.5, 133.1, 130.2, 129.9, 129.6, 129.5, 129.1, 128.6, 127.7, 113.9, 102.2, 100.6 (C-1'), 84.4 (C-1), 81.4 (C-4'), 78.7 (C-4), 72.1 (C-2), 71.6 (C-5), 70.0 (C-3'), 69.9 (C-3), 68.6 (C-6'), 63.8 (C-2'), 63.43 (C-5'), 55.5 (OCH$_3$), 52.4 (OCH$_3$), 21.3; HRMS (ESI-TOF) calcd for C$_{35}$H$_{37}$N$_3$O$_{12}$SNa [M+Na]$^+$: 746.1996; found: 746.1999. Note: Dibutyltin oxide (n-Bu$_2$SnO) is highly toxic. Obtain special instructions before use and do not handle until all safety precautions have been read and understood.

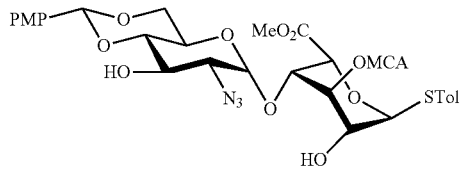

Methyl (2-azido-2-deoxy-4,6-O-p-methoxyben-zylidene-α-D-glucopyranosyl)-(1→4)-(3-O-chloro-acetyl-1-p-tolylthio-α-L-idopyranoside)uronate (S6)

To a solution of S2 (50 mg, 0.080 mmol) in anhydrous toluene (6 mL) were added dibutyltin oxide (40 mg, 0.16 mmol) and TBAI (59 mg, 0.16 mmol). The mixture was refluxed for 1 h, then cooled to 0° C., and chloroacetyl chloride (11 mg, 0.090 mmol) was added. After stirring for an additional 15 min at 0° C., the reaction was quenched using saturated aq. NaHCO$_3$ (20 mL) and extracted with EtOAc (30 mL×3). The organic layer was washed with water (30 mL), dried over Na$_2$SO$_4$, and concentrated. Purification by silica gel column chromatography (eluted with 1:1 hexanes/EtOAc) gave S6 (44 mg, 75%) as an off-white foam. $R_f$ 0.5 (1:1 hexanes/EtOAc); $^1$H NMR (500 MHz, CD$_3$COCD$_3$): δ 7.44-7.37 (m, 4H, Ar), 7.16 (d, J=7.9 Hz, 2H, Ar), 6.91 (d, J=8.8 Hz, 2H, Ar), 5.55 (s, 1H), 5.50 (d, J=5.8 Hz, 1H, H-1), 5.49 (t, J=6.1 Hz, 1H, H-3), 5.25 (d, J=4.6 Hz, 1H, OH-3'), 5.22 (d, J=3.9 Hz, 1H, H-1'), 5.00 (d, J=4.5 Hz, 1H, H-5), 4.63 (d, J=8.1 Hz, 1H, OH-2), 4.44 (d, J=15.5 Hz, 1H, ClCH$_2$), 4.36 (d, J=15.5 Hz, 1H, ClCH$_2$), 4.21-4.18 (m, 1H, H-6'), 4.15 (dd, J=6.1, 4.5 Hz, 1H, H-4), 3.95-3.90 (m, 1H, H-3'), 3.81 (s, 3H, OCH$_3$), 3.80 (s, 3H, OCH$_3$), 3.75-3.69 (m, 2H, H-5', H-6'), 3.68-3.64 (m, 1H, H-2), 3.61 (dd, J=9.9, 3.9 Hz, 1H, H-2'), 3.57-3.52 (m, 1H, H-4'), 2.32 (s, 3H); $^{13}$C NMR (125 MHz, CD$_3$COCD$_3$): δ 168.9 (C=O), 165.9 (C=O), 160.1, 137.5, 132.0, 130.3, 130.0, 129.5, 127.6, 113.1, 101.4, 98.3 (C-1'), 86.9 (C-1), 81.1 (C-4'), 73.0 (C-4), 71.6 (C-3), 71.1 (C-5), 69.2 (C-3'), 69.0 (C-2), 67.9 (C-6'), 63.7 (C-2'), 63.6 (C-5'), 54.56 (OCH$_3$), 51.64 (OCH$_3$), 40.87, 20.04; HRMS (ESI-TOF) calcd for C$_{30}$H$_{34}$ClN$_3$O$_{12}$SNa [M+Na]$^+$: 718.1449; found: 718.1452. Note: Dibutyltin oxide (n-Bu$_2$SnO) is highly toxic. Obtain special instructions before use and do not handle until all safety precautions have been read and understood.

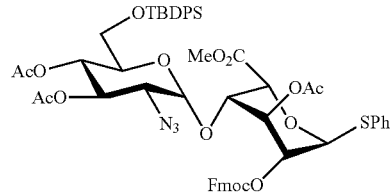

Methyl (3,4-O-di-acetyl-2-azido-2-deoxy-6-O-tert-butyldiphenylsilyl-α-D-glucopyranosyl)-(1→4)-(3-O-acetyl-2-O-((9H-fluoren-9-yl)methoxycarbonyl)-1-p-tolylthio-α-L-idopyranoside)uronate (19)

To a solution of compound S3 (0.10 g, 0.12 mmol) in anhydrous MeOH (5.0 mL) was added p-toluenesulfonic acid (5.0 mg, 0.026 mmol) at RT. The reaction was and stirred for 3 h, concentrated under pressure, and the resultant residue was triturated with 2% EtOAc in hexanes (5 mL×3). The crude mixture was dissolved in anhydrous THF (5 mL), and TBDPSCl (0.13 g, 0.60 mmol) and imidazole (66 mg, 0.97 mmol) were added at 0° C. After stirring at RT for 3 h, the reaction was diluted with EtOAc, washed with saturated aq. $NH_4Cl$ and brine. The organic layer was dried over $Na_2SO_4$ and concentrated using reduced pressure. The resulting crude mixture was further treated with 3.0 mL of 2:1 pyridine/acetic anhydride at 0° C. After stirring at RT for 0.5 h, the solution was concentrated, re-dissolved in EtOAc, washed with saturated aq. $NaHCO_3$, and brine. The organic layer was dried over $Na_2SO_4$, concentrated, and purified by silica gel column chromatography (elution with 5:1→4:1 hexanes/EtOAc) to give compound 19 (0.10 g, 78%, over three steps) as a colorless foam. $R_f$ 0.6 (2:1 hexanes/EtOAc); $^1H$ NMR (500 MHz, $C_6D_6$): δ 7.89-7.84 (m, 2H, Ar), 7.83-7.77 (m, 2H, Ar), 7.66-7.59 (m, 2H, Ar), 7.60-7.53 (m, 4H, Ar), 7.35-7.18 (m, 10H, Ar), 6.85 (d, J=7.9 Hz, 2H, Ar), 6.09 (d, J=5.5 Hz, 1H, H-1), 5.94 (t, J=5.5 Hz, 1H, H-3), 5.72 (dd, J=10.5, 9.5 Hz, 1H, H-3'), 5.50 (t, J=9.5 Hz, 1H, H-4'), 5.17 (d, J=4.3 Hz, 1H, H-5), 5.14 (t, J=5.5 Hz, 1H, H-2), 4.92 (d, J=3.5 Hz, 1H, H-1'), 4.38 (dd, J=8.5, 5.7 Hz, 1H, $OCO_2CH_{2a}$-Fluoren), 4.35-4.31 (m, 1H, H-5'), 4.30-4.23 (m, 2H, $OCO_2CH_2$b-Fluoren, $OCO_2CH_2$—CH), 4.14 (dd, J=5.5, 4.4 Hz, 1H, H-4), 3.96 (dd, J=11.5, 1.5 Hz, 1H, H-6a'), 3.83 (dd, J=11.5, 3.9 Hz, 1H, H-6b'), 3.48 (s, 3H, $OCH_3$), 3.08 (dd, J=10.5, 3.5 Hz, 1H, H-2'), 1.98 (s, 3H, $CH_3$), 1.73 (s, 3H, $CH_3$), 1.72 (s, 3H, $CH_3$), 1.58 (s, 3H, $CH_3$), 1.25 (s, 9H, t-Bu); $^{13}C$ NMR (125 MHz, $C_6D_6$): δ 169.4 (C=O), 168.84 (C=O), 168.81 (C=O), 168.2 (C=O), 154.4 (C=O), 143.7 (Ar), 143.5 (Ar), 141.4 (Ar), 141.3 (Ar), 137.9 (Ar), 135.82 (2C, Ar), 135.79 (2C, Ar), 133.24 (Ar), 133.18 (Ar), 133.0 (2C, Ar), 129.80 (2C, Ar), 129.78 (Ar), 129.74 (Ar), 128.0 (Ar), 127.82 (Ar), 127.81 (Ar), 127.78 (Ar), 127.73 (Ar), 127.6 (Ar), 127.3 (Ar), 127.24 (Ar), 127.19 (Ar), 125.5 (Ar), 125.4 (Ar), 119.9 (2C, Ar), 98.1 (C-1'), 84.8 (C-1), 73.1 (C-2), 72.3 (C-4), 71.2 (C-5'), 71.1 (C-5), 70.6 ($OCO_2CH_2$-Fluoren), 70.5 (C-3'), 68.5 (C-4'), 68.2 (C-3), 62.1 (C-6'), 60.8 (C-2'), 51.8 ($OCH_3$), 46.6 ($OCO_2CH_2$—CH), 26.7 ($C(CH_3)_3$), 20.6 ($CH_3$), 20.0 ($CH_3$), 19.91 ($CH_3$), 19.86 ($CH_3$), 19.1 ($C(CH_3)_3$); HRMS (ESI-TOF) calcd for $C_{57}H_{61}N_3O_{15}SSiNa$ [M+Na]$^+$: 1110.3490; found: 1110.3462.

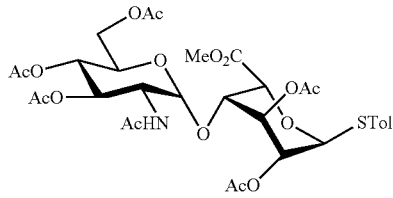

Methyl (2-acetamido-3,4,6-tri-O-acetyl-2-deoxy-α-D-glucopyranosyl)-(1→4)-(2,3-di-O-acetyl-1-p-tolylthio-α-L-idopyranoside)uronate (S7)

To a solution of compound 1 (2.6 g, 3.8 mmol) in anhydrous DCM (100 mL) were added trimethyl(p-tolylthio)silane (TMSSTol, 2.8 g, 15 mmol) and $ZnI_2$ (4.8 g, 15 mmol). After stirring at RT overnight, the mixture was filtered and diluted with DCM (100 mL). The organic layer was washed with saturated aq. $NaHCO_3$, dried over $Na_2SO_4$, and concentrated. Purification by silica gel column chromatography (elution with 3:1→3:2 hexanes/EtOAc) gave compound S7 (2.5 g, 88%) as an off-white solid. $R_f$ 0.18 (1:2 hexanes/EtOAc); $^1H$ NMR (500 MHz, $CDCl_3$): δ 7.40-7.38 (m, 2H, Ar), 7.16-7.14 (m, 2H, Ar), 5.82 (d, J=9.4 Hz, 1H, NH), 5.62 (d, J=4.6 Hz, 1H, H-1), 5.31 (t, J=5.3 Hz, 1H, H-3), 5.16 (t, J=9.5 Hz, 1H, H-4'), 5.09 (t, J=9.5 Hz, 1H, H-3'), 5.07 (d, J=3.9 Hz, 1H, H-5), 5.02 (d, J=3.5 Hz, 1H, H-1'), 4.98 (t, J=5.0 Hz, 1H, H-2), 4.34 (ddd, J=10.3, 9.3, 3.5 Hz, 1H, H-2'), 4.22 (dd, J=12.6, 3.8 Hz, 1H, H-6'), 4.18 (dd, J=12.6, 2.3 Hz, 1H, H-6'), 4.12-4.09 (m, 2H, H-4, H-5'), 3.90 (s, 3H, $OCH_3$), 2.37 (s, 3H, $CH_3Ph$), 2.18 (s, 3H, C=$OCH_3$), 2.15 (s, 3H, C=$OCH_3$), 2.12 (s, 3H, C=$OCH_3$), 2.05 (s, 3H, C=$OCH_3$), 2.04 (s, 3H, C=$OCH_3$), 2.00 (s, 3H, C=$OCH_3$); $^{13}C$ NMR (125 MHz, $CDCl_3$): δ 171.3 (C=O), 170.7 (C=O), 170.2 (C=O), 169.5 (C=O), 169.4 (C=O), 169.1 (C=O), 168.8 (C=O), 138.8 (Ar), 132.9 (Ar), 129.9 (Ar), 129.8 (Ar), 98.7 (C-1'), 85.1 (C-1), 73.3 (C-4), 70.7 (C-3'), 70.1 (C-5), 69.0 (C-2), 68.8 (C-3, C-5'), 67.5 (C-4'), 61.5 (C-6'), 52.6 ($OCH_3$), 51.8 (C-2'), 21.2, 20.82, 20.80, 20.73, 20.69, 20.6; HRMS (ESI-TOF) calcd for $C_{32}H_{41}NO_{16}NaSNa$ [M+Na]$^+$: 750.2044; found: 750.2026.

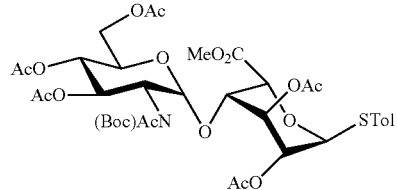

Methyl (2-acetamido-3,4,6-tri-O-acetyl-2-deoxy-2-N-(1,1-dimethylethoxy) carbonyl-α-D-glucopyranosyl)-(1→4)-(2,3-di-O-acetyl-1-p-tolylthio-α-L-idopyranoside) uronate (S8)

To a solution of S7 (2.5 g, 3.5 mmol) in 25 mL of anhydrous THF were added di-tert-butyl dicarbonate (11 g, 52 mmol) and DMAP (0.21 g, 0.50 mmol) at RT. The reaction was refluxed for 3 h under argon and then cooled to RT. The mixture was concentrated under reduced pressure and purified by silica gel column chromatography (elution with 3:1→1:1 hexanes/EtOAc) to give S8 (2.3 g, 80%) as a colorless foam. $R_f$ 0.75 (1:2 hexanes/EtOAc); $^1H$ NMR (500 MHz, $CDCl_3$): δ 7.40-7.38 (m, 2H, Ar), 7.15-7.13 (m, 2H, Ar), 6.13 (dd, J=11.0, 9.0 Hz, 1H, H-3'), 5.61 (d, J=4.3 Hz, 1H, H-1), 5.21 (t, J=5.0 Hz, 1H, H-3), 5.02-4.93 (m, 4H, H-1', H-5, H-4', H-2), 4.63 (d, J=11.3, 1H, H-2'), 4.31-4.28 (m, 2H, H-5', H-6'), 4.22-4.19 (m, 1H, H-6'), 4.08 (t, J=4.7 Hz, 1H, H-4), 3.88 (s, 3H, $OCH_3$), 2.41 (s, 3H, C=$OCH_3$), 2.25 (s, 3H, $CH_3Ph$), 2.21 (s, 3H, C=$OCH_3$), 2.11 (s, 3H, C=$OCH_3$), 2.10 (s, 3H, C=$OCH_3$), 2.01 (s, 3H, C=$OCH_3$), 1.96 (s, 3H, C=$OCH_3$), 1.53 (s, 9H, $C(CH_3)_3$); $^{13}C$ NMR (125 MHz, $CDCl_3$): δ 173.5 (C=O), 170.7 (C=O), 170.2 (C=O), 170.0 (C=O), 169.4 (C=O), 169.0 (C=O), 168.9 (C=O), 138.3, 132.9, 129.8, 129.3, 99.4 (C-1'), 85.4 (C-1), 84.4 (($CH_3)_3CO$), 73.9 (C-4), 70.0 (C-5), 69.8 (C-5), 69.5 (C-3), 69.3 (C-3'), 68.9 (C-2), 68.6 (C-5'), 61.6 (C-6'), 56.9 (C-2'), 52.6 ($OCH_3$), 27.8 (($CH_3)_3C$), 21.1, 21.0, 20.81, 20.80, 20.76, 20.7; HRMS (ESI-TOF) calcd for C$_{37}$H$_{49}$NO$_{18}$NaSNa [M+Na]$^+$: 850.2568; found: 850.2565.

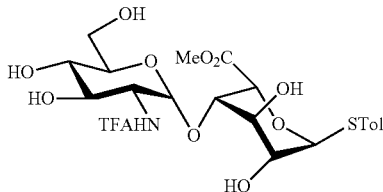

Methyl (2-amino-2-deoxy-α-D-glucopyranosyl)-(1→-4)-(1-p-tolylthio-α-L-idopyranoside)uronate (S9)

To a solution of S8 (2.0 g, 2.4 mmol) in 30 mL of anhydrous MeOH was added 20 mL of 0.05 M NaOMe in MeOH at RT. After stirring for 2 h, the reaction was quenched with IR-120 resin. The solution was filtered and concentrated under reduced pressure to give the deacetylated disaccharide. To a solution of the disaccharide in anhydrous DCM (50 mL) was added 5 mL of TFA at 0° C. The reaction was stirred at RT under argon for 2 h and then concentrated under reduced pressure. This crude intermediate was dissolved in MeOH, CF$_3$CO$_2$Me (3 mL) and Et$_3$N (3 mL) were added, and the reaction was stirred at RT for 6 h. After the reaction was complete, the mixture was concentrated, and the resulting residue was purified by silica gel column chromatography (elution with 10:1→5:1 DCM/MeOH) to give compound S9 (1.2 g, 91% yield) as a colorless foam. R$_f$ 0.4 (6:1 DCM/MeOH); $^1$H NMR (500 MHz, CD$_3$OD): δ 7.42-7.39 (m, 2H, Ar), 7.17-7.15 (m, 2H, Ar), 5.39 (d, J=2.5 Hz, 1H, H-1), 5.27 (d, J=2.6 Hz, 1H, H-5), 5.13 (d, J=3.5 Hz, 1H, H-1'), 4.07 (t, J=3.0 Hz, 1H, H-4), 4.03 (t, J=3.8 Hz, 1H, H-3), 4.02 (dd, J=10.6, 3.5 Hz, 1H, H-2'), 3.83 (s, 3H, OCH$_3$), 3.83-3.76 (m, 3H, H-6', H-2), 3.67 (dd, J=10.6, 8.4 Hz, 1H, H-3'), 3.52-3.44 (m, 2H, H-5', H-4'), 2.35 (s, 3H, CH$_3$Ph); $^{13}$C NMR (100 MHz, CD$_3$OD): δ 170.3 (CO$_2$Me), 158.1 (q, $^2$J$_{C,F}$=37.1 Hz, CF$_3$C=O), 135.5 (Ar), 131.3 (Ar), 129.3 (Ar), 128.4 (Ar), 116.3 (q, $^1$J$_{C,F}$=286.4 Hz, CF$_3$), 95.7 (C-1'), 89.2 (C-1), 73.7 (C-4), 73.1 (C-5'), 71.2 (C-3'), 70.9 (C-2), 70.1 (C-4'), 68.2 (C-5), 66.2 (C-3), 60.8 (C-6'), 54.3 (C-2'), 51.6 (OCH$_3$), 19.7 (CH$_3$Ph); HRMS (ESI-TOF) calcd for C$_{22}$H$_{28}$NO$_{11}$F$_3$SNa [M+Na]$^+$: 594.1233; found: 594.1227.

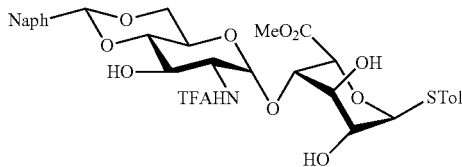

Methyl (2-deoxy-4,6-O-2-naphthylidene-2-trifluoro-acetamido-α-D-glucopyranosyl)-(1→4)-(1-tolylthio-α-L-idopyranoside)uronate (S10)

To a solution of disaccharide S9 (1.1 g, 1.9 mmol) in CH$_3$CN (25 mL) were added NapCH(OMe)$_2$ (0.78 g, 3.9 mmol) and p-toluenesulfonic acid (70 mg, 0.37 mmol) under argon. The reaction was heated at 50° C. for 3 h, then quenched with Et$_3$N (69 μL, 0.49 mmol), and concentrated. Purification by silica gel column chromatography (elution with 2:1→1:2 hexanes/EtOAc) gave compound S10 (1.2 g, 87%) as a colorless foam. R$_f$ 0.37 (1:1 hexanes/EtOAc); $^1$H NMR (500 MHz, CD$_3$COCD$_3$): δ 8.49 (d, J=8.8 Hz, 1H, NH), 8.04 (s, 1H, Ar), 7.98-7.94 (m, 3H, Ar), 7.67-7.65 (m, 1H, Ar), 7.58-7.55 (m, 2H, Ar), 7.45-7.42 (m, 2H, Ar), 7.20-7.18 (m, 2H, Ar), 5.84 (s, 1H, CH(O)$_2$), 5.55 (d, J=2.3 Hz, 1H, H-1), 5.31-5.29 (m, 2H, H-1', H-5), 4.97-4.93 (m, 2H, OH), 4.82 (d, J=4.9 Hz, 1H, OH), 4.31 (dd, J=9.9, 4.6 Hz, 1H, H-6'), 4.25-4.21 (m, 2H, H-2', H-3), 4.18 (t, J=3.0 Hz, 1H, H-4), 4.04-3.95 (m, 2H, H-3', H-2), 3.91 (t, J=9.9 Hz, 1H, H-6'), 3.89 (s, 3H, OCH$_3$), 3.81 (td, J=9.6, 4.6 Hz, 1H, H-5'), 3.73 (t, J=9.4 Hz, 1H, H-4'), 2.34 (s, 3H, CH$_3$Ph); $^{13}$C NMR (125 MHz, CD$_3$COCD$_3$): δ 169.5 (CO$_2$Me), 157.2 (q, $^2$J$_{C,F}$=36.2 Hz, CF$_3$C=O), 136.9 (Ar), 135.6 (Ar), 133.6 (Ar), 133.0 (Ar), 132.9 (Ar), 131.0 (Ar), 129.6 (Ar), 128.2 (Ar), 127.7 (Ar), 127.6 (Ar), 126.4 (Ar), 126.2 (Ar), 125.7 (Ar), 124.2 (Ar), 116.3 (q, $^1$J$_{C,F}$=286.3 Hz, CF$_3$), 101.7 (CH(O)$_2$), 96.8 (C-1'), 88.8 (C-1), 81.8 (C-4'), 74.8 (C-4), 71.2 (C-2), 68.7 (C-3'), 68.4 (C-5), 68.3 (C-6'), 66.7 (C-3), 63.7 (C-5'), 54.8 (C-2'), 51.6 (OCH$_3$), 21.2 (CH$_3$Ph); HRMS (ESI-TOF) calcd for C$_{33}$H$_{34}$NO$_{11}$F$_3$SNa [M+Na]$^+$: 732.1702; found: 732.1686.

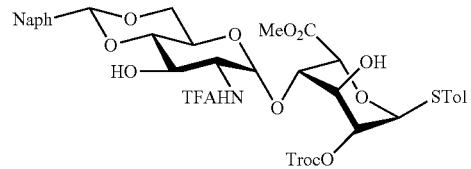

Methyl (2-deoxy-4,6-O-2-naphthylidene-2-trifluoro-acetamido-α-D-glucopyranosyl)-(1→4)-(1-p-tolyl-thio-2-O-((2,2,2-trichloroethoxy)carbonyl)-α-L-idopyranoside)uronate (S11)

To a solution of S10 (0.21 g, 0.29 mmol) in anhydrous toluene (18 mL) were added n-Bu$_2$SnO (0.15 g, 0.58 mmol), TrocCl (0.19 g, 0.88 mmol) and TBAI (0.11 g, 0.29 mmol). The reaction was stirred at 65° C. for 1 h. The mixture was then diluted with EtOAc (300 mL), and the organic layer was washed with saturated aq. NaHCO$_3$ (300 mL) and brine (300 mL), and dried over Na$_2$SO$_4$. The solution was concentrated, and the crude residue was purified by silica gel column chromatography (elution with 3:1→2:1 hexanes/EtOAc) to give compound S11 (0.16 g, 64%) as a colorless foam. $^1$H NMR (500 MHz, CD$_3$COCD$_3$): δ 8.14 (d, J=8.8 Hz, 1H, NH), 8.05 (s, 1H, Ar), 7.98-7.94 (m, 3H, Ar), 7.68-7.66 (m, 1H, Ar), 7.58-7.55 (m, 2H, Ar), 7.45-7.43 (m, 2H, Ar), 7.22-7.20 (m, 2H, Ar), 5.85 (s, 1H, CH(O)$_2$), 5.58 (d, J=7.4 Hz, 1H, H-1), 5.33 (d, J=3.7 Hz, 1H, H-1'), 5.27 (d, J=5.4 Hz, 1H, OH), 5.06 (d, J=12.1 Hz, 1H, CCl$_3$CH$_2$O), 5.04 (d, J=5.0 Hz, 1H, H-5), 4.93 (d, J=12.1 Hz, 1H, CCl$_3$CH$_2$O), 4.87 (d, J=4.4 Hz, 1H, OH), 4.80 (t, J=7.4 Hz, 1H, H-2), 4.43-4.39 (m, 1H, H-3), 4.36 (dd, J=9.9, 4.8 Hz, 1H, H-6'), 4.23-4.19 (m, 1H, H-2'), 4.15 (dd, J=7.5, 5.1 Hz, 1H, H-4), 4.09-4.04 (m, 1H, H-3'), 4.02-3.97 (m, 1H, H-5'), 3.89 (t, J=9.9 Hz, 1H, H-6'), 3.86 (s, 3H, OCH$_3$), 3.74 (t, J=9.3 Hz, 1H, H-4'), 2.36 (s, 3H, CH$_3$Ph); $^{13}$C NMR (125 MHz, CD$_3$COCD$_3$): δ 169.1 (C=OOCH$_3$), 156.9 (q, $^2$J$_{C,F}$=37.5 Hz, CF$_3$C=O), 153.2 (OC=OOCH$_2$), 137.9 (Ar), 135.5 (Ar), 133.7 (Ar), 132.9 (Ar), 132.2 (Ar), 129.7 (Ar), 128.2 (Ar), 127.7 (Ar), 127.6 (Ar), 126.4 (Ar), 126.2

(Ar), 125.7 (Ar), 124.2 (Ar), 116.1 (q, $^1J_{C,F}$=285 Hz, CF$_3$), 101.6 (CH(O)$_2$), 99.8 (C-1'), 94.6 (CCl$_3$), 83.8 (C-1), 82.0 (C-4'), 77.9 (C-4), 76.8 (C-2), 76.7 (CCl$_3$CH$_2$O), 72.3 (C-5), 69.3 (C-3), 68.3 (C-6'), 68.0 (C-3'), 63.9 (C-5'), 55.1 (C-2'), 51.7 (OCH$_3$), 20.2 (CH$_3$Ph); HRMS (ESI-TOF) calcd for C$_{36}$H$_{35}$NO$_{13}$C$_{13}$F$_3$SNa [M+Na]$^+$: 906.0744; found: 906.0750. Note: Dibutyltin oxide (n-Bu$_2$SnO) is highly toxic. Obtain special instructions before use or do not handle until all safety precautions have been read and understood.

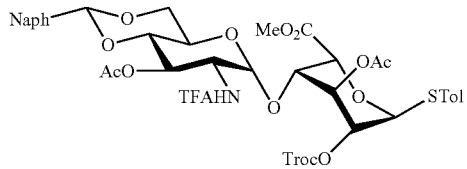

Methyl (3-O-acetyl-2-deoxy-4,6-O-2-naphthylidene-2-trifluoroacetamido-α-D-glucopyranosyl)-(1→-4)-(3-O-acetyl-1-p-tolylthio-2-O-((2,2,2-trichloroethoxy)carbonyl)-α-L-idopyranoside)uronate (S12)

To a solution of S11 (0.25 g, 0.28 mmol) in pyridine (3.0 mL) was added acetic anhydride (0.80 mL) dropwise at 0° C. After stirring at RT for 2 h, the mixture was concentrated, and the residue was dissolved in DCM (20 mL). The organic layer was washed with brine, dried over Na$_2$SO$_4$, and concentrated. Purification by silica gel column chromatography (elution with 4:1→3:1 hexanes/EtOAc) gave compound S12 (0.25 g, 91%) as a colorless foam. R$_f$ 0.53 (2:1 hexanes/EtOAc); $^1$H NMR (500 MHz, CD$_3$COCD$_3$): δ 8.00 (s, 1H, Ar), 7.96-7.90 (m, 4H, Ar, NH), 7.63-7.61 (m, 1H, Ar), 7.58-7.54 (m, 2H, Ar), 7.48-7.45 (m, 2H, Ar), 7.24-7.21 (m, 2H, Ar), 5.86 (s, 1H, CH(O)$_2$), 5.78 (d, J=5.8 Hz, 1H, H-1), 5.60 (t, J=6.2 Hz, 1H, H-3), 5.43 (dd, J=10.5, 9.5 Hz, 1H, H-3'), 5.33 (d, J=3.7 Hz, 1H, H-1'), 5.18 (d, J=4.4 Hz, 1H, H-5), 5.08 (d, J=12.1 Hz, 1H, CCl$_3$CH$_2$O), 4.99 (d, J=12.1 Hz, 1H, CCl$_3$CH$_2$O), 4.92 (t, J=6.0 Hz, 1H, H-2), 4.46-4.41 (m, 3H, H-4, H-2', H-6'), 4.15 (td, J=9.9, 4.8 Hz, 1H, H-5'), 4.01 (t, J=9.6 Hz, 1H, H-4'), 3.93 (t, J=10.2 Hz, 1H, H-6'), 3.90 (s, 3H, OCH$_3$), 2.36 (s, 3H, CH$_3$Ph), 2.12 (s, 3H, CH$_3$C=O), 2.00 (s, 3H, CH$_3$C=O); $^{13}$C NMR (125 MHz, CD$_3$COCD$_3$): δ 169.7 (3'-OC=OCH$_3$), 168.8 (3-OC=OCH$_3$), 168.7 (C=OOCH$_3$), 157.0 (q, $^2J_{C,F}$=37.5 Hz, CF$_3$C=O), 153.0 (OC=OOCH$_2$), 138.3 (Ar), 135.2 (Ar), 133.7 (Ar), 132.9 (Ar), 132.5 (Ar), 129.8 (Ar), 129.3 (Ar), 128.2 (Ar), 127.8 (Ar), 127.6 (Ar), 126.4 (Ar), 126.2 (Ar), 125.6 (Ar), 124.0 (Ar), 115.8 (q, $^1J_{C,F}$=287 Hz, CF$_3$), 101.4 (CH(O)$_2$), 98.6 (C-1'), 94.6 (CCl$_3$), 84.1 (C-1), 78.8 (C-4'), 76.8 (CCl$_3$CH$_2$O), 73.9 (C-2), 73.3 (C-4), 71.0 (C-5), 69.1 (C-3), 69.0 (C-3'), 68.0 (C-6'), 64.1 (C-5'), 52.8 (C-2'), 51.9 (OCH$_3$), 20.2 (CH$_3$Ph), 19.9 (CH$_3$C=O), 19.7 (CH$_3$C=O); HRMS (ESI-TOF) calcd for C$_{40}$H$_{39}$NO$_{15}$F$_3$SCl$_3$Na [M+Na]$^+$: 990.0956; found: 990.0967.

S13

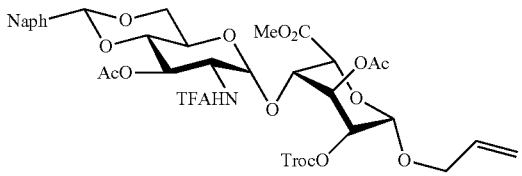

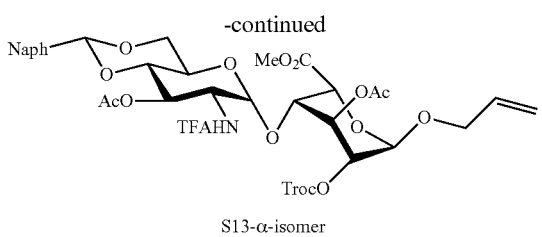

S13-α-isomer

Methyl (3-O-acetyl-2-deoxy-4,6-O-2-naphthylidene-2-trifluoroacetamido-α-D-glucopyranosyl)-(1→4)-(3-O-acetyl-1-O-allyl-2-O-((2,2,2-trichloroethoxy)carbonyl)-α-L-idopyranoside)uronate (S13)

A mixture of donor S12 (50 mg, 51 µmol), AgOTf (40 mg, 0.15 mmol), and 4 Å molecular sieves (0.10 g) in Et$_2$O (4.0 mL) was stirred at −78° C. After 30 min, p-toluenesulfonyl chloride (p-TolSCl) (10 µL, 72 µmol) was added via a micro-syringe. After five minutes when TLC indicated that the donor was completely activated, a solution of allyl alcohol (4.5 mg, 77 µmol) and 2,4,6-tri-tert-butylpyrimidine (TTBP) (26 mg, 0.10 mmol) in Et$_2$O (1.0 mL) was added. The reaction was stirred for an additional 1 h, then quenched with Et$_3$N (0.050 mL), and concentrated. Purification by silica gel column chromatography (elution first with 5:1→4:1 hexanes/EtOAc) gave the c-isomer of S13 (9.0 mg, 20% yield) as an off-white foam. R$_f$ 0.41 (2:1 hexanes/EtOAc); $^1$H NMR (500 MHz, CD$_3$COCD$_3$): δ 8.03-7.93 (m, 5H, Ar, NH), 7.67-7.64 (m, 1H, Ar), 7.61-7.57 (m, 2H, Ar), 5.97 (dddd, J=17.2, 10.5, 5.7, 4.9 Hz, 1H, CH$_2$=CH), 5.90 (s, 1H, CH(O)$_2$), 5.58 (t, J=6.4 Hz, 1H, H-3), 5.45 (dd, J=10.6, 9.6 Hz, 1H, H-3'), 5.38 (d, J=4.8 Hz, 1H, H-1), 5.37 (dt, J=17.2, 1.7 Hz, 1H, CH$_2$=CH), 5.34 (d, J=3.7 Hz, 1H, H-1'), 5.23 (dt, J=10.5, 1.5 Hz, 1H, CH$_2$=CH), 5.02 (d, J=12.1 Hz, 1H, CCl$_3$CH$_2$O), 5.00 (d, J=12.1 Hz, 1H, CCl$_3$CH$_2$O), 4.98 (d, J=4.5 Hz, 1H, H-5), 4.86 (dd, J=6.5, 4.8 Hz, 1H, H-2), 4.49-4.44 (m, 3H, H-4, H-2', H-6'), 4.36 (ddt, J=13.3, 4.9, 1.7 Hz, 1H, CH$_2$CH$_2$=CH), 4.18 (ddt, J=13.3, 5.7, 1.5 Hz, 1H, CH$_2$CH$_2$=CH), 4.18-4.15 (m, 1H, H-5'), 4.05 (t, J=9.5 Hz, 1H, H-4'), 3.97 (t, J=10.0 Hz, 1H, H-6'), 3.93 (s, 3H, OCH$_3$), 2.10 (CH$_3$C=O), 2.03 (CH$_3$C=O); $^{13}$C NMR (125 MHz, CD$_3$COCD$_3$): δ 169.8 (C=O), 169.1 (C=O), 168.9 (C=O), 153.1 (OC=OOCH$_2$), 135.2 (Ar), 133.9 (Ar), 133.7 (CH$_2$=CH), 132.9 (Ar), 128.3 (Ar), 127.8 (Ar), 127.6 (Ar), 126.5 (Ar), 126.2 (Ar), 125.7 (Ar), 124.1 (Ar), 116.4 (CH$_2$=CH), 101.5 (CH(O)$_2$), 98.3 (C-1'), 96.8 (C-1), 94.6 (CCl$_3$), 78.8 (C-4'), 76.7 (CCl$_3$CH$_2$O), 74.2 (C-2), 73.2 (C-4), 70.0 (C-5), 69.11 (C-3), 69.07 (CH$_2$CH$_2$=CH, C-3'), 68.0 (C-6'), 64.0 (C-5'), 52.8 (C-2'), 51.9 (OCH$_3$), 19.9 (CH$_3$C=O), 19.7 (CH$_3$C=O); HRMS (FAB) calcd for C$_{36}$H$_{38}$NO$_{16}$F$_3$C$_{13}$ [M+H]$^+$: 902.1208; found: 902.1198. Further elution with 4:1→3:1 hexanes/EtOAc gave the β-isomer of S13 (32 mg, 71%) as a white foam. R$_f$ 0.25 (2:1 hexanes/EtOAc); $^1$H NMR (500 MHz, CD$_3$COCD$_3$): δ 8.03-7.94 (m, 5H, Ar, NH), 7.65-7.63 (m, 1H, Ar), 7.60-7.57 (m, 2H, Ar), 5.94 (dddd, J=17.1, 10.6, 6.0, 4.9 Hz, 1H, CH$_2$=CH), 5.89 (s, 1H, CH(O)$_2$), 5.76 (t, J=6.0 Hz, 1H, H-3), 5.42 (dd, J=10.5, 9.5 Hz, 1H, H-3'), 5.41 (d, J=4.0 Hz, 1H, H-1'), 5.38 (dt, J=17.1, 1.6 Hz, 1H, CH$_2$=CH), 5.23 (d, J=2.8 Hz, 1H, H-1), 5.23 (dt, J=10.4, 1.4 Hz, 1H, CH$_2$=CH), 5.07 (d, J=12.1 Hz, 1H, CCl$_3$CH$_2$O), 4.92 (dd, J=6.0, 2.8 Hz, 1H, H-2), 4.90 (d, J=12.1 Hz, 1H, CCl$_3$CH$_2$O), 4.84 (d, J=3.6 Hz, 1H, H-5), 4.47 (dd, J=10.5, 4.0 Hz, 1H, H-2'), 4.43 (ddt, J=13.3, 4.9, 1.5 Hz, 1H, CH$_2$CH$_2$=CH), 4.36 (dd, J=9.3, 3.8 Hz, 1H, H-6'), 4.34 (dd, J=5.5, 3.6 Hz, 1H, H-4), 4.21 (ddt, J=13.3, 6.0, 1.4 Hz, 1H, CH$_2$CH$_2$=CH), 4.05 (t, J=9.4 Hz, 1H, H-4'), 3.99 (td, J=9.5, 4.2 Hz, 1H, H-5'), 3.95 (t, J=9.3 Hz, 1H, H-6'), 3.89 (s, 3H, OCH$_3$), 2.16 (CH$_3$C=O), 2.03 (CH$_3$C=O); $^{13}$C NMR (125 MHz, CD$_3$COCD$_3$): δ 170.0 (3'-OC=OCH$_3$), 169.1 (3-OC=OCH$_3$), 168.4 (C=OOCH$_3$), 153.3 (OC=OOCH$_2$), 135.1 (Ar), 133.7 (CH$_2$=CH), 133.6 (Ar), 132.9 (Ar), 128.3 (Ar), 127.8 (Ar), 127.6 (Ar), 126.5 (Ar), 126.2 (Ar), 125.7 (Ar), 124.1 (Ar), 117.1 (CH$_2$=CH), 101.5 (CH(O)$_2$), 98.0 (C-1'), 96.0 (C-1), 94.6 (CCl$_3$), 78.5 (C-4'), 76.7 (CCl$_3$CH$_2$O), 74.3 (C-4), 73.3 (C-2), 71.9 (C-5), 69.5 (CH$_2$CH$_2$=CH, C-3'), 68.1 (C-3), 68.0 (C-6'), 64.0 (C-5'), 52.9 (C-2'), 51.8 (OCH$_3$), 19.9 (CH$_3$C=O), 19.7 (CH$_3$C=O); HRMS calcd for C$_{36}$H$_{38}$NO$_{16}$F$_3$C$_{13}$ [M+H]$^+$: 902.1208; found: 902.1213.

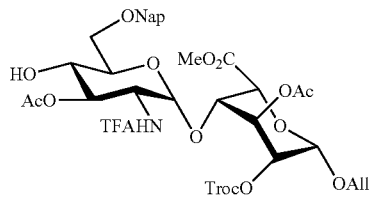

Methyl (3-O-acetyl-2-deoxy-6-O-2-naphthylmethyl-2-trifluoroacetamido-α-D-glucopyranosyl)-(1→4)-(3-O-acetyl-1-O-allyl-2-O-(2,2,2-trichloroethoxy)carbonyl-β-L-idopyranoside)uronate (20)

To a suspension of compound S13 (70 mg, 0.08 mmol) in DCM (5.0 mL) were added triethylsilane (45 mg, 0.38 mmol) and BF$_3$.Et$_2$O (15 mg, 0.11 mmol) at 0° C. After stirring for 1 h at 0° C., the reaction was diluted with DCM (20 mL) and washed with saturated aq. NaHCO$_3$, and brine. The organic layer was dried over Na$_2$SO$_4$, concentrated, and the residue was purified by silica gel column chromatography (elution with 3:1→3:2 hexanes/EtOAc) to give compound 20 (56 mg, 80%) as a colorless foam. R$_f$ 0.3 (1:1 hexanes/EtOAc); $^1$H NMR (500 MHz, CD$_3$COCD$_3$, mixture of rotamers): δ 7.94-7.86 (m, 4H, Ar), 7.55-7.45 (m, 3H, Ar), 7.43 (d, J=9.0 Hz, 1H, NH), 5.90-5.80 (m, 2H, H-3, Allyl-CH), 5.33-5.27 (m, 1H, Allyl-CH), 5.25 (d, J=3.7 Hz, 1H, H-1'), 5.19-5.15 (m, 2H, H-1, Allyl-CH), 5.10 (dd, J=10.8, 8.6 Hz, 1H, H-3'), 4.96 (d, J=12.1 Hz, 1H, CCl$_3$CHA), 4.91-4.84 (m, 3H, H-2, CCl$_3$CHB, OH), 4.83 (d, J=4.6 Hz, 1H, H-5), 4.76 (ABq, J=12.4 Hz, 2H, CH$_2$Nap), 4.32-4.27 (m, 1H, Allyl-CH), 4.24-4.18 (m, 2H, H-2', H-4), 4.12-4.06 (m, 1H, Allyl-CH), 3.85 (dd, J=10.0, 1.2 Hz, 1H, H-6a'), 3.82-3.75 (m, 3H, H-4', H-5', H-6b'), 3.75 (s, 3H, OCH$_3$), 2.04 (s, 3H, CH$_3$), 1.97 (s, 3H, CH$_3$); $^{13}$C NMR (125 MHz, CDCl$_3$, mixture of rotamers): δ 171.5 (C=OCH$_3$), 170.1 (C=OCH$_3$), 169.4 (C=OOCH$_3$), 157.7 (q, $^2J_{C,F}$=37.5 Hz, CF$_3$C=O, rotamer-1), 157.6 (q, $^2J_{C,F}$=36.2 Hz, CF$_3$C=O, rotamer-2), 154.2 (CCl$_3$CH$_2$O C.=O), 137.2 (Ar), 134.4 (Ar), 134.3 (—CH$_2$CH=CH$_2$), 133.9 (Ar), 128.7 (2C—Ar), 128.5 (Ar), 126.9 (Ar), 126.7 (Ar), 126.6 (Ar), 126.5 (Ar), 118.1 (—CH$_2$CH=CH$_2$), 116.7 (q, $^1J_{C,F}$=285.0 Hz, CF$_3$), 98.6 (C-1'), 96.1 (C-1), 95.5 (CCl$_3$), 77.5 CCl$_3$CHOC=O), 75.3 (C-2), 75.2 (C-4), 74.2 (C-3'), 73.9 (NapCH$_2$), 73.75 (C-5', rotamer-1), 73.72 (C-5', rotamer-2), 72.1 (C-5), 70.4 (CH$_2$—CH=CH2), 70.0 (C-6'), 69.0 (C-4', rotamer-1), 68.9 (C-4', rotamer-2), 68.6 (C-3), 53.5 (C-2', rotamer-1), 53.4 (C-2', rotamer-2), 52.52 (OCH$_3$, rotamer-1), 52.51 (OCH$_3$, rotamer-2), 20.8 (CH$_3$), 20.7 (H$_3$); HRMS (ESI-TOF) calcd for C$_{36}$H$_{39}$C$_{13}$F$_3$NO$_{16}$Na [M+Na]$^+$: 926.1184; found: 926.1188.

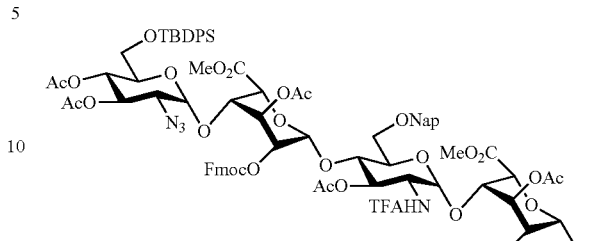

Methyl (2,3-O-acetyl-2-azido-2-deoxy-6-O-tert-butyldiphenylsilyl-α-D-glucopyranosyl)-(1→4)-(methyl 3-O-acetyl-2-O-((9H-fluoren-9-yl)methoxycarbonyl)-3-L-idopyranoosyluronate)-(1→4)-(3-O-acetyl-2-deoxy-6-O-2-naphthylmethyl-2-trifluoroacetamido-α-D-glucopyranosyl)-(1→4)-(3-O-acetyl-1-O-allyl-2-O-(2,2,2-trichloroethoxy)carbonyl-β-L-idopyranoside)uronate (S14)

A mixture of donor 19 (20 mg, 18 μmol), AgOTf (14 mg, 55 μmol), and 4 Å molecular sieves (0.10 g) in Et$_2$O (2.0 mL) was stirred at −78° C. After 30 min, p-toluenesulfonyl chloride (p-TolSCl) (5.0 mg, 27 μmol, 3.5 μL) was added via a micro-syringe. After 5 min when TLC indicated that the donor was completely activated, a solution of the acceptor 20 (16 mg, 18 μmol) in Et$_2$O and 2,4,6-tri-tert-butylpyrimidine (TTBP) (9.1 mg, 36 μmol) was added. The reaction was stirred for an additional 15 min, then warmed up to −20° C., and stirred for 6 h. The reaction was then diluted with DCM and quenched by the addition of Et$_3$N (0.050 mL) and filtered. The residue was purified by silica gel column chromatography (elution with 3:1→3:2 hexanes/EtOAc) to give compound S14 (13 mg, 40%) as a colorless foam. R$_f$ 0.4 (3:2 hexanes/EtOAc); $^1$H NMR (400 MHz, CDCl$_3$): δ 7.86-7.57 (m, 12H, Ar), 7.47-7.30 (m, 12H, Ar), 7.26-7.20 (m, 1H, Ar), 7.08 (d, J=9.2 Hz, 1H, NH), 5.84-5.72 (m, 1H, CH=CH$_2$), 5.58 (dd, J=8.4, 7.1 Hz, 1H, H-3), 5.53 (t, J=3.6 Hz, 1H, H-3''), 5.38 (dd, J=10.6, 9.3 Hz, 1H, H-3', H-3'''), 5.35-5.13 (m, 6H, H-1', H-1''', H-4', H-4''', CH$_2$=CH), 5.07 (d, J=3.3 Hz, 1H, H-1), 4.99 (d, J=1.6 Hz, 1H, H-1''), 4.80 (dd, J=7.1, 3.3 Hz, 1H, H-2), 4.78 (d, J=11.9 Hz, 1H, CH$_{2A}$CCl$_3$), 4.76-4.71 (m, 3H, CH$_{2B}$CCl$_3$, OCH$_2$Nap), 4.68 (dd, J=3.6, 1.6 Hz, 1H, H-2''), 4.51 (d, J=3.9 Hz, 1H, H-5), 4.83 (dd, J=10.4, 7.5 Hz, 1H, CH$_{2a}$-Fluoren), 4.44-4.38 (m, 2H, H-5'', CH$_2$b-Fluoren), 4.34-4.23 (m, 3H, H-2', CH$_{2a}$CH=CH$_2$, OCO$_2$CH$_2$—CH), 4.08-4.00 (m, 3H, H-4, H-6a', CH$_{2b}$CH=CH$_2$), 3.98 (dd, J=3.6, 2.8 Hz, 1H, H-4'''), 3.87 (dd, J=10.8, 1.1 Hz, 1H, H-6b'), 3.85-3.68 (m, 4H, H-5', H-5''', H-6''), 3.67 (s, 3H, OCH$_3$), 3.62 (s, 3H, OCH$_3$), 3.31 (dd, J=10.6, 3.5 Hz, 1H, H-2'''), 2.03 (s, 3H, CH$_3$), 2.02 (s, 3H, CH$_3$), 2.01 (s, 3H, CH$_3$), 2.00 (s, 3H, CH$_3$), 1.82 (s, 3H, CH$_3$), 1.02 (s, 9H, OC(CH$_3$)$_3$); $^{13}$C NMR (100 MHz, CDCl$_3$): δ 170.5 (C=O), 170.1 (C=O), 169.6 (C=O), 169.3 (C=O), 168.4 (C=O), 168.3 (C=O), 168.2 (C=O), 154.8 (C=O), 153.6 (C=O), 143.6 (Ar), 141.39 (Ar), 141.37 (Ar), 136.1 (Ar), 135.9 (Ar), 135.7 (Ar), 133.5 (Ar), 133.1 (Ar), 133.02 (Ar), 133.00 (Ar), 132.9 (CH=CH$_2$), 130.2 (Ar), 129.88 (Ar), 129.87 (Ar), 129.8 (Ar), 128.1 (Ar), 128.05 (Ar), 127.97 (Ar), 127.9 (Ar), 127.84 (Ar), 127.82 (Ar), 127.81 (Ar), 127.78 (Ar), 127.4 (Ar), 127.34 (Ar), 127.29 (Ar), 126.11 (Ar), 126.08 (Ar), 125.8 (Ar), 125.7 (Ar), 125.5 (Ar), 125.44 (Ar), 125.43 (Ar), 120.1 (Ar), 120.0 (Ar), 118.9 ($CH_2$=CH), 98.5 (C-1"), 96.9 (C-1'/C-1'"), 96.2 (C-1'/(C-1'")), 94.9 (C-1), 94.3 ($CCl_3$), 77.4 ($CH_2CCl_3$), 74.0 (C-5"), 73.7 (C-2), 73.4 ($CH_2$Nap), 73.0 (C-4), 72.1 (C-4'/C-4'"), 71.6 (C-5), 71.39 (C-5'"), 71.00 (C-5'), 70.8 ($CH_2$—Fluoren), 70.4 (4C, C-2", C-3', C-3'", C-4"), 69.8 ($CH_2CH$=$CH_2$), 68.4 (2C, C-4'/C-4'", C-6'), 67.9 (C-3), 66.3 (C-3"), 61.9 (C-6'"), 60.8 (C-2'"), 52.8 (2C, C-2'. $OCH_3$), 52.6 ($OCH_3$), 46.8 ($OCO_2CH_2$—CH), 26.8 ($C(CH_3)_3$), 20.9 ($CH_3$), 20.8 ($CH_3$), 20.7 ($CH_3$), 20.64 ($CH_3$), 20.56 ($CH_3$), 19.3 ($C(CH_3)_3$); HIRMS (ESI-TOF) calcd for $C_{86}H_{92}Cl_{13}F_3N_4O_{31}S1Na$ [M+Na]$^+$: 1889.4430; found: 1889.4426; gHSQC 2-D NMR (without $^1$H decoupling): $^1J_{C1,H1}$=170.7 Hz, $^1J_{C1',H1'}$=$^1J_{C1'',H1'''}$=174.6 Hz, and $^1J_{C1'',H1''}$=161.1 Hz. The peaks of H-2, H-3, and H-4 showed large coupling constant values ($^1J_{H2-H3}$=7.1 Hz and $^1J_{H3-H4}$=8.4) for terminal IdoA, which indicates that the terminal IdoA residues adopt primarily the $^4C_1$ conformation. This is further supported by the large gHSQC $^1J_{C,1,H1}$ coupling constant (170.7 Hz) value. In contrast, the coupling constants of $^3J_{H2''-H3''}$, and $^3J_{H3''-H4''}$ are 3.6 Hz, which indicates that these IdoA residues are primarily in the $^1C_4$ conformation.[6] The coupling constants of $^1J_{C1'',H1''}$ (161.1 Hz) are below 170 Hz, which confirms the β configuration of the newly formed IdoA stereocenters.[7]

V. References

[1] a) M. Petitou, C. A. A. van Boeckel, *Angew. Chem. Int. Ed.* 2004, 43, 3118-3133. b) J. Liu, S. C. Thorp, *Med. Res. Rev.* 2002, 22, 1-25. c) F. Corti, Y Wang, J. M. Rhodes, D. Atri, S. Archer-Hartmann, J. Zhang, Z. W. Zhuang, D. Chen, T. Wang, Z. Wang, P. Azadi, M. Simons, *Nat. Commun.* 2019, 10 (1), 1562-1575. d) C. Zong, A. Venot, X. Li, W. Lu, W. Xiao, J-S. L. Wilkes, C. L. Salanga, T. M. Handel, L. Wang, M. A. Wolfert, G-J. Boons, *J. Am. Chem. Soc.* 2017, 139 (28), 9534-9543. e) I. Vlodavsky, M. Gross-Cohen, M. Weissmann, N. Ilan, R. D. Sanderson, *Trends. Biochem. Sci.* 2018, 43 (1), 18-31. f) D. D. Kaltenbach, D. Jaishankar, M. Hao, J. C. Beer, M. V. Volin, U. R. Desai, V. Tiwari, Front *Pharmacol.* 2018, 9, 1315-1331. g) H. Lortat-Jacob, *Curr. Opin. Struct. Biol.* 2009, 19 (5), 543-548. h) L. E. Collins, L. Troeberg, *J. Leukoc. Biol.* 2019, 105 (1), 81-92. i) P. Zhang, H. Lu, R. T. Peixoto, M. K. Pines, Y Ge, S. Oku, T. J. Siddiqui, Y Xie, W. Wu, S. Archer-Hartmann, K. Yoshida, K. F. Tanaka, A. Aricescu, P. Azadi, M. D. Gordon, B. L. Sabatini, R. O. L. Wong, A. M. Craig, Cell, 2018, 174 (6), 1450-1464.

[2] a) D. Xu, J. D. Esko, *Annu. Rev. Biochem.* 2014, 83, 129-157. b) C. I. Gama, L. C. Hsieh-Wilson, *Curr. Opin. Chem. Biol.* 2005, 9, 609-619. c) I. Capila, R. J. Linhardt, *Angew. Chem. Int. Ed.* 2002, 41, 390-412.

[3] a) X. Shi, J. Zaia, *J. Biol. Chem.* 2009, 284, 11806-11814. b) E. Feyzi, T. Saldeen, E. Larsson, U. Lindahl, M. Salmivirta, *J. Biol. Chem.* 1998, 273, 13395-13398. c) Y G. Brickman, M. D. Ford, J. T. Gallagher, V. Nurcombe, P. F. Bartlett, J. E. Turnbull, *J. Biol. Chem.* 1998, 273, 4350-4359. d) U. Lindahl, L. Kjellen, *J Intern. Med.* 2013, 273, 555-571. e) S. Nadanaka, H. Kitagawa, *J. Biochem.* 2008, 144, 7-14.

[4] a) S. Dey, C.-H. Wong, *Chem. Sci.* 2018, 9, 6685-6691. b) Y-P. Hu, S.-Y Lin, C.-Y Huang, M. M. L. Zulueta, J.-Y Liu, W. Chang, S.-C. Hung, *Nat. Chem.* 2011, 3, 557-563. c) H. A. Orgueira, A. Bartolozzi, Schell, P.; R. E. J. N. Litjens, E. R. Palmacci, P. H. Seeberger, *Chem. Eur. J.* 2003, 9, 140-169. d) B. Yang, K. Yoshida, Z. Yin, H. Dai, H. Kavunja, M. H. El-Dakdouki, S. Sungsuwan, S. B. Dulaney, X. Huang, *Angew. Chem. Int. Ed.* 2012, 51, 10185-10189. e) C. Zong, R. Huang, E. Condac, Y Chiu, W. Xiao, X. Li, W. Lu, M. Ishihara, S. Wang, A. Ramiah, M. Stickney, P. Azadi, J. Amster, K. W. Moremen, L. Wang, J. S. Sharp, G.-J. Boons, *J. Am. Chem. Soc.* 2016, 138, 13059-13067. f) J. D. C. Codee, B. Stubba, M. Schiattarella, H. S. Overkleeft, C. A. A. van Boeckel, J. H. van Boom, G. A. van der Marel, *J Am. Chem. Soc.* 2005, 127, 3767-3773. g) S. U. Hansen, G. J. Miller, C. Cole, G. Rushton, E. Avizienyte, G. C. Jayson,; J. M. Gardiner, *Nat. Commun.* 2013, 4, 2016-2024. h) R. Ojeda, J.-L. de Paz, M. Martin-Lomas, *Chem. Commun.* 2003, 19, 2486-2487. i) Y Xu, S. Masuko, M. Takieddin, H. Xu, R. Liu, J. Jing, S. A. Mousa, R. J. Linhardt,; J. Liu, *Science,* 2011, 334, 498-501. j) Y Chen, Y Li, H. Yu, G. Sugiarto, V. Thon, J. Hwang, L. Ding, L. Hie, X. Chen, *Angew. Chem. Int. Ed.* 2013, 52, 11852-11856. k) B. Wu, N. Wei, V. Thon, M. Wei, Z. Yu, Y Xu, X. Chen, J. Liu, P. G. Wang, T. Li, *Org. Biomol. Chem.* 2015, 13, 5098-5101. (1) M. Mende, C. Bednarek, M. Wawryszyn, P. Sauter, M. B. Biskup, U. Schepers, S. Bräse, *Chem. Rev.* 2016, 116, 8193-8255. m) S. U. Hansen, M. Baráth, B. A. B. Salameh, R. G. Pritchard, W. T. Stimpson, J. M. Gardiner, G. C. Jayson, *Org. Lett.* 2009, 11, 4528-4531. n) S. U. Hansen, C. E. Dalton, M. Baráth, G. Kwan, J. Raftery, G. C. Jayson, G. J. Miller, J. M. Gardiner, *J. Org. Chem.* 2015, 80, 3777-3789. O) Y-P. Hu, Y-Q. Zhong, Z.-G. Chen, C.-Y Chen, Z. Shi, M. M. L. Zulueta, C.-C. Ku, P.-Y Lee, C.-C. Wang, S.-C. Hung, *J. Am. Chem. Soc.* 2012, 134, 20722-20727.

[5] X. Liu, K. St. Ange, J. Fareed, D. hoppensteadt, W. Jeske, A. Kouta, L. Chi, C. Jin, Y Yao, R. J. Linhardt, *Clin. Appl. Thromb. Hemost.* 2017, 23, 542-553.

[6] J. E. Shively, H. E. Conrad, *Biochem.* 1976, 15, 3932-3942.

[7] E. A. Davidson, K. Meyer, *J. Am. Chem. Soc.* 1954, 76, 5686-5689.

[8] C. Lopin, J.-C. Jacquinet, *Angew. Chem. Int. Ed.* 2006, 45, 2574-2578.

[9] I. Danishefsky, H. B. Eiber, J. J. Carr, *Arch. Biochem. Biophys.* 1960, 90, 114-121.

[10] a) C.-T. Tsai, M. M. L. Zulueta, S.-C. Hung, *Curr Opin. Chem. Biol.* 2017, 40, 152-159. b) S. S. Nigudkar, A. V. Demchenko, *Chem. Sci.,* 2015, 6, 2687-2704.

[11] Z. Wang, M. Ly, F. Zhang, W. Zhong, A. Suen, A. M. Hickey, J. S. Dordick, R. J. Linhardt, *Biotechnol. Bioeng.* 2010, 107, 964-973.

[12] a) H. N. Yu, J.-I. Furukawa, T. Ikeda, C.-H. Wong, *Org. Lett.* 2004, 6, 723-726. b) S. Mohamed, E. H. Krenske, V. Ferro, *Org. Biomol. Chem.* 2016, 14, 2950-2960. c) D. Medakovic, *Carbohydr. Res.* 1994, 253, 299-300. d) P. Sinay, T. Chiba, *Carbohydr. Res.* 1986, 151, 379-389. e) X. Cao, Q. Lv, D. Li, H. Ye, X. Yan, X. Yang, H. Gan, W. Zhao, L. Jin, P. Wang, J. Shen, *Asian J. Org. Chem.* 2015, 4, 899-902.

[13] a) S. David, S. Handsian, *Tetrahedron,* 1985, 41, 643-663. b) J. Lawandi, S. Rocheleau, N. Moitessier, *Tetrahedron,* 2016, 72, 6283-6319.

[14] a) H. S. Hahm, F. Broecker, F. Kawasaki, M. Mietzsch, R. Heilbronn, M. Fukuda, P. H. Seeberger, *Chem* 2017, 2, 114-124. b) A. Prabhu, A. Venot, G.-J. Boons, *Org. Lett.* 2003, 5, 4975-4978.

[15] E.-H. Song, A. O. Osanya, C. A. Petersen, N. L. B. Pohl, *J. Am. Chem. Soc.* 2010, 132, 11428-11430.

[16] M. Panza, S. G. Pistorio, K. J. Stine, A. V. Demchenko, *Chem. Rev.* 2018, 118, 8105-8150.

[17] a) A. J. Kirby, *Acc. Chem. Res.* 1984, 17, 305-311. b) D. G. Gorenstein, *Chem. Rev.* 1987, 87, 1047-1077

[18] a) A. Canales, J. Angulo, R. Ojeda, M. Bruix, R. Fayos, R. Lozano, G. Giménez-Gallego, M. Martin-Lomas, P. M. Nieto, J. Jimenez-Barbero, *J. Am. Chem. Soc.* 2005, 127, 5778-5779. b) S. Ernst, G. Venkataraman, V. Sasisekharan, R. Langer, C. L. Cooney, R. Sasisekharan, Pyranose ring flexibility. mapping of physical data for iduronate in continuous conformational space. *J Am. Chem. Soc.* 1998, 120, 2099-2107.

[19] a) C. M. Pedersen, L. U. Nordstrom, M. Bols, "Super armed" glycosyl donors: conformational arming of thioglycosides by silylation. *J. Am. Chem. Soc.* 2007, 129, 9222-9235. b) C. McDonnell, O. López, P. Murphy, J. G. F. Bolaños, R. Hazell, M. Bols, Conformational effects on glycoside reactivity: Study of the high reactive conformer of glucose. *J. Am. Chem. Soc.* 2004, 126, 12374-12385.

[20] Z. Wang, M. Ly, F. Zhang, W. Zhong, A. Suen, A. M. Hickey, J. S. Dordick, R. J. Linhardt, *E. coli* K5 fermentation and the preparation of heparosan, a bioengineered heparin precursor. *Biotechnol. Bioeng.* 2010, 107, 964-973.

[21] B. Bose-Basu, W. Zhang, J. L. W. Kennedy, M. J. Hadad, I. Carmichael, A. S. Serianni, $^{13}$C labeled idohexopyranosyl rings: Effects of methyl glycosidation and $C_6$ oxidation on ring conformational equilibria. *J. Org. Chem.* 2017, 82, 1356-1370.

[22] K. Bock, C. Pedersen, A study of $^{13}$CH coupling constants in hexopyranoses. *J. Chem. Soc., Perkin Trans.* 1974, 2, 293-297.

VI. Exemplary Embodiments

Exemplary embodiments provided in accordance with the presently disclosed subject matter include, but are not limited to, the claims and the following embodiments:

1. A method for preparing an oligosaccharide product, the method comprising:
   (a) hydrolyzing a glucosamine-containing polysaccharide starting material under conditions sufficient to form an oligosaccharide intermediate containing (i) glucosamine (GlcN) and (ii) glucuronic acid (GlcA), iduronic acid (IdoA), or a combination thereof; and
   (b) converting the oligosaccharide intermediate to the oligosaccharide product.
2. The method of embodiment 1, wherein the oligosaccharide intermediate is a GlcN-IdoA disaccharide intermediate or a GlcA-GlcN disaccharide intermediate.
3. The method of embodiment 1 or embodiment 2, wherein the polysaccharide starting material is selected from the group consisting of heparin, N-acylated heparin, heparosan, and salts thereof.
4. The method of any one of embodiments 1-3, wherein hydrolyzing the glucosamine-containing polysaccharide starting material comprises combining the glucosamine-containing polysaccharide starting material with triflic acid.
5. The method of any one of embodiments 2-4, wherein: the glucosamine-containing polysaccharide starting material is heparin, a heparinate, or N-acylated heparin, and the disaccharide intermediate is GlcN-IdoA.
6. The method of embodiment 5, wherein the N-acylated heparin is obtained via N-desulfation and N-acylation of heparin or a heparinate.
7. The method of embodiment 5 or embodiment 6, wherein converting step (b) comprises:
esterifying the GlcN-IdoA to provide a GlcN-IdoA ester, and
acylating the GlcN-IdoA ester to provide a per-acylated GlcN-IdoA ester as the disaccharide product.
8. The method of embodiment 7, wherein converting step (b) further comprises epimerizing the per-acylated GlcN-IdoA ester to provide a per-acylated GlcN-GlcA ester as the disaccharide product.
9. The method of embodiment 5 or embodiment 6, wherein converting step (b) comprises:
esterifying the GlcN-IdoA to provide a GlcN-IdoA ester,
reacting the GlcN-IdoA ester with an azide to provide a $GlcN_3$-IdoA ester, and
acylating the $GlcN_3$-IdoA ester to provide a per-acylated $GlcN_3$-IdoA ester as the disaccharide product.
10. The method of embodiment 9, wherein converting step (b) further comprises epimerizing the per-acylated $GlcN_3$-IdoA ester to provide a per-acylated $GlcN_3$-GlcA ester as the disaccharide product.
11. The method of embodiment 5 or embodiment 6, wherein converting step (b) comprises:
esterifying the GlcN-IdoA to provide a GlcN-IdoA ester,
protecting the GlcN-IdoA ester to provide an N-protected GlcN-IdoA ester, and
acylating the N-protected GlcN-IdoA ester to provide a per-acylated N-protected GlcN-IdoA ester as the disaccharide product.
12. The method of embodiment 11, wherein converting step (b) further comprises epimerizing the per-acylated N-protected GlcN-IdoA ester to form a per-acylated N-protected GlcN-GlcA ester as the disaccharide product.
13. The method of any one of the preceding embodiments, wherein the oligosaccharide product is a disaccharide having a structure according to Formula Ia:

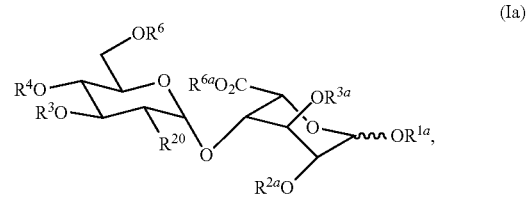

wherein:
$R^{20}$ is —$NHR^2$ or —$N_3$, wherein $R^2$ is $C_{2-8}$ acyl, $C_{7-13}$ aroyl, hydrogen, or an amine protecting group;
$R^4$ is $C_{2-8}$ acyl, $C_{7-13}$ aroyl, or hydrogen;
$R^3$ and $R^6$ are independently $C_{2-8}$ acyl, $C_{7-13}$ aroyl, or hydrogen
$R^{1a}$, $R^{2a}$, and $R^{3a}$ are independently $C_{2-8}$ acyl, $C_{7-13}$ aroyl, or hydrogen; and
$R^{6a}$ is $C_{1-8}$ alkyl or hydrogen.
14. The method of embodiment 13, wherein:
$R^{20}$ is —$NHR^2$;
$R^2$, $R^3$, $R^4$, $R^6$, $R^{1a}$, $R^{2a}$, and $R^{3a}$ are acetyl; and
$R^{6a}$ is methyl.
15. The method of embodiment 13 or embodiment 14, further comprising epimerizing the disaccharide according to Formula Ia to provide a disaccharide product according to Formula Ib:

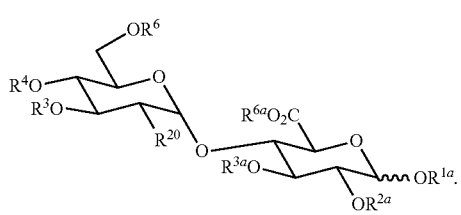

(Ib)

16. The method of any one of embodiments 1, 8, 10, 12, and 15, wherein epimerizing an IdoA-containing material comprises forming an intermediate comprising a halogenated IdoA, and reacting the intermediate with a radical initiator and a reducing agent to provide a GlcA-containing product.
17. The method of embodiment 13 or embodiment 15, wherein $R^{20}$ is $-N_3$.
18. The method of embodiment 17, further comprising reducing $-N_3$ to form $-NH_2$.
19. The method of embodiment 18, further comprising converting $-NH_2$ to $-NHC(O)CF_3$.
20. The method of any one embodiments 13-19, further comprising converting an $-OR^4$ moiety and an $-OR^6$ moiety to an acetal.
21. The method of embodiment 20, further comprising converting the acetal to an $-OR^4$ moiety wherein $R^4$ is benzoyl and an $-OR^6$ moiety wherein $R^6$ is silyl.
22. The method of embodiment 20, further comprising converting the acetal to an $-OR^4$ moiety wherein $R^4$ is hydrogen and an $-OR^6$ moiety wherein $R^6$ is methyl or substituted methyl.
23. The method of any one of embodiments 2-4, wherein:
the glucosamine-containing polysaccharide starting material is heparosan, and
GlcA-GlcN is the disaccharide intermediate.
24. The method of embodiment 23, wherein converting step (b) comprises:
esterifying the GlcA-GlcN to provide a GlcA-GlcN ester, and
acylating the GlcA-GlcN ester to form a per-acylated GlcA-GlcN ester.
25. The method of embodiment 23 or embodiment 24, wherein converting step (b) further comprises epimerizing the per-acylated GlcA-GlcN ester to form a per-acylated IdoA-GlcN ester.
26. The method of embodiment 23, wherein converting step (b) comprises:
esterifying the GlcA-GlcN to provide a GlcA-GlcN ester,
reacting the GlcA-GlcN ester with an azide to provide a GlcA-GlcN$_3$ ester, and
acylating the GlcA-GlcN$_3$ ester to provide a per-acylated GlcA-GlcN$_3$ ester as the disaccharide product.
27. The method of embodiment 26, wherein converting step (b) further comprises epimerizing the per-acylated GlcA-GlcN$_3$ ester to form a per-acylated IdoA-GlcN$_3$ ester.
28. The method of any one of embodiments 23-27, wherein the oligosaccharide product is a disaccharide having a structure according to Formula IIa:

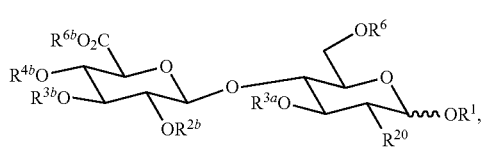

(IIa)

wherein
$R^1$ is $C_{2-8}$ acyl, $C_{7-13}$ aroyl, or hydrogen;
$R^{20}$ is $-NHR^2$ or $-N_3$, wherein $R^2$ is $C_{2-8}$ acyl, $C_{7-13}$ aroyl, hydrogen, or an amine protecting group;
$R^3$ and $R^6$ are independently $C_{2-8}$ acyl, $C_{7-13}$ aroyl, or hydrogen;
$R^{2b}$, $R^{3b}$, and $R^{4b}$ are independently $C_{2-8}$ acyl, $C_{7-13}$ aroyl, or hydrogen; and
$R^{6b}$ is $C_{1-8}$ alkyl or hydrogen.
29. The method of embodiment 28, wherein $R^1$, $R^2$, $R^3$, $R^6$, $R^{2b}$, $R^{3b}$, and $R^{4b}$ are acetyl, and wherein $R^{6b}$ is methyl.
30. The method of embodiment 28 or embodiment 29, further comprising epimerizing the disaccharide according to Formula IIa, thereby obtaining a disaccharide product according to Formula IIb:

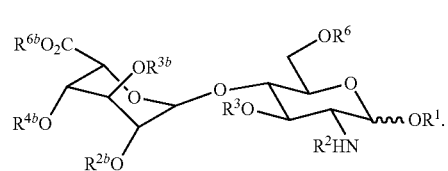

(IIb)

31. The method of any one of embodiments 1-4, wherein the oligosaccharide intermediate is a trisaccharide or a tetrasaccharide.
32. The method of embodiment 31, wherein the oligosaccharide is selected from the group consisting of GlcA-GlcN-IdoA, GlcN-IdoA-GlcN-IdoA, and GlcN-GlcA-GlcN-IdoA.
33. The method of any one of embodiments 1, 25, and 30, wherein epimerizing a GlcA-containing material comprises forming an intermediate comprising a halogenated GlcA, and reacting the intermediate with a radical initiator and a reducing agent to provide an IdoA-containing product.
34. The method of any one embodiments 13-22 and 28-33, further comprising converting an $-OR^1$ moiety or an $-OR^{1a}$ moiety to a thiol, a halide, or an imidate.
35. The method of embodiment 34, further comprising converting the thiol to an a-$OR^L$ moiety, wherein $R^L$ is a linker.
36. The method of any one of embodiments 13-22 and 30-35, wherein $R^{2a}$ or $R^{2b}$ in an IdoA moiety is converted to benzoyl, 9-fluorenylmethoxycarbonyl, or 2,2,2-trichloro-ethoxycarbonyl.
37. The method of embodiment 36, further comprising converting benzoyl to levulinoyl or 9-fluorenylmethoxycarbonyl.
38. The method of any one of embodiments 13-22 and 30-37, wherein $R^{3a}$ or $R^{3b}$ in an IdoA moiety is converted to monochloroacetyl.
39. The method of any one of embodiments 13-22 and 30-37, wherein $R^{3a}$ in an IdoA moiety is converted to benzyl.

40. The method of any one of embodiments 13-22 and 28-39, wherein $R^3$ in a GlcN moiety or a GlcN$_3$ moiety is converted to benzyl.
41. The method of any one of the preceding embodiments, further comprising covalently bonding two or more oligosaccharide products to form an oligomer.
42. The method of embodiment 41, further comprising removing at least one hydroxyl protecting group, at least one amine protecting group, or a combination thereof from the oligomer to provide at least one unprotected hydroxyl group, at least one unprotected amino group, or a combination thereof.
43. The method of embodiment 42, further comprising sulfating at least one unprotected hydroxyl group, at least one unprotected amino group, or a combination thereof.
44. The method of any one of embodiments 41-43, wherein the oligomer is a tetrasaccharide, a pentasaccharide, a hexasaccharide, a heptasaccharide, or an octasaccharide.
45. An oligosaccharide product prepared according to the method of any one of embodiments 2-40.
46. An oligomer prepared according to the method of any of embodiments 41-43.
47. A compound according to Formula III:

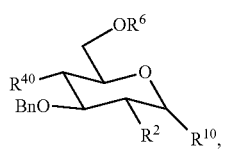

wherein:
(i) $R^2$ is selected from the group consisting of —NHC(O)CF$_3$ and —N$_3$;
(ii) $R^6$ is selected from the group consisting of (2-naphthyl)methyl and tert-butyldiphenylsilyl; and
(iii) (a) $R^{10}$ is an iduronic acid moiety:

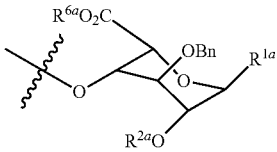

or a glucuronic acid moiety:

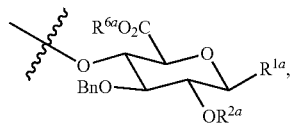

wherein:
$R^{1a}$ is selected from the group consisting of —OR$^L$ and —SR$^T$, wherein R$^L$ is a linker and R$^T$ is C$_{6\text{-}10}$ aryl,
$R^{2a}$ is selected from the group consisting of 9-fluorenylmethoxycarbonyl and levulinoyl, and
$R^{6a}$ is C$_{1\text{-}8}$ alkyl; and
(b) $R^{40}$ is —OR$^4$, wherein R$^4$ is hydrogen or C$_{2\text{-}8}$ acyl or C$_{7\text{-}13}$ aroyl; or (iv) (a) $R^{10}$ is —OR$^L$ or —SR$^T$, wherein R$^L$ is a linker and R$^T$ is C$_{6\text{-}10}$ aryl; and
(b) $R^{40}$ is an iduronic acid moiety:

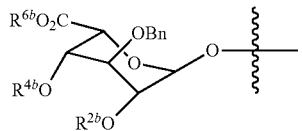

or a glucuronic acid moiety:

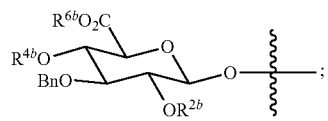

wherein:
$R^{2b}$ is selected from the group consisting of 9-fluorenylmethoxycarbonyl and levulinoyl,
$R^{4b}$ is selected from the group consisting of hydrogen, C$_{2\text{-}8}$ acyl, and C$_{7\text{-}13}$ aroyl, and
$R^{6b}$ is C$_{1\text{-}8}$ alkyl.
48. The compound of embodiment 47, which is

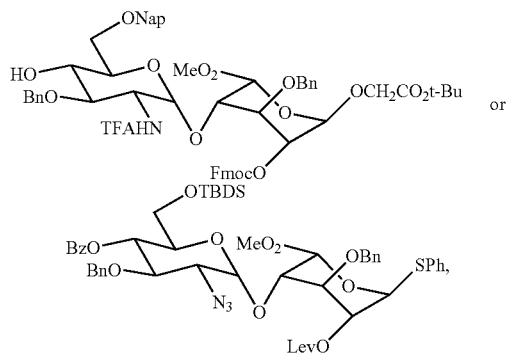

wherein Bz is benzoyl; Bn is benzyl; Fmoc is 9-fluorenylmethoxycarbonyl; Lev is levulinoyl; Nap is (2-naphthyl)methyl; t-Bu is tert-butyl; and TBDPS is tert-butyldiphenylsilyl.

Although the foregoing has been described in some detail by way of illustration and example for purposes of clarity and understanding, one of skill in the art will appreciate that certain changes and modifications can be practiced within the scope of the appended claims. In addition, each reference provided herein is incorporated by reference in its entirety to the same extent as if each reference was individually incorporated by reference.

What is claimed is:
1. A method for preparing a disaccharide product, the method comprising:
(a) combining a glucosamine-containing polysaccharide starting material with a sulfonic acid to form a disaccharide intermediate; and
(b) converting the disaccharide intermediate to the disaccharide product;
wherein the disaccharide intermediate is a glycosamine-iduronic acid (GlcN-IdoA) disaccharide intermediate or a glucuronic acid-glycosamine (GlcA-GlcN) disaccharide intermediate; and wherein the disaccharide product is a compound according to Formula Ia

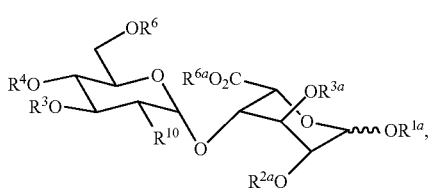

(Ia)

or
a compound according to Formula IIa,

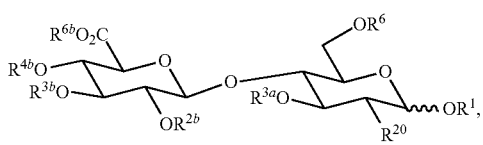

(IIa)

wherein:
$R^1$ is $C_{2-8}$ acyl, $C_{7-13}$ aroyl, or hydrogen;
$R^{20}$ is —$NHR^2$ or —$N_3$;
$R^2$ is $C_{2-8}$ acyl, $C_{7-13}$ aroyl, hydrogen, or an amine protecting group;
$R^3$, $R^4$ and $R^6$ are independently $C_{2-8}$ acyl, $C_{7-13}$ aroyl, or hydrogen;
$R^{1a}$, $R^{2a}$, $R^{3a}$, $R^{2b}$, $R^{3b}$ and $R^{4b}$ are independently $C_{2-8}$ acyl, $C_{7-13}$ aroyl, or hydrogen; and
$R^{6a}$ and $R^{6b}$ are $C_{1-8}$ alkyl or hydrogen.

2. The method of claim 1, wherein the polysaccharide starting material is selected from the group consisting of heparin, N-acylated heparin, heparosan, and salts thereof.

3. The method of claim 1, wherein the sulfonic acid is triflic acid.

4. The method of claim 1, wherein:
the glucosamine-containing polysaccharide starting material is heparin, a heparinate, or N-acylated heparin, and
the disaccharide intermediate is GlcN-IdoA.

5. The method of claim 4, wherein converting step (b) comprises:
(1) esterifying the GlcN-IdoA to provide a GlcN-IdoA ester, and
acylating the GlcN-IdoA ester to provide a per-acylated GlcN-IdoA ester as the disaccharide product;
(2) esterifying the GlcN-IdoA to provide a GlcN-IdoA ester,
reacting the GlcN-IdoA ester with an azide to provide a $GlcN_3$-IdoA ester, and
acylating the $GlcN_3$-IdoA ester to provide a per-acylated $GlcN_3$-IdoA ester as the disaccharide product; or
(3) esterifying the GlcN-IdoA to provide a GlcN-IdoA ester,
protecting the GlcN-IdoA ester to provide an N-protected GlcN-IdoA ester, and
acylating the N-protected GlcN-IdoA ester to provide a per-acylated N-protected GlcN-IdoA ester as the disaccharide product.

6. The method of claim 4, wherein the disaccharide product is the compound according to Formula Ia.

7. The method of claim 6, further comprising epimerizing the disaccharide according to Formula Ia to provide a disaccharide product according to Formula Ib:

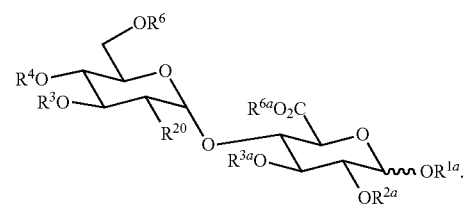

(Ib)

8. The method of claim 1, wherein:
the glucosamine-containing polysaccharide starting material is heparosan, and
GlcA-GlcN is the disaccharide intermediate.

9. The method of claim 8, wherein converting step (b) comprises:
(i) esterifying the GlcA-GlcN to provide a GlcA-GlcN ester, and
acylating the GlcA-GlcN ester to form a per-acylated GlcA-GlcN ester as the disaccharide product; or
(ii) esterifying the GlcA-GlcN to provide a GlcA-GlcN ester,
reacting the GlcA-GlcN ester with an azide to provide a $GlcA-GlcN_3$ ester, and acylating the $GlcA-GlcN_3$ ester to provide a per-acylated $GlcA-GlcN_3$ ester as the disaccharide product.

10. The method of claim 1, wherein converting step (b) comprises: epimerizing a GlcA in the oligosaccharide intermediate to form an IdoA in the disaccharide product, or epimerizing an IdoA in the oligosaccharide intermediate to form a GlcA in the oligosaccharide intermediate.

11. The method of claim 8, wherein the disaccharide product is the compound according to Formula IIa.

12. The method of claim 11, further comprising epimerizing the disaccharide according to Formula IIa, thereby obtaining a disaccharide product according to Formula IIb:

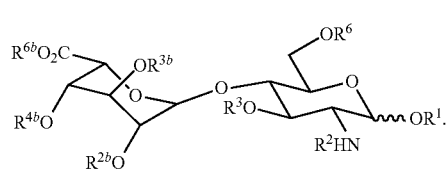

(IIb)

13. The method of claim 1, further comprising covalently bonding two or more disaccharide products to form an oligomer.

14. The method of claim 13, further comprising removing at least one hydroxyl protecting group, at least one amine protecting group, or a combination thereof from the oligomer to provide at least one unprotected hydroxyl group, at least one unprotected amino group, or a combination thereof.

15. The method of claim 14, further comprising sulfating at least one unprotected hydroxyl group, at least one unprotected amino group, or a combination thereof.

* * * * *